(12) United States Patent  
Takahashi et al.

(10) Patent No.: US 10,992,869 B2  
(45) Date of Patent: Apr. 27, 2021

(54) IMAGE APPARATUS, OBJECT DETECTION METHOD AND COMPUTER READABLE RECORDING MEDIUM

(71) Applicant: Olympus Corporation, Tokyo (JP)

(72) Inventors: Masashi Takahashi, Hachioji (JP); Yuiko Uemura, Hachioji (JP); Takeshi Suzuki, Akiruno (JP); Keiji Kunishige, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/788,168

(22) Filed: Feb. 11, 2020

(65) Prior Publication Data

US 2020/0267325 A1 Aug. 20, 2020

(30) Foreign Application Priority Data

Feb. 20, 2019 (JP) .............................. JP2019-028871

(51) Int. Cl.
*H04N 5/225* (2006.01)
*H04N 5/232* (2006.01)

(52) U.S. Cl.
CPC . *H04N 5/232933* (2018.08); *H04N 5/232939* (2018.08)

(58) Field of Classification Search
None
See application file for complete search history.

(56) References Cited

U.S. PATENT DOCUMENTS

| 6,734,910 | B1* | 5/2004 | Yumoto | H04N 1/2112 348/231.3 |
| 2006/0050997 | A1* | 3/2006 | Imamura | H04N 1/2112 382/312 |
| 2006/0132636 | A1* | 6/2006 | Miyata | H04N 5/232939 348/333.01 |
| 2008/0295015 | A1* | 11/2008 | Liu | G06F 3/04895 715/772 |

(Continued)

FOREIGN PATENT DOCUMENTS

| JP | 2011-193249 A | 9/2011 |
| JP | 2013-179520 A | 9/2013 |

(Continued)

*Primary Examiner* — Twyler L Haskins
*Assistant Examiner* — Dwight Alex C Tejano
(74) *Attorney, Agent, or Firm* — John C. Pokotylo; Pokotylo Patent Services

(57) ABSTRACT

An image apparatus includes: an image sensor configured to successively generate image data by continuously imaging an object scene; a memory configured to successively store the image data generated by the image sensor; a touch panel configured to output a first signal for commanding shooting preparation by a touch operation of a user and a second signal for commanding shooting by a release operation of releasing the touch operation; and a processor configured to successively store the image data successively generated by the image sensor in the memory according to a first storage format when the first signal is input from the touch panel and store the image data successively generated by the image sensor in the memory according to a second storage format when the second signal is input from the touch panel.

15 Claims, 38 Drawing Sheets

(56) References Cited

U.S. PATENT DOCUMENTS

| | | | |
|---|---|---|---|
| 2011/0221948 A1* | 9/2011 | Saito | H04N 5/23293 348/333.01 |
| 2013/0222671 A1* | 8/2013 | Tseng | H04N 5/23245 348/333.11 |
| 2014/0078371 A1* | 3/2014 | Kinoshita | H04N 5/232935 348/333.02 |
| 2018/0181275 A1* | 6/2018 | Baek | G06F 3/147 |

FOREIGN PATENT DOCUMENTS

| | | |
|---|---|---|
| JP | 5306266 B2 | 10/2013 |
| JP | 2014-060501 A | 4/2014 |
| JP | 2015-192335 A | 11/2015 |
| JP | 2016-039498 A | 3/2016 |
| JP | 2016-058930 A | 4/2016 |
| JP | 6071958 B2 | 2/2017 |

\* cited by examiner

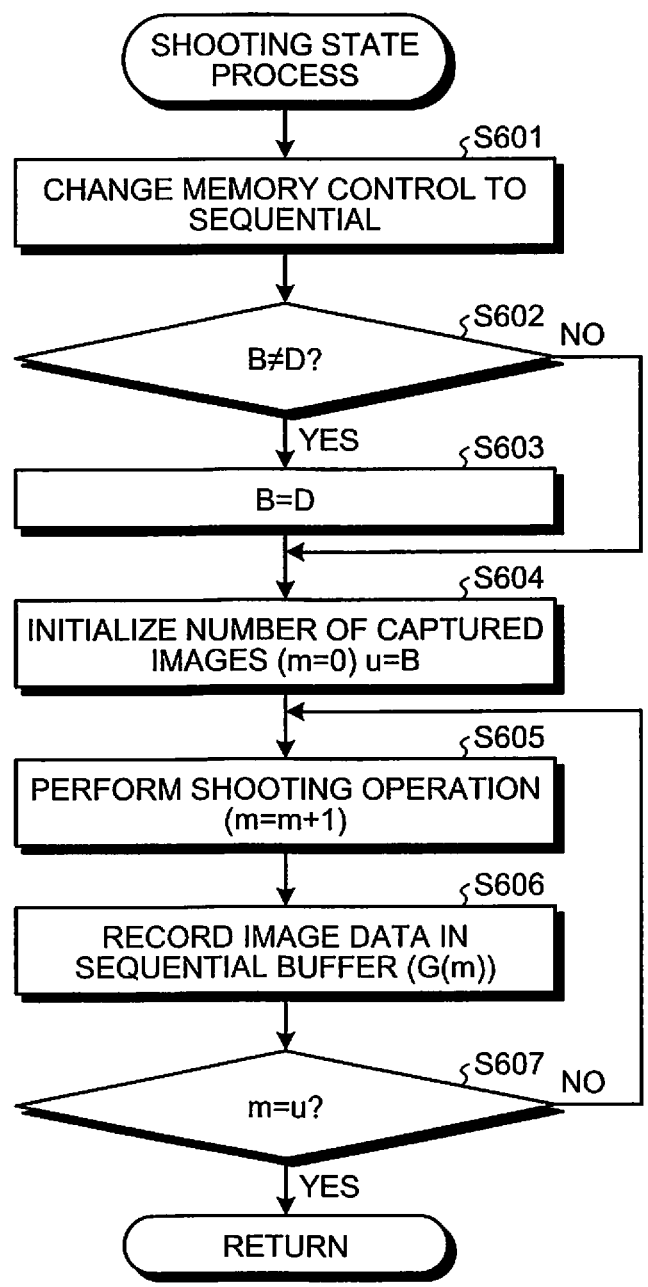

IMAGE APPARATUS, OBJECT DETECTION METHOD AND COMPUTER READABLE RECORDING MEDIUM

This application is based upon and claims the benefit of priority from Japanese Patent Application No. 2019-028871, filed on Feb. 20, 2019, the entire contents of which are incorporated herein by reference.

BACKGROUND

The present disclosure relates to an image apparatus, an image capturing method, and a computer readable recording medium.

In an image apparatus such as a digital camera, there has been a known technique in which a touch operation unit is provided on a display area of a display monitor, buffering is started to successively record, in a buffer, a plurality of pieces of image data generated by successively capturing images through a first touch operation, and recording is suspended by ending buffering after a predetermined time elapses from a second touch operation (for example, JP 2015-192335 A).

SUMMARY

According to one aspect of the present disclosure, there is provided an image apparatus including: an image sensor configured to successively generate image data by continuously imaging an object scene; a memory configured to successively store the image data generated by the image sensor; a touch panel configured to output a first signal for commanding shooting preparation by a touch operation of a user and a second signal for commanding shooting by a release operation of releasing the touch operation; and a processor configured to successively store the image data successively generated by the image sensor in the memory according to a first storage format when the first signal is input from the touch panel and store the image data successively generated by the image sensor in the memory according to a second storage format when the second signal is input from the touch panel.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 23 is a flowchart illustrating an outline of a shooting state process according to the first modification of the second embodiment;

DETAILED DESCRIPTION

Hereinafter, embodiments for carrying out the present disclosure are described in detail together with drawings. Note that the present disclosure is not limited by the following embodiments. In addition, each drawing referred to in the following description only schematically illustrates a shape, a size, and a positional relationship to the extent that contents of the present disclosure may be understood. That is, the present disclosure is not limited only to the shape, the size, and the positional relationship illustrated in each drawing. Furthermore, in the following description, an image apparatus including a touch operation unit 121a will be described as an example. In addition to the image apparatus, the present disclosure may be applied to a device including a touch operation unit such as a touch panel or a touch pad such as a mobile phone, a camcorder, an IC recorder having a shooting function, a microscope such as a video microscope or a biological microscope, an industrial or medical endoscope, a tablet terminal device, a personal computer, etc. For example, it is possible to consider application to a device such as an industrial or medical endoscope having a short insertion part that transmits vibration of the touch operation unit to an imaging part at a distal end.

First Embodiment

Configuration of Image Apparatus

Figure 1:
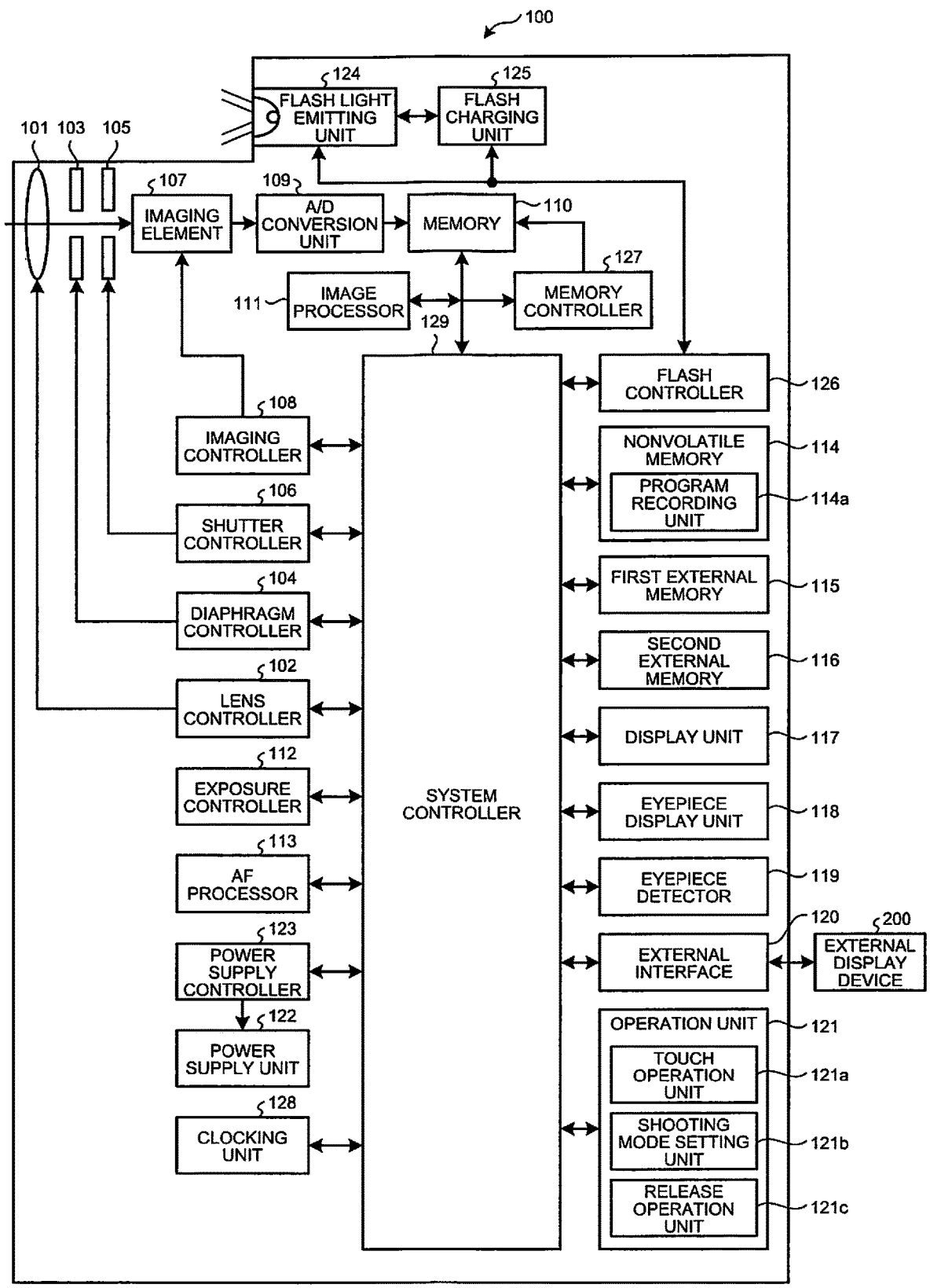
FIG. 1 is a block diagram illustrating a functional configuration of an image apparatus according to a first embodiment.

FIG. 1 is a block diagram illustrating a functional configuration of an image apparatus according to a first embodiment. An image apparatus 100 illustrated in FIG. 1 generates image data by capturing an image of an object scene. The image apparatus 100 includes an optical system 101, a lens controller 102, a diaphragm 103, a diaphragm controller 104, a shutter 105, a shutter controller 106, an imaging element 107, an imaging controller 108, an A/D conversion unit 109, a memory 110, an image processor 111, an exposure controller 112, an AF processor 113, a nonvolatile memory 114, a first external memory 115, a second external memory 116, a display unit 117, an eyepiece display unit 118, an eyepiece detector 119, an external interface 120, an operation unit 121, a power supply unit 122, a power supply controller 123, a flash light emitting unit 124, a flash charging unit 125, a flash controller 126, a memory controller 127, a clocking unit 128, and a system controller 129.

The optical system 101 forms a subject image on a light receiving surface of the imaging element 107. The optical system 101 is configured using one or a plurality of lenses and a driving unit such as a stepping motor or a voice coil motor that moves these lenses along an optical axis direction. The optical system 101 changes a focus position and a focal length (view angle) by moving along the optical axis direction under the control of the lens controller 102. In FIG. 1, the optical system 101 is integrally formed with the image apparatus 100. However, for example, the optical system 101 may be attachable and detachable to and from the image apparatus 100, and may be connected thereto by, for example, wireless communication. In addition, Further, a focus ring for adjusting the focus position, a zoom ring for changing the focal length, a function button to which a predetermined operation function may be assigned, a control ring, etc. may be provided on an outer peripheral side of the optical system 101.

The lens controller 102 is configured using a drive driver or a control circuit that applies a voltage to the optical system 101. Under the control of the system controller 129, the lens controller 102 applies a voltage to the optical system 101 to move the optical system 101 in the optical axis direction, thereby changing the focus position and or the view angle of the optical system 101. The lens controller 102 is configured using a processor having a memory and hardware such as a central processing unit (CPU).

The diaphragm 103 adjusts exposure by limiting the amount of incident light collected by the optical system 101 under the control of the diaphragm controller 104.

The diaphragm controller 104 is configured using a drive driver or a control circuit that apply a voltage to the diaphragm 103. The diaphragm controller 104 controls an F value of the diaphragm 103 by applying a voltage to the diaphragm 103 under the control of the system controller 129.

The shutter 105 switches a state of the imaging element 107 to an exposure state or a light shielding state under the control of the shutter controller 106. The shutter 105 is configured using, for example, a focal plane shutter and a drive motor.

The shutter controller 106 is configured using a drive driver or a control circuit that applies a voltage to the shutter 105. The shutter controller 106 drives the shutter 105 by applying a voltage to the shutter 105 under the control of the system controller 129.

Under the control of the imaging controller 108, the imaging element 107 generates image data (RAW data) by receiving the subject image collected by the optical system 101 and performing photoelectric conversion, and outputs the image data to the A/D conversion unit 109. The imaging element 107 is configured using an image sensor such as a charge coupled device (CCD) or a complementary metal oxide semiconductor (CMOS) in which a plurality of pixels is disposed in a two-dimensional (2D) matrix and each pixel outputs an image signal. In addition, under the control of the imaging controller 108, the imaging element 107 successively generates temporarily continuous image data by continuously receiving the subject image collected by the optical system 101, and outputs the successively generated image data to the A/D conversion unit 109. Furthermore, the imaging element 107 has a first drive mode and a second drive mode. Here, the first drive mode is a mode of outputting image data generated by reading image signals from all pixels in an effective area of the imaging element 107. In addition, the second drive mode is a mode of outputting image data (image data having a small amount of data) by reading pixel signals from a predetermined pixel column from the effective area of the imaging element 107. In the first embodiment, the imaging element 107 functions as an imaging unit. Further, a phase difference pixel for AF detection may be used as the pixel of the imaging element 107.

The imaging controller 108 is configured using a timing generator that controls an imaging timing of the imaging element 107 under the control of the system controller 129. The imaging controller 108 causes the imaging element 107 to capture an image at a predetermined timing. Further, the imaging controller 108 switches the imaging element 107 to the first drive mode or the second drive mode under the control of the system controller 129. The imaging controller 108 is configured using a processor having a memory and hardware such as a CPU.

The A/D conversion unit 109 converts analog image data input from the imaging element 107 into digital image data by performing A/D conversion, and outputs the digital image data to the memory 110. The A/D conversion unit 109 is configured using, for example, an A/D conversion circuit, etc.

The memory 110 is configured using a frame memory or a buffer memory such as a video random access memory (VRAM) or a dynamic random access memory (DRAM). The memory 110 temporarily stores image data input from the A/D conversion unit 109 and image data subjected to image processing by the image processor 111, and outputs the stored image data in the image processor 111 or the system controller 129. In addition, the memory 110 has a first storage area and a second storage area. Here, the first storage area is a memory area that stores a preset number of pieces of image data and successively releases image data as an empty area from an oldest piece of image data stored when the preset number of is exceeded. In addition, the second storage area is a memory area obtained by subtracting the capacity corresponding to the first storage area from the memory 110, and is a memory area for storing only the preset number of pieces of image data.

The image processor 111 is configured using a processor having a memory and hardware such as a graphics processing unit (GPU), an application specific integrated circuit (ASIC), a digital signal processing (DSP), a field programmable gate array (FPGA), etc. Under the control of the system controller 129, the image processor 111 acquires image data recorded in the memory 110, performs image processing on the acquired image data, and outputs the image data to the memory 110 or the system controller 129. Here, examples of the image processing include demosaicing processing, gain-up processing, white balance adjustment processing, noise reduction processing, development processing for generating joint photographic experts group (JPEG) data from RAW data, etc.

The exposure controller 112 controls exposure of the image apparatus 100 based on image data input via the system controller 129. Specifically, the exposure controller 112 outputs a control parameter to the diaphragm controller 104 and the shutter controller 106 via the system controller 129 so that exposure of the image apparatus 100 becomes appropriate exposure. The exposure controller 112 is configured using a processor having a memory and hardware such as a CPU.

The AF processor 113 controls the focus position of the image apparatus 100 based on image data input via the system controller 129. The AF processor 113 outputs a control parameter related to the focus position of the image apparatus 100 to the lens controller 102 via the system controller 129 using one of a phase difference method, a contrast method, and a hybrid method in which the phase difference method and the contrast method are combined.

The nonvolatile memory 114 records various types of information and programs related to the image apparatus 100. The nonvolatile memory 114 includes a program recording unit 114a that records a plurality of programs executed by the image apparatus 100.

The first external memory 115 is detachably attached from the outside of the image apparatus 100. The first external memory 115 records an image file including image data (RAW data, JPEG data, etc.) input from the system controller 129. The first external memory 115 is configured using a recording medium such as a memory card.

The second external memory 116 is detachably attached from the outside of the image apparatus 100. The second external memory 116 records an image file including image data input from the system controller 129. The second external memory 116 is configured using a recording medium such as a memory card.

The display unit 117 displays an image corresponding to the image data input from the system controller 129 and various types of information related to the image apparatus 100. The display unit 117 is configured using a display panel such as a liquid crystal display panel or an organic electro luminescence (EL) display panel, a display driver, etc.

The eyepiece display unit 118 functions as an electronic viewfinder (EVF), and displays an image corresponding to the image data input from the system controller 129 and various types of information related to the image apparatus 100. The eyepiece display unit 118 is configured using a display panel such as a liquid crystal display panel or an organic EL display panel, an eyepiece lens, etc.

The eyepiece detector 119 is configured using an infrared sensor, an eye sensor, etc. The eyepiece detector 119 detects an object or a user approaching the eyepiece display unit 118 and outputs a detection result to the system controller 129. The eyepiece detector 119 is provided around the eyepiece display unit 118.

The external interface 120 outputs image data input from the system controller 129 to an external display device 200 according to a predetermined communication standard.

The operation unit 121 includes a plurality of operation members such as a switch, a button, a joystick, a dial switch, a lever switch, and a touch panel. The operation unit 121 receives an input of a user operation and outputs a signal corresponding to the received operation to the system controller 129. The operation unit 121 includes a touch operation unit 121a, a shooting mode operation unit 121b, and a release operation unit 121c.

The touch operation unit 121a outputs a first signal that commands preparation for shooting by a touch operation of the user (hereinafter referred to as a "shooting preparation command signal"), and a second signal that commands shooting by a release operation for releasing the touch operation (hereinafter referred to as a "shooting command signal") to the system controller 129. The touch operation unit 121a is provided by being superimposed on the display area of the display unit 117. The touch operation unit 121a detects a touch position touched by the user, and outputs a signal indicating the detected touch position to the system controller 129. In the following description, the touch operation unit 121a is described using a touch panel. However, the touch operation unit 121a may be configured using, for example, a touch pad.

The shooting mode operation unit 121b receives an input of a selection signal for selecting various modes of the image apparatus 100. For example, the shooting mode operation unit 121b receives an input of a selection signal for selecting a shooting mode such as a still image shooting mode, a diaphragm priority shooting mode, a shutter speed priority shooting mode, etc. of the image apparatus 100. The shooting mode operation unit 121b is configured using, for example, a dial switch.

The release operation unit 121c receives input of a first release signal that commands the image apparatus 100 to prepare for shooting and a second release signal that commands shooting. For example, the release operation unit 121c outputs the first release signal to the system controller 129 when an operation button having a two-stage switch is half pressed, and outputs the second release signal to the system controller 129 when the operation button is fully pressed.

The power supply unit 122 is attachable to and detachable from the image apparatus 100. The power supply unit 122 supplies a predetermined voltage to each unit included in the image apparatus 100 under the control of the power supply controller 123. The power supply unit 122 is configured using, for example, a lithium ion rechargeable battery, a nickel hydride rechargeable battery, etc.

The power supply controller 123 adjusts a voltage supplied by the power supply unit 122 to a predetermined voltage under the control of the system controller 129. The power supply controller 123 is configured using a regulator etc.

The flash light emitting unit 124 emits auxiliary light toward an imaging area of the image apparatus 100 under the control of the flash controller 126. The flash light emitting unit 124 is configured using, for example, a light emitting diode (LED) lamp.

The flash charging unit 125 performs charging with power for emitting auxiliary light by the flash light emitting unit 124.

The flash controller 126 causes the flash light emitting unit 124 to emit light at a predetermined timing under the control of the system controller 129. The flash controller 126 is configured using a processor having a memory and hardware such as a CPU.

The memory controller 127 manages image data stored in the memory 110 under the control of the system controller 129.

The clocking unit 128 has a clocking function, and generates a timing that serves as a reference for the operation of each unit included in the image apparatus 100. Further, the clocking unit 128 adds date and time information to the image data generated by the imaging element 107. Furthermore, the clocking unit 128 outputs a completion signal when a time set in advance is reached by clocking. The clocking unit 128 is configured using a clock generator etc.

The system controller 129 comprehensively controls each unit included in the image apparatus 100. The system controller 129 is configured using a processor having a memory and hardware such as a CPU, an ASIC, an FPGA, a DSP, etc.

The system controller 129 successively stores image data successively generated by the imaging element 107 in the memory 110 according to a first storage format when the shooting preparation signal is input from the touch operation unit 121*a*, and stores image data successively generated by the imaging element 107 in the memory 110 according to a second storage format when the shooting command signal is input from the touch operation unit 121*a*. Here, the first storage format is a ring buffer format. In addition, the second storage format is a sequential buffer format. The system controller 129 successively stores image data according to the first storage format in the first storage area of the memory 110, and successively stores image data according to the second storage format in the second storage area of the memory 110. In addition, in the case of storing the image data in the first storage area of the memory 110 according to the first storage format, when an empty area of the first storage area of the memory 110 becomes full, the system controller 129 stores a latest piece of image data by successively releasing image data as an empty area from an oldest piece of image data stored in the first storage area of the memory 110. Further, when image data is stored in the second storage area of the memory 110 by the second storage format, the system controller 129 stores image data until an empty area of the second storage area of the memory 110 becomes full. In addition, in a case where the empty area is present in the first storage area of the memory 110, when the shooting command signal is input from the touch operation unit 121*a*, the system controller 129 successively stores image data from the empty area of the first storage area of the memory 110. In addition, the system controller 129 successively stores image data stored in the first storage area and the second storage area of the memory 110 in the first external memory 115 or the second external memory 116 that may be inserted into and removed from the image apparatus 100 when image data is stored in the first storage area and the second storage area of the memory 110, and deletes all image data from the memory 110 when all image data stored in the first storage area and the second storage area of the memory 110 is recorded in the first external memory 115 or the second external memory 116. In addition, when at least one of the shooting preparation signal and the shooting command signal is input from the touch operation unit 121*a*, the system controller 129 drives the imaging element 107 in the first drive mode by controlling the imaging controller 108. Meanwhile, when the shooting preparation command signal and the shooting command signal are not input from the touch operation unit 121*a*, the system controller 129 drives the imaging element 107 in the second drive mode by controlling the imaging controller 108. Note that in the first embodiment, the system controller 129 functions as a controller.

Operation Process of Image Apparatus

Next, a description will be given of an outline of the operation process executed by the image apparatus 100. FIG. 2A to FIG. 2I are schematic diagrams for description of the outline of the operation process executed by the image apparatus 100. FIG. 3A to FIG. 3E are diagrams schematically illustrating the operation process when the image apparatus 100 stores image data in the memory 110. In addition, in FIG. 2A to FIG. 2I and FIG. 3A to FIG. 3E, a description will be given of a ProCapture mode of the image apparatus 100. Here, the ProCapture mode is a mode in which in a case where image data is successively stored in the first storage area of the memory 110 from when the shooting preparation signal or the first release signal is input, and the shooting command signal or the second release signal is input, image data is successively stored in the second storage area of the memory 110 by capturing a predetermined number of images set in advance. In FIG. 2A to FIG. 2I and FIG. 3A to FIG. 3E, a description will be given of a touch ProCap operation process included in an operation process for executing the ProCapture mode. In more detail, the touch ProCap operation process is a process of successively storing image data in the first storage area of the memory 110 from when the shooting preparation signal is input according to a touch operation, and successively storing image data in the second storage area of the memory 110 by capturing a predetermined number of images set in advance when the shooting command signal is input.

In a conventional ProCapture mode, first, (1) a half-press operation (shooting preparation operation), (2) a full-press operation (shooting command at a decisive moment), (3) a full-press release operation (finishing shooting), and (4) a release operation from a half-pressed state (canceling shooting) are realized using one member with respect to the release operation unit 121*c*. However, when these functions are realized by individual touch operations, instant image capturing is impaired. In addition, touch operation patterns unnecessarily increase, making it difficult for the user to understand. Moreover, induction of incorrect operation or occurrence of shake during operation is considered. Further, in an operation that may continue to be held in a main exposure image capture state (a state of driving in the first drive mode) for a long time, short-term battery consumption due to an increase in power consumption is considered. Furthermore, in the touch ProCap operation process, there are relevance and consistence in touch operation between conventional touch single shooting (shooting by touch) and touch continuous shooting (starting continuous shooting by touch and suspending continuous shooting by touch-up (release operation to cancel touch operation)). In addition, it is required to be easy to understand and difficult to make mistakes by being a simple touch operation system. For this reason, in the touch ProCap operation process in the present embodiment, the above problems may be solved by realizing the functions (1) to (4) described above by a single touch operation on the touch operation unit 121a.

Furthermore, in the following, a description will be given of an operation process when the image apparatus 100 displays a live view image on the display unit 117. However, a similar operation process is executed on the eyepiece display unit 118. Naturally, a similar operation process is executed in an operation process when image data is transmitted to a portable device of the user via the external interface 120.

Figure 2A:
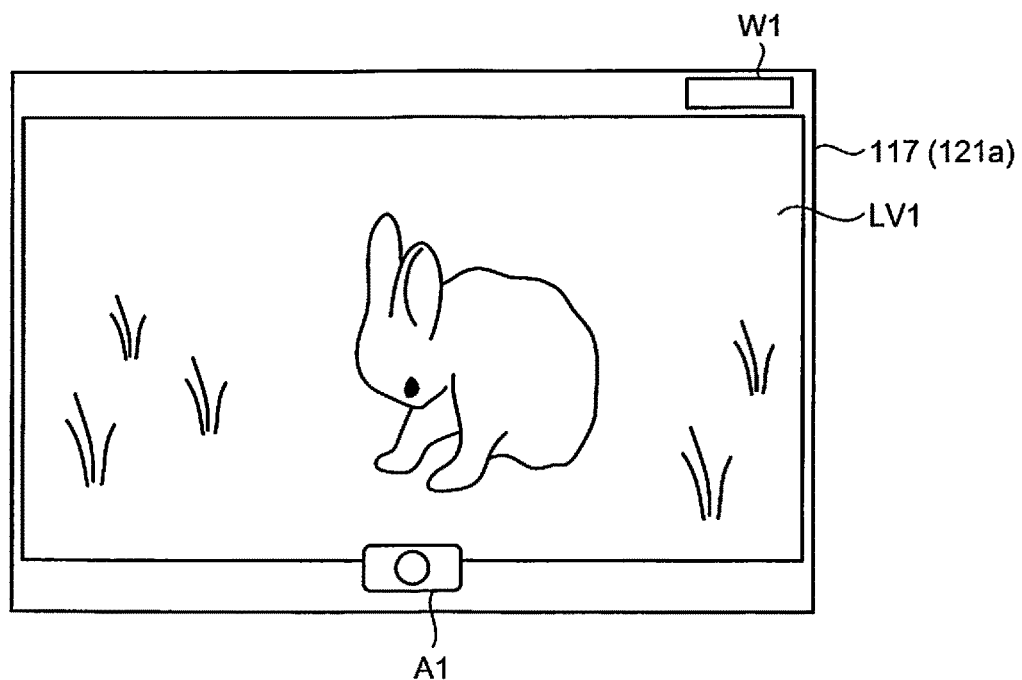
FIG. 2A is a schematic diagram for description of an outline of an operation process executed by the image apparatus according to the first embodiment.
Figure 3A:
FIG. 3A is a diagram schematically illustrating the operation process when the image apparatus stores image data in a memory according to the first embodiment.

As illustrated in FIG. 2A, first, the system controller 129 controls the imaging controller 108 to switch the imaging element 107 to the second drive mode, thereby making a transition to a shooting standby state in which a live view image LV1 corresponding to live view image data generated by the imaging element 107 is displayed on the display unit 117 (hereinafter simply referred to as a "shooting standby state"). In this case, as illustrated in FIG. 2A, the system controller 129 causes the display unit 117 to display pre-release buffer information W1 and an icon A1 on the live view image LV1 or the display area of the display unit 117. The pre-release buffer information W1 indicates a memory capacity of a shooting buffer before the release of the memory 110. The icon A1 is an icon that receives an input of a signal commanding shooting by touch ProCapture, and is displayed on the display unit 117. In the situation illustrated in FIG. 2A, the pre-release buffer information W1 indicates a state in which captured image data is empty in the memory 110. In this case, as illustrated in FIG. 3A, the memory 110 is in a state in which the captured image data is empty. In addition, the icon A1 receives an input of a shooting preparation command signal via the touch operation unit 121a in response to a touch operation of the user.

Figure 2B:
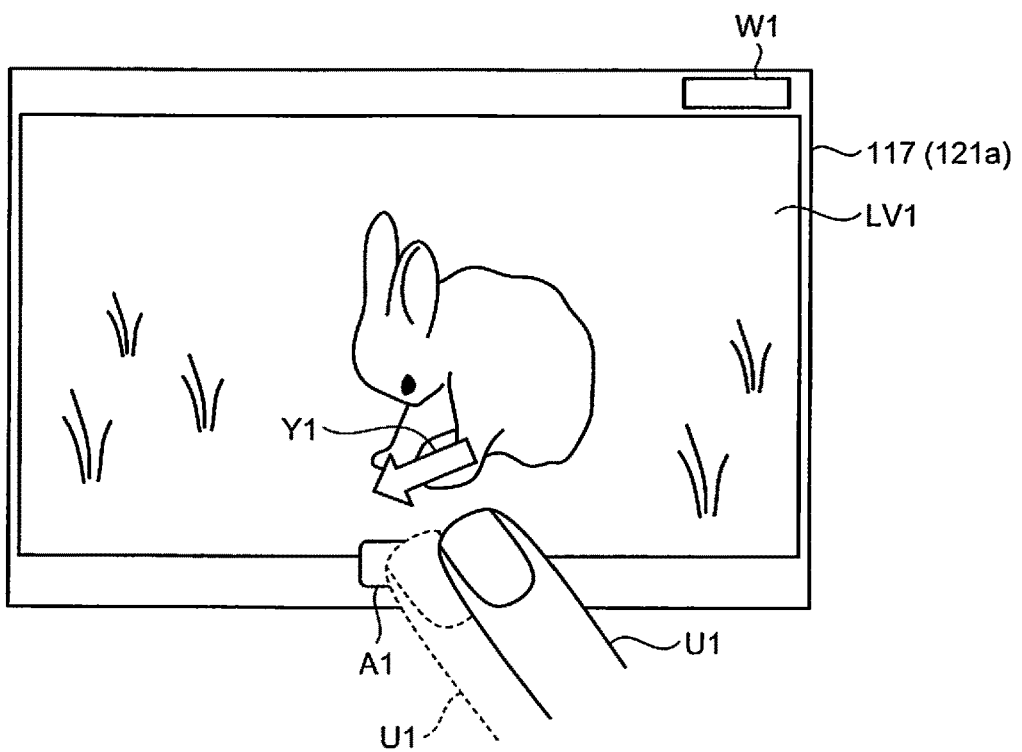
FIG. 2B is a schematic diagram for description of an outline of the operation process executed by the image apparatus according to the first embodiment.
Figure 2C:
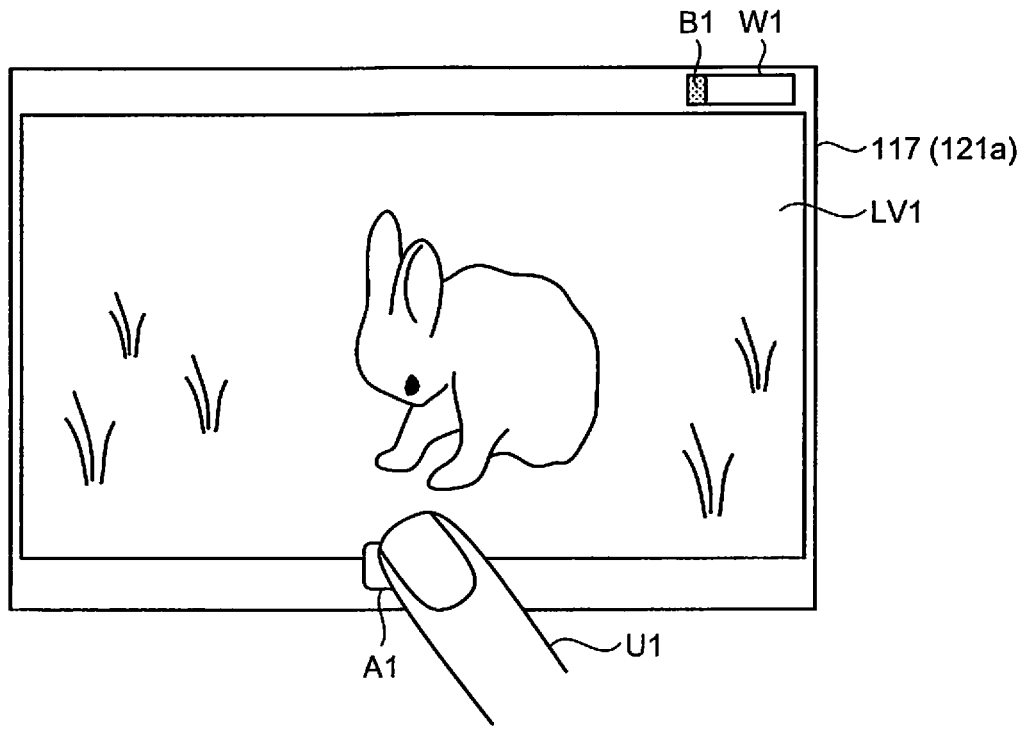
FIG. 2C is a schematic diagram for description of an outline of the operation process executed by the image apparatus according to the first embodiment.
Figure 3B:
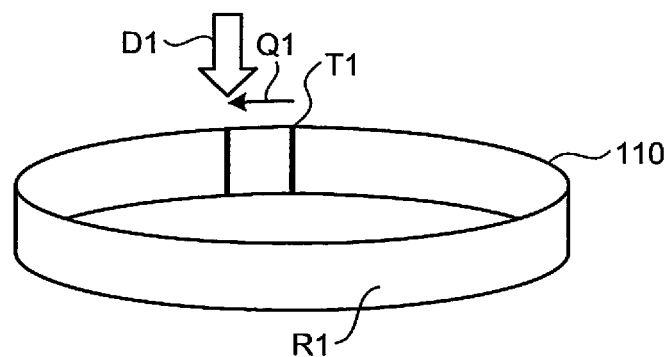
FIG. 3B is a diagram schematically illustrating the operation process when the image apparatus stores the image data in the memory according to the first embodiment.

Subsequently, as illustrated in FIG. 2B, when the shooting preparation command signal is input from the touch operation unit 121a by a finger U1 of the user performing a touch operation (arrow Y1) on the icon A1 (FIG. 2B and FIG. 2C), the system controller 129 switches the mode of the imaging element 107 from the shooting standby state to a shooting state of the first drive mode by controlling the imaging controller 108. Here, the shooting state is a state in which the imaging element 107 generates image data by reading pixel signals from all pixels in the effective area. In this instance, the system controller 129 controls the memory controller 127 to successively store a plurality of pieces of image data successively generated by the imaging element 107 in the first storage area R1 of the memory 110 over time. Specifically, as illustrated in FIG. 3B, the system controller 129 controls the memory controller 127 to successively store latest image data D1 successively generated by the imaging element 107 in the first storage area R1 in time series (arrow Q1) according to a ring buffer format corresponding to the first storage format as the storage format of the memory 110 from a time T1 when the user touches the icon A1. Further, as illustrated in FIG. 2C, the system controller 129 causes the display unit 117 to display a bar B1 indicating the amount of image data stored in the first storage area R1 of the memory 110 by superimposing the bar B1 on the pre-release buffer information W1. As a result, the user may intuitively detect the current buffer capacity of the memory 110.

Figure 2D:
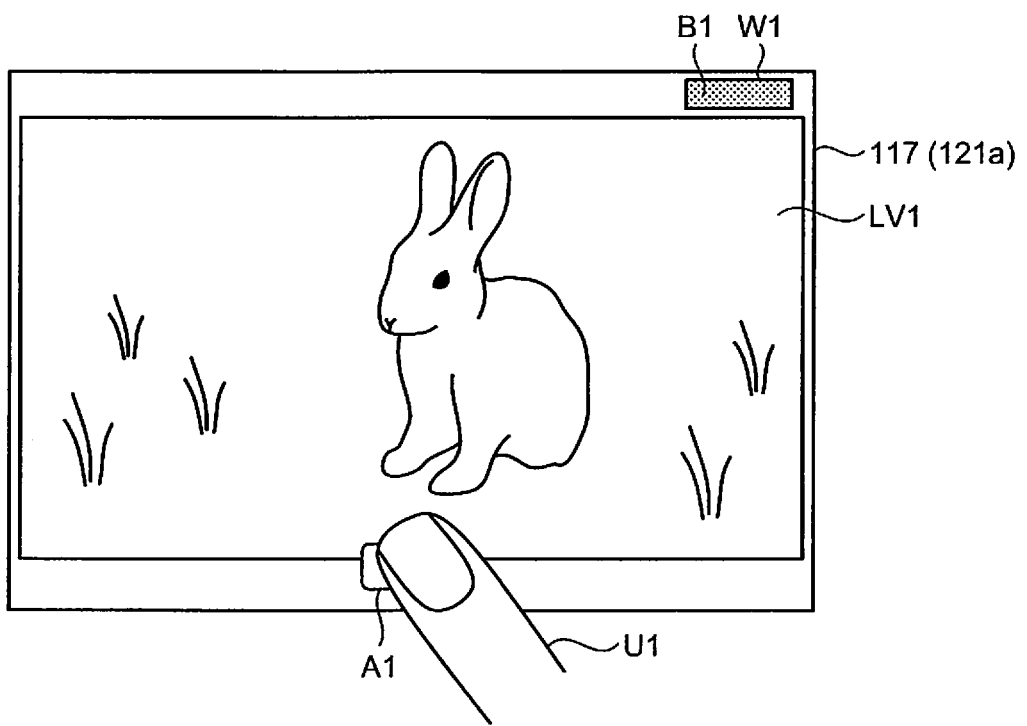
FIG. 2D is a schematic diagram for description of an outline of the operation process executed by the image apparatus according to the first embodiment.
Figure 3C:
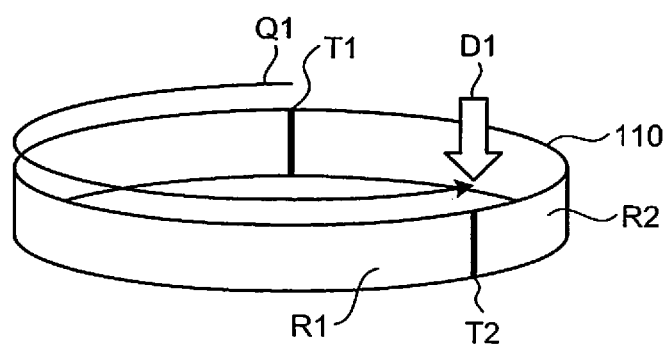
FIG. 3C is a diagram schematically illustrating the operation process when the image apparatus stores the image data in the memory according to the first embodiment.
Figure 3D:
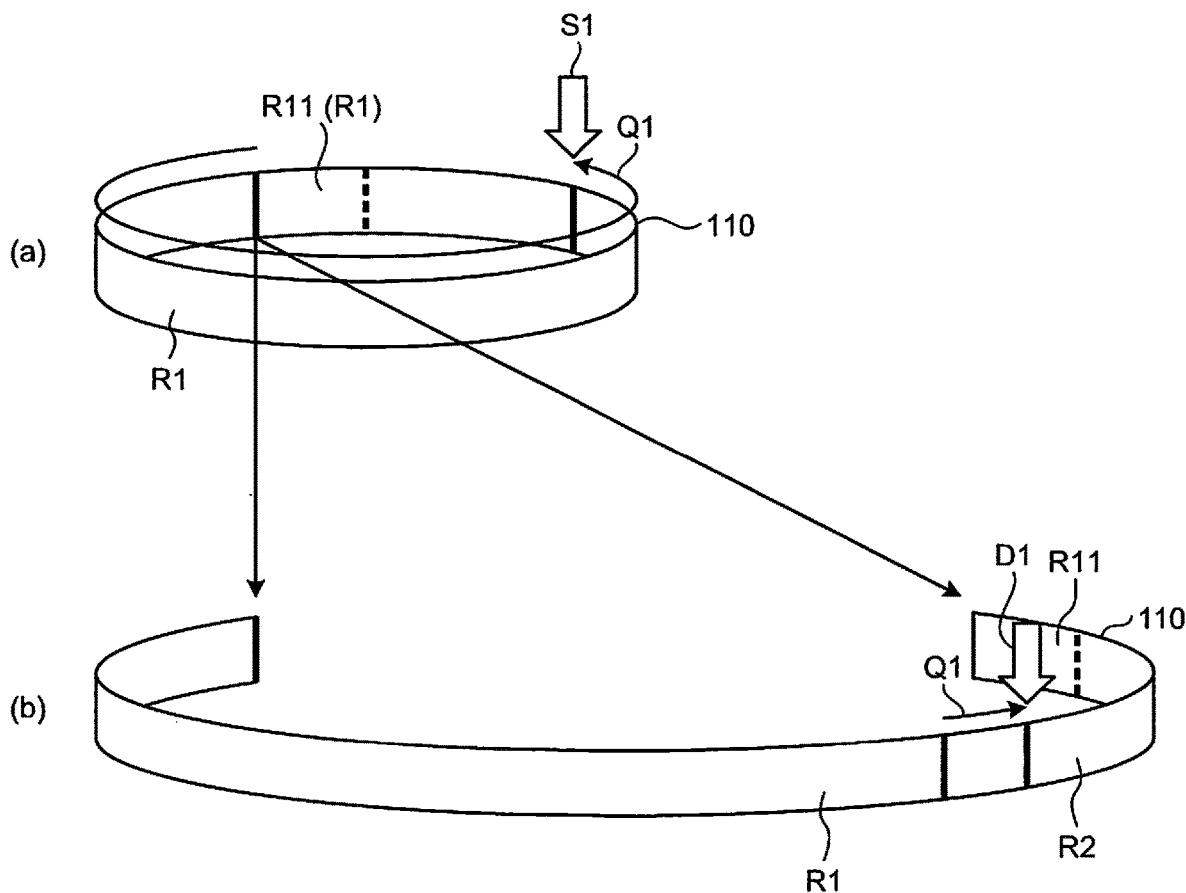
FIG. 3D is a diagram schematically illustrating the operation process when the image apparatus stores the image data in the memory according to the first embodiment.
Figure 3E:
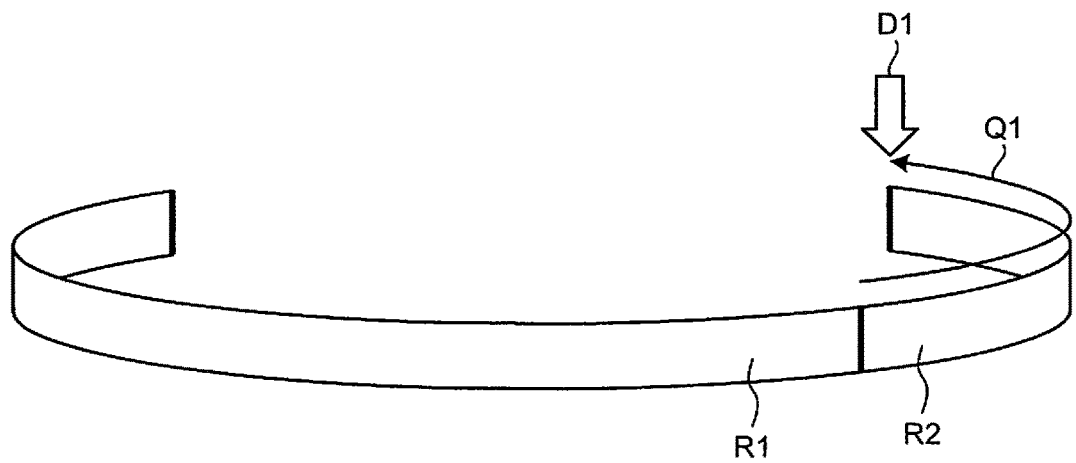
FIG. 3E is a diagram schematically illustrating the operation process when the image apparatus stores the image data in the memory according to the first embodiment.

Thereafter, as illustrated in FIG. 2D, the system controller 129 successively records the image data generated by the imaging element 107 in the memory 110 during a period in which the user continues to perform the touch operation on the icon A1. During this period, the system controller 129 fully displays the bar B1 on the pre-release buffer information W1 when the memory capacity corresponding to the specified capacity of the first storage area R1 in the memory 110 is filled. In this case, as illustrated in FIG. 3C and FIG. 3D (FIG. 3C and FIG. 3D), the system controller 129 controls the memory controller 127 to maintain a state in which a plurality of pieces of image data corresponding to the specified capacity of the first storage area R1 of the memory 110 is stored.

Figure 2E:
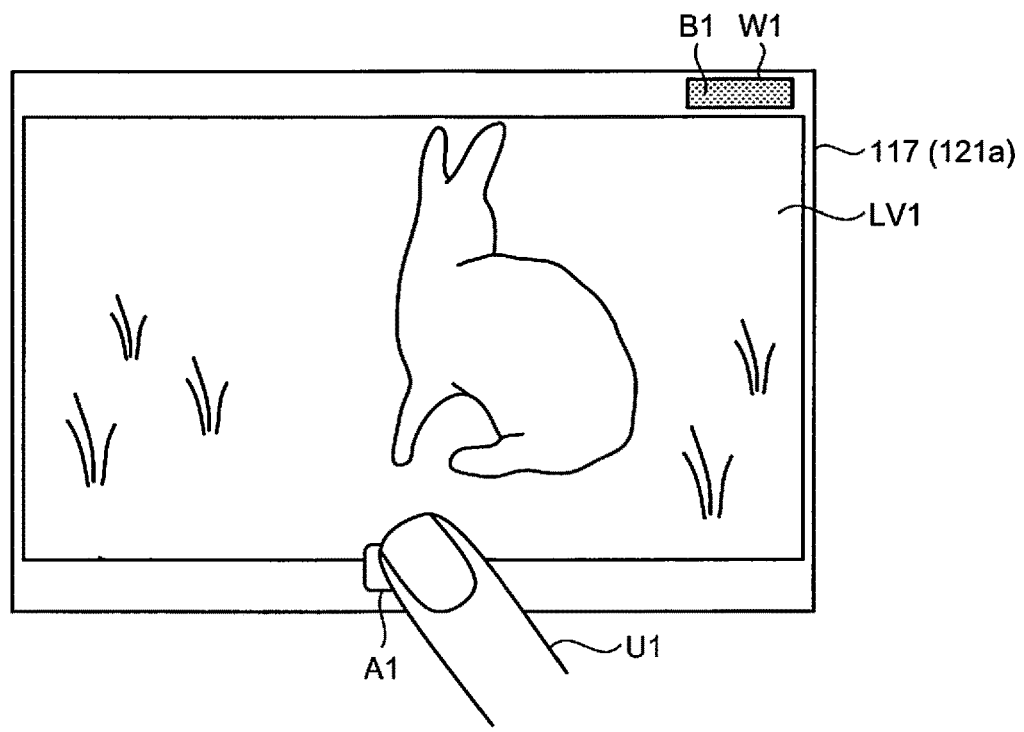
FIG. 2E is a schematic diagram for description of an outline of the operation process executed by the image apparatus according to the first embodiment.

Subsequently, as illustrated in FIG. 2E, in a case where all the memory capacity corresponding to the specified capacity of the first storage area R1 by the ring buffer format in the memory 110 is filled, when the user continues to perform the touch operation on the icon A1, each time the imaging element 107 generates image data, the system controller 129 may store the latest image data by releasing the oldest image data stored in the memory area corresponding to the specified capacity of the first storage area R1 of the memory 110 as an empty area. Specifically, as illustrated in (a) of FIG. 3D, the system controller 129 controls the memory controller 127 so that each time the imaging element 107 generates image data, the latest image data may be stored by releasing the oldest image data stored in the memory area corresponding to the specified capacity of the first storage area R1 of the memory 110 as an empty area, and the memory capacity corresponding to the specified capacity of the first storage area R1 of the memory 110 is maintained constant.

Figure 2F:
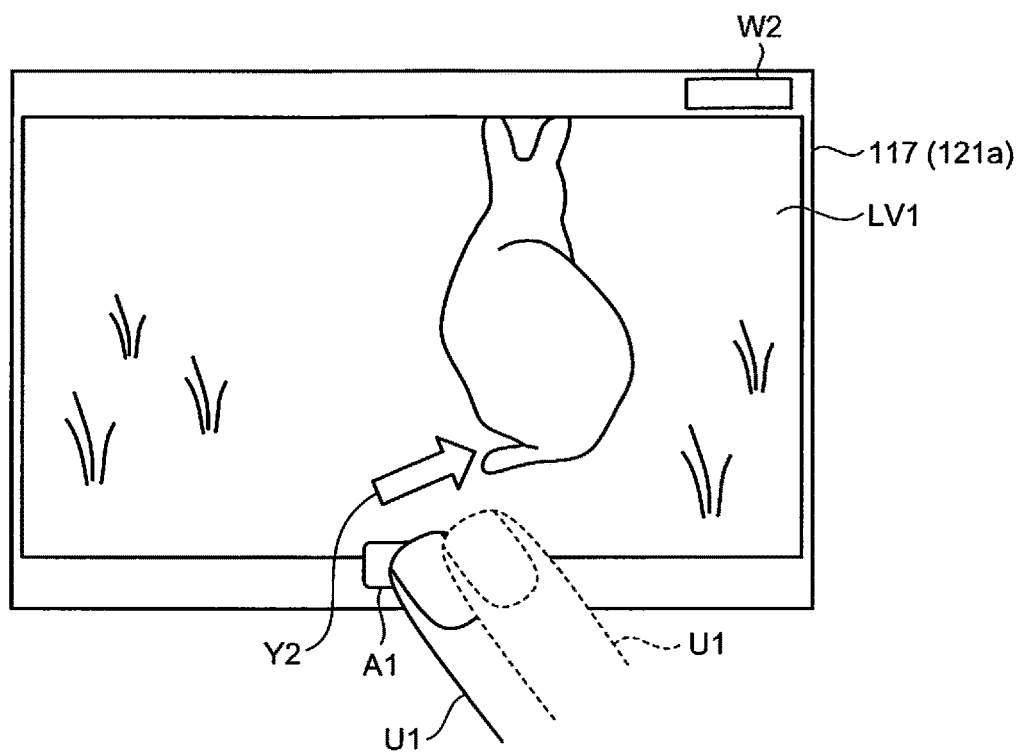
FIG. 2F is a schematic diagram for description of an outline of the operation process executed by the image apparatus according to the first embodiment.
Figure 2G:
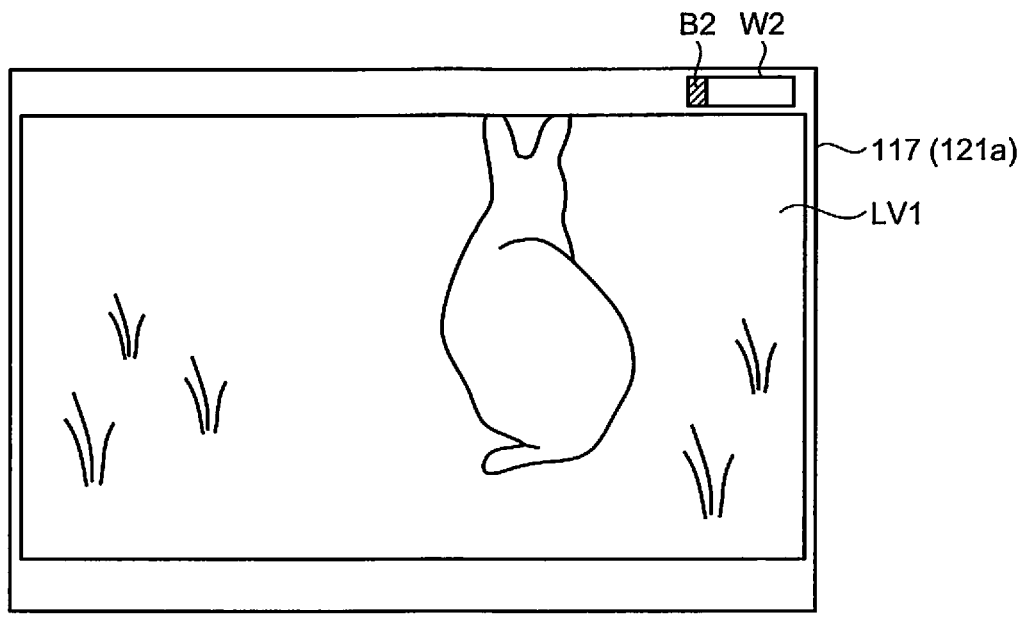
FIG. 2G is a schematic diagram for description of an outline of the operation process executed by the image apparatus according to the first embodiment.

Thereafter, as illustrated in FIG. 2F, in a case where the user performs a touch release operation for separating the finger U1 from the icon A1 (arrow Y2), when a shooting command signal is input from the touch operation unit 121a, the system controller 129 controls the memory controller 127 to switch the storage format of the memory 110 from the ring buffer format corresponding to the first storage format to the sequential buffer format corresponding to the second storage format, uses an empty area other than the specified capacity of the first storage area R1 of the memory 110 as a second storage area R2, and causes the display unit 117 to display post-release buffer information W2 indicating a memory capacity of the shooting buffer after release (FIG. 2F and FIG. 2G). Specifically, as illustrated in (b) of FIG. 3D, the system controller 129 switches the storage format of the memory 110 from the ring buffer format to the sequential buffer format, and successively stores the latest image data D1 successively generated by the imaging element 107 in the second storage area R2 of the sequential buffer format. In this case, as illustrated in FIG. 3D, when an empty area R11 is present in the first storage area R1 and the shooting command signal is input from the touch operation unit 121a, the system controller 129 assigns image data to be successively stored in the empty area R11 of the first storage area R1 after the image data is successively stored in the second storage area R2 of the sequential buffer format.

Figure 2H:
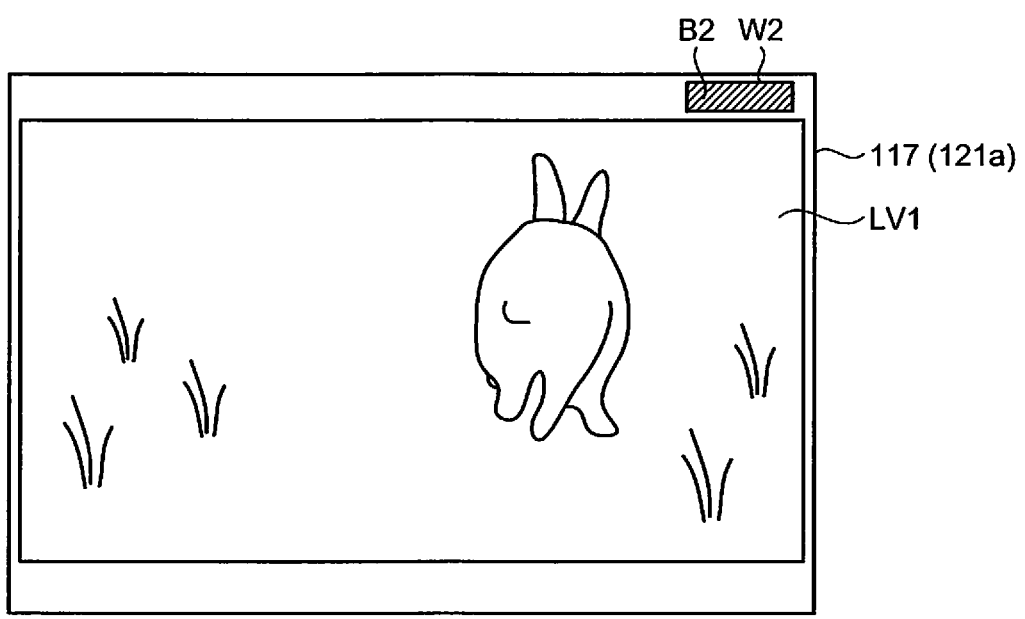
FIG. 2H is a schematic diagram for description of an outline of the operation process executed by the image apparatus according to the first embodiment.

Subsequently, as illustrated in FIG. 2H, the system controller 129 causes the imaging element 107 to successively generate image data until the memory capacity (second storage area R2±empty area R11) assigned as the sequential buffer format of the memory 110 becomes full. In this instance, each time the imaging element 107 generates image data, the system controller 129 increases a memory state of the post-release buffer information W2 (FIG. 2G and FIG. 2H). Then, as illustrated in FIG. 2E, when the memory capacity of the sequential buffer format of the memory 110 becomes full, the system controller 129 switches the state of the imaging element 107 from the shooting state to the shooting standby state by controlling the imaging controller 108. Thereafter, the system controller 129 records a plurality of pieces of image data stored in the memory 110 in at least one of the first external memory 115 and the second external memory 116.

Figure 2I:
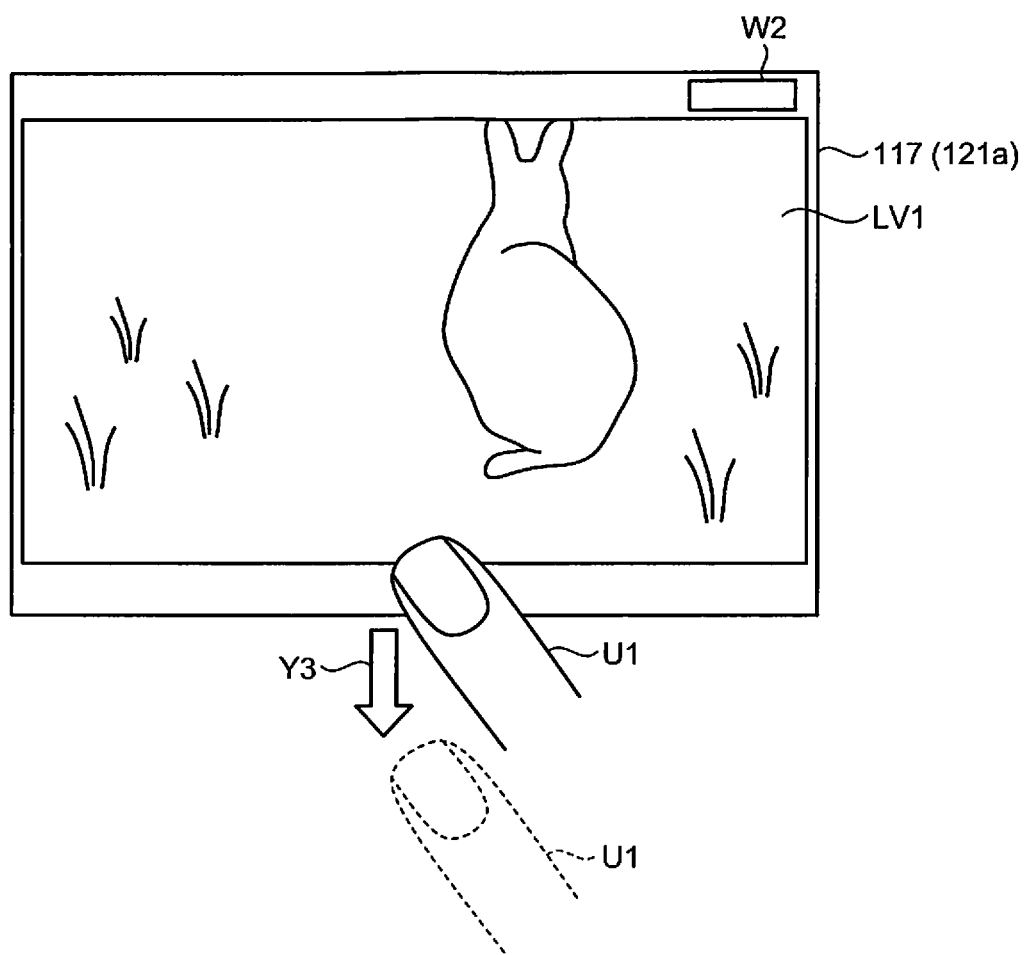
FIG. 2I is a schematic diagram for description of an outline of the operation process executed by the image apparatus according to the first embodiment.

In addition, in a situation illustrated in FIG. 2C, as illustrated in FIG. 2I, when the user performs a slide operation of moving a touch position to the outside of the touch operation unit 121*a* by performing a slide operation while continuously moving the touch position from the touch operation unit 121*a* over time (arrow Y3), or a flick operation of moving the touch position to the outside of the touch operation unit 121*a*, the system controller 129 switches the state of the imaging element 107 from the shooting preparation state to the shooting standby state by controlling the imaging controller 108. Further, the system controller 129 deletes the plurality of pieces of image data successively generated by the imaging element 107 in the shooting preparation state and stored in the memory 110.

As described above, according to the image apparatus 100, when the user performs the touch operation on the touch operation unit 121*a*, the system controller 129 switches the imaging element 107 from the shooting standby state to the shooting preparation state, and successively stores the image data successively generated by the imaging element 107 in the ring buffer of the memory 110 in time series. Further, when the user performs the touch release operation for separating the finger from the touch operation unit 121*a*, the image apparatus 100 switches the memory 110 from the ring buffer format to the sequential buffer format, and successively generates image data in the imaging element 107 until the memory capacity of the memory 110 is full with the image data successively generated by the imaging element 107. In this way, the imaging element 107 successively generates image data until the memory capacity of the memory 110 is full merely by the user separating the touch from the touch operation unit 121*a*, and thus it is possible to reduce shake of the image due to the touch operation of the user.

Process of Image Apparatus

Figure 4:
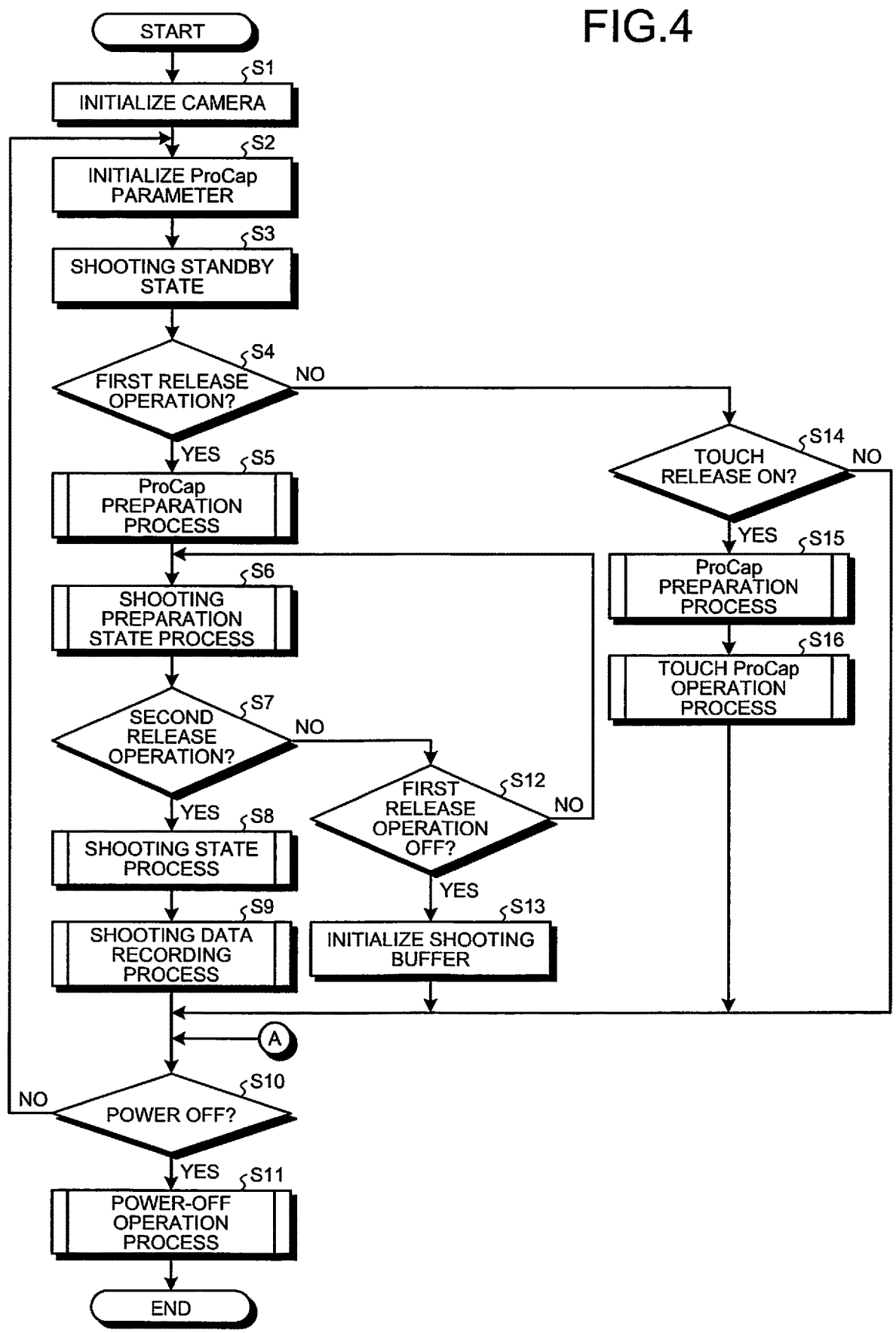
FIG. 4 is a flowchart illustrating an outline of processing executed by the image apparatus according to the first embodiment.

Next, a description will be given of a process executed by the image apparatus 100. FIG. 4 is a flowchart illustrating an outline of the process executed by the image apparatus 100. In FIG. 4, a description will be given of a case where the shooting mode of the image apparatus 100 is set to the ProCapture mode.

As illustrated in FIG. 4, first, when the power of the image apparatus 100 is in an ON state, the system controller 129 determines initialization of the image apparatus 100 and the shooting mode (Step S1).

Subsequently, the system controller 129 initializes a Pro-Cap parameter in the ProCapture mode (Step S2). Specifically, the system controller 129 sets the number of shots before release to A (A=integer greater than or equal to 1), sets the number of shots after release to B (B=integer greater than or equal to 1), sets a shooting speed to α sheets/Sec, sets the number of actually captured images in the shooting preparation state to n sheets (n=integer greater than or equal to 1), sets the number of actually captured images in the shooting state to m sheets (m=integer greater than or equal to 1), and sets image data F(n) before release and image data G(m) after release as initialization of the ProCap parameter.

Thereafter, the system controller 129 transitions the state of the image apparatus 100 to the shooting standby state (Step S3). Specifically, the system controller 129 controls the imaging controller 108 to cause the imaging element 107 to generate live view image data in the second drive mode, and causes the display unit 117 to display a live view image corresponding to the live view image data generated by the imaging element 107.

Subsequently, when the user performs a first release operation for half-pressing the release operation unit 121*c* of the operation unit 121 (Step S4: Yes), the image apparatus 100 proceeds to Step S5 described later. On the other hand, when the user does not perform the first release operation for half-pressing the release operation unit 121*c* of the operation unit 121 (Step S4: No), the image apparatus 100 proceeds to Step S14 described later.

In Step S5, the image apparatus 100 executes the ProCap preparation process for performing shooting in the ProCapture mode.

ProCap Preparation Process

Figure 5:
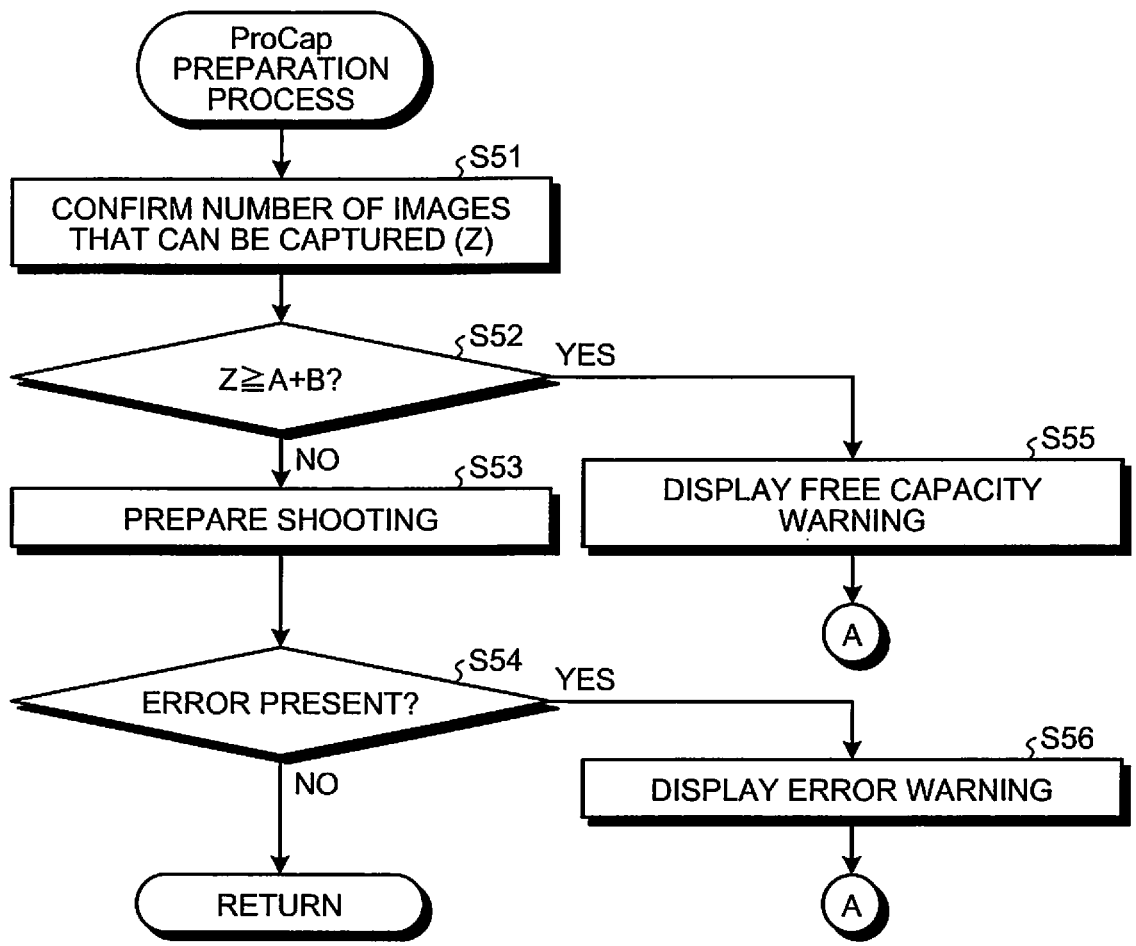
FIG. 5 is a flowchart illustrating an outline of a ProCap preparation process according to the first embodiment.

Next, a description will be given of an outline of the ProCap preparation process of Step S5 in FIG. 4 described above. FIG. 5 is a flowchart illustrating the outline of the ProCap preparation process.

As illustrated in FIG. 5, the system controller 129 confirms the number of captured images (Z) that may be recorded in the memory capacity of the first external memory 115 or the second external memory 116 (hereinafter simply referred to as the number of captured images (Z)) (Step S51).

Subsequently, when the number of captured images (Z) is smaller than the sum of the number A of captured images before release and the number B of captured images after release (Z<A+B) (Step S52: Yes), the system controller 129 causes the display unit 117 to display a free capacity warning indicating that there is an insufficient free capacity for recording image data generated in the ProCapture mode with respect to the memory capacity of the first external memory 115 or the second external memory 116 (Step S55). After Step S55, the image apparatus 100 returns to a main routine of FIG. 4 and proceeds to Step S10.

When the number of captured images (Z) is not smaller than the sum of the number A of captured images before release and the number B of captured images after release (Z≥A+B) in Step S52 (Step S52: No), the system controller 129 prepares for shooting for shooting the subject (Step S53). For example, the system controller 129 causes the exposure controller 112 to execute AE processing and causes the AF processor 113 to execute AF processing. Naturally, the system controller 129 may adjust white balance or confirm cooperation of the optical system 101.

Subsequently, the system controller 129 determines whether or not an error occurs in the image apparatus 100 (Step S54). For example, in a case where AF processing by the AF processor 113 is out of focus, in a case where a temperature of the image apparatus 100 is a warning temperature, and in a case where an error occurs in communication with the optical system 101, when processing of another shooting performed immediately before is not competed, and there is no free capacity of the memory 110, the system controller 129 determines that an error occurs in the image apparatus 100. When the system controller 129 determines that an error occurs in the image apparatus 100 (Step S54: Yes), the image apparatus 100 proceeds to Step S56 described later. On the other hand, when the system controller 129 determines that no error occurs in the image apparatus 100 (Step S54: No), the image apparatus 100 returns to the main routine of FIG. 4 and proceeds to Step S6.

In Step S56, the system controller 129 causes the display unit 117 to display an error warning indicating that an error occurs in the image apparatus 100. After Step S56, the image apparatus 100 returns to the main routine of FIG. 4 and proceeds to Step S10.

Returning to FIG. 4, description of Step S6 and subsequent steps will be continued.

In Step S6, the image apparatus 100 executes a shooting preparation state process for successively storing image data successively generated by the imaging element 107 in the ring buffer of the memory 110.

Shooting Preparation State Process

Figure 6:
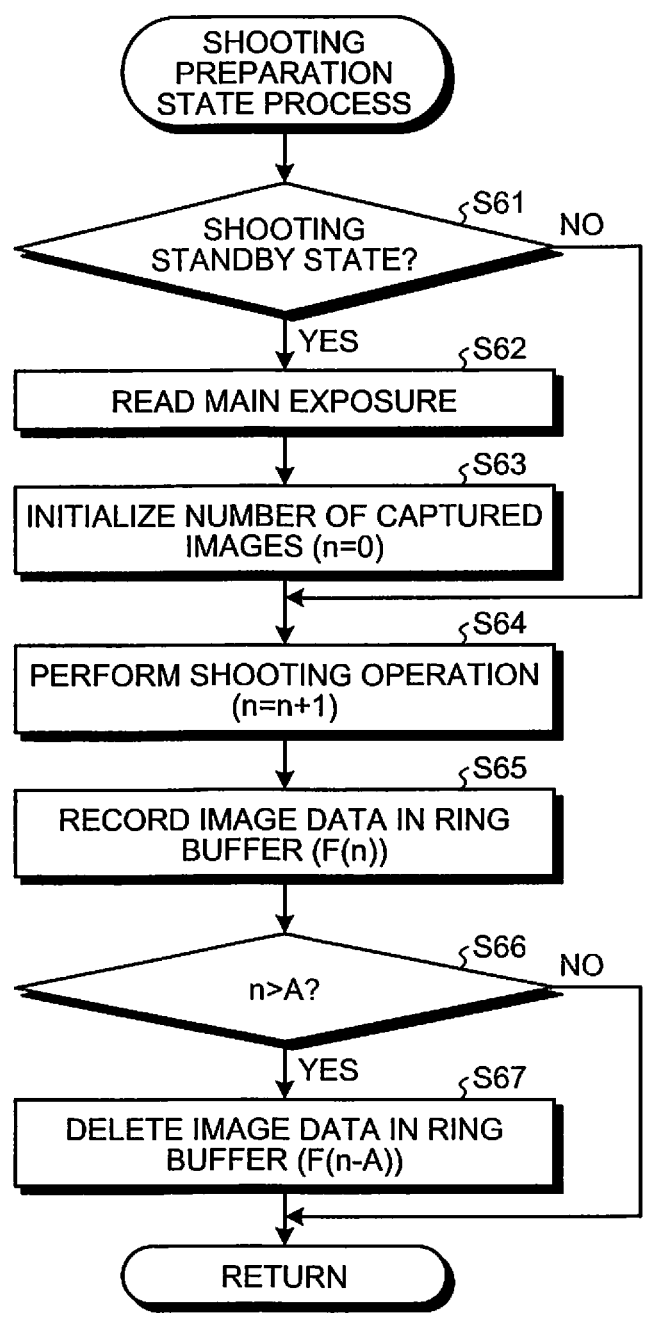
FIG. 6 is a flowchart illustrating an outline of a shooting preparation state process according to the first embodiment.

Next, a description will be given of an outline of the shooting preparation state process of Step S6 in FIG. 4 described above. FIG. 6 is a flowchart illustrating the outline of the shooting preparation state process.

As illustrated in FIG. 6, when the state of the image apparatus 100 corresponds to the shooting standby state (Step S61: Yes), the image apparatus 100 proceeds to Step S62 described later. On the other hand, when the state of the image apparatus 100 does not correspond to the shooting standby state (Step S61: No), the image apparatus 100 proceeds to Step S64 described later.

In Step S62, the system controller 129 controls the imaging controller 108 to switch the drive mode of the imaging element 107 from the second drive mode to the first drive mode, thereby switching to a main exposure reading format for reading image signals from all pixels in the effective area of the imaging element 107.

Subsequently, the system controller 129 initializes the number of captured images (n=0) (Step S63).

Thereafter, the system controller 129 controls the imaging controller 108 to cause the imaging element 107 to perform a shooting operation (n=n+1) to generate image data (Step S64), and stores the image data generated by the imaging element 107 in the ring buffer (F(n)) of the memory 110 (Step S65).

Subsequently, the system controller 129 determines whether or not the number n of images captured by the imaging element 107 exceeds the number A of captured images before release (Step S66). When the system controller 129 determines that the number n of images captured by the imaging element 107 exceeds the number A of captured images before release (n>A) (Step S66: Yes), the image apparatus 100 proceeds to Step S67 described later. On the other hand, when the system controller 129 determines that the number n of images captured by the imaging element 107 does not exceed the number A of captured images before release (n≤A) (Step S66: No), the image apparatus 100 returns to the main routine of FIG. 4 and proceeds to Step S7.

In Step S67, the system controller 129 deletes the image data in the ring buffer (F(n−A)) of the memory 110 (Step S67). Specifically, the system controller 129 deletes the oldest image data stored in the ring buffer of the memory 110 from the memory 110, and uses the corresponding capacity as an empty area. After Step S67, the image apparatus 100 returns to the main routine of FIG. 4 and proceeds to Step S7.

Returning to FIG. 4, description of Step S7 and subsequent steps will be continued.

In Step S7, when the user performs a second release operation for fully pressing the release operation unit 121c (Step S7: Yes), the image apparatus 100 proceeds to Step S8 described later. On the other hand, when the user does not perform the second release operation for fully pressing the release operation unit 121c (Step S7: No), the image apparatus 100 proceeds to Step S12 described later.

In Step S8, the image apparatus 100 executes a shooting state process for switching the storage format of the memory 110 from the ring buffer format (first storage format) to the sequential buffer format (second storage format) and storing image data corresponding to a predetermined number.

Shooting State Process

Figure 7:
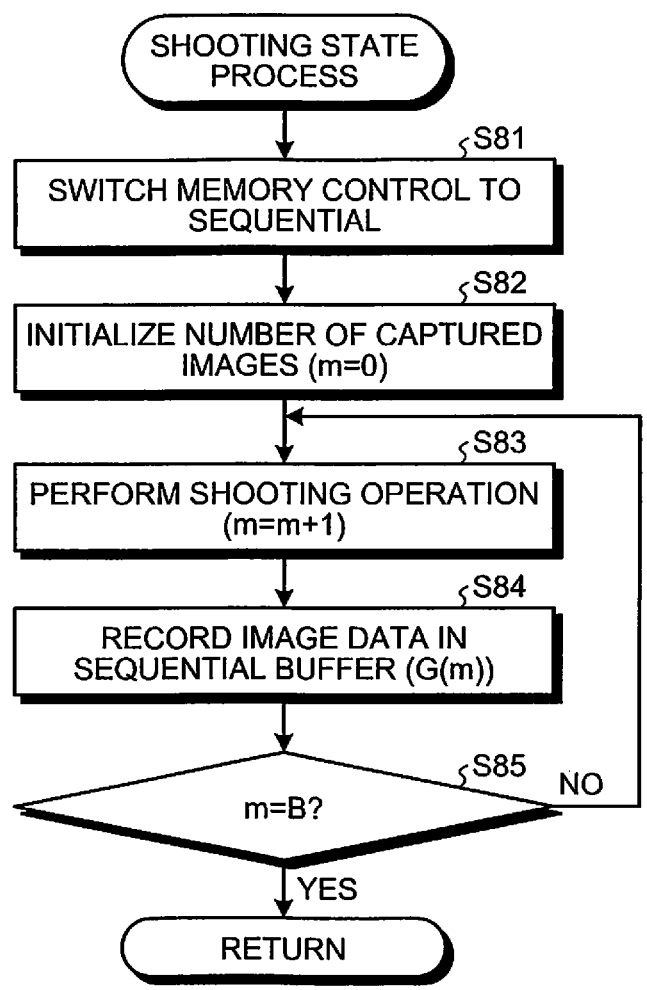
FIG. 7 is a flowchart illustrating an outline of a shooting state process according to the first embodiment.

Next, a description will be given of an outline of the shooting state process of Step S8 in FIG. 4 described above. FIG. 7 is a flowchart illustrating the outline of the shooting state process.

As illustrated in FIG. 7, the system controller 129 controls the memory controller 127 to switch the storage format of the memory 110 from the ring buffer format to the sequential buffer format (Step S81), and initializes the number of captured images (m=0) (Step S82).

Subsequently, the system controller 129 controls the imaging controller 108 to cause the imaging element 107 to perform a shooting operation (m=m+1), thereby generating image data (Step S83), and stores the image data generated by the imaging element 107 in a sequential buffer (G(m)) of the memory 110 (Step S84).

Subsequently, the system controller 129 determines whether or not the number m of captured images by the imaging element 107 is equal to the number B of captured images after release (Step S85). When the system controller 129 determines that the number m of captured images by the imaging element 107 is equal to the number B of captured images after release (m=B) (Step S85: Yes), the image apparatus 100 returns to the main routine of FIG. 4 and proceeds to Step S9. On the other hand, when the system controller 129 determines that the number m of captured images by the imaging element 107 is equal to the number B of captured images after release (m≠B) (Step S85: No), the image apparatus 100 returns to Step S83 described above.

Returning to FIG. 4, description of Step S9 and subsequent steps will be continued.

In Step S9, the image apparatus 100 executes a shooting data recording process for storing the plurality of pieces of image data stored in the memory 110 in the first external memory 115 or the second external memory 116.

Shooting Data Recording Process

Figure 8:
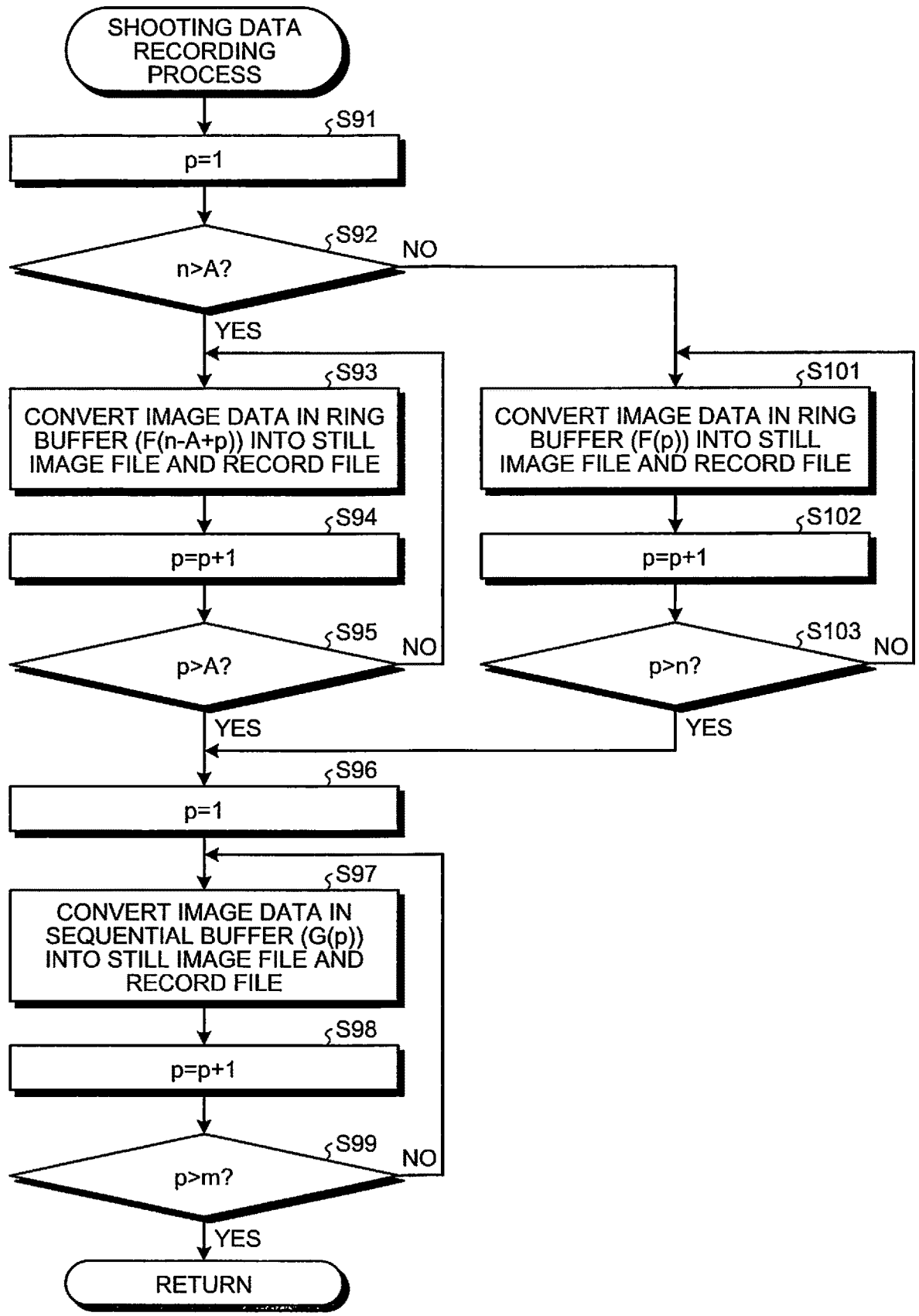
FIG. 8 is a flowchart illustrating an outline of a shooting data recording process according to the first embodiment.

Next, a detailed description will be given of a shooting data recording process of Step S9 in FIG. 4 described above. FIG. 8 is a flowchart illustrating an outline of the shooting data recording process.

As illustrated in FIG. 8, the system controller 129 sets a count value p of image data read from the ring buffer of the memory 110 to "1" (p=1) (Step S91).

Subsequently, the system controller 129 determines whether or not the number n of captured images of actually captured image data is greater than the set number A of captured images of image data (n<A) based on the number of pieces of image data recorded in the ring buffer of the memory 110 (Step S92). When the system controller 129 determines that the number n of captured images of actually captured image data is greater than the set number A of captured images of image data (Step S92: Yes), the image apparatus 100 proceeds to Step S93 described later. On the other hand, when the system controller 129 determines that the number n of captured images of actually captured image data is not greater than the set number A of captured images of image data (Step S92: No), the image apparatus 100 proceeds to Step S101 described later.

In Step S93, the system controller 129 converts image data in a ring buffer (F(n−A+p)) of the memory 110 into a still image file and records the file in the first external memory 115.

Subsequently, the system controller 129 increments the count value p for reading image data from the ring buffer of the memory 110 (p=p+1) (Step S94).

Thereafter, the system controller 129 determines whether or not the count value p for reading the image data from the ring buffer of the memory 110 is larger than the set number A of captured images of image data (p>A) (Step S95). When the system controller 129 determines that the count value p for reading image data from the ring buffer of the memory 110 is larger than the set number A of captured images of image data (Step S95: Yes), the image apparatus 100 proceeds to Step S96 described later. On the other hand, when the system controller 129 determines that the count value p for reading image data from the ring buffer of the memory 110 is not larger than the set number A of captured images of image data (Step S95: No), the image apparatus 100 returns to Step S93 described above.

In Step S96, the system controller 129 sets "1" as the count value p of the image data read from the sequential buffer of the memory 110 (p=1).

Subsequently, the system controller 129 converts the image data in the sequential buffer (G(p)) of the memory 110 into a still image file and records the file in the first external memory 115 (Step S97).

Thereafter, the system controller 129 increments the count value p for reading image data from the sequential buffer of the memory 110 (p=p+1) (Step S98).

Thereafter, the system controller 129 determines whether or not the count value p for reading the image data from the sequential buffer of the memory 110 is larger than the set number m of captured images of the image data (p>m) (Step S99). When the system controller 129 determines that the count value p for reading the image data from the sequential buffer of the memory 110 is larger than the set number m of captured images of the image data (Step S99: Yes), the image apparatus 100 returns to the main routine of FIG. 4 and proceeds to Step S10. On the other hand, when the system controller 129 determines that the count value p for reading the image data from the sequential buffer of the memory 110 is not larger than the set number m of captured images of the image data (Step S99: No), the image apparatus 100 returns to Step S97 described above.

In Step S101, the system controller 129 converts the image data in the ring buffer (F(p)) of the memory 110 into a still image file and records the file in the first external memory 115.

Subsequently, the system controller 129 increments the count value p for reading image data from the ring buffer of the memory 110 (p=p+1) (Step S94).

Thereafter, the system controller 129 determines whether or not the count value p for reading the image data from the ring buffer of the memory 110 is larger than the number n of captured images of the captured image data (p>n) (Step S95). When the system controller 129 determines that the count value p for reading the image data from the ring buffer of the memory 110 is larger than the number n of captured images of the captured image data (Step S103: Yes), the image apparatus 100 proceeds to Step S96. On the other hand, when the system controller 129 determines that the count value p for reading the image data from the ring buffer of the memory 110 is not larger than the number n of captured images of the captured image data (Step S103: No), the image apparatus 100 returns to Step S101 described above.

Returning to FIG. 4, description of Step S10 and subsequent steps will be continued.

In Step S10, when the image apparatus 100 is powered OFF (Step S10: Yes), the system controller 129 executes a power-off operation for setting various parameters set in the image apparatus 100 to an initial state (Step S11). After Step S11, the image apparatus 100 ends this process. On the other hand, when the image apparatus 100 is not powered OFF (Step S10: No), the image apparatus 100 returns to Step S2 described above.

In Step S12, when the user turns OFF the first release operation by separating the finger from the release operation unit 121c of the operation unit 121 (Step S12: Yes), the system controller 129 executes initialization for deleting a shooting buffer of the image data stored in the memory 110 (Step S13). After Step S13, the image apparatus 100 proceeds to Step S10. On the other hand, when the user does not turn OFF the first release operation by separating the finger from the release operation unit 121c of the operation unit 121 (Step S12: No), the image apparatus 100 returns to Step S6 described above.

In Step S14, when the touch release (first signal for commanding shooting preparation by the touch operation) is put in an ON state by the user touching the touch operation unit 121a (Step S14: Yes), the image apparatus 100 execute the ProCap preparation process of FIG. 5 described above (Step S15). After Step S15, the image apparatus 100 proceeds to Step S16 described later. On the other hand, when the touch release is not put in an ON state by the user touching the touch operation unit 121a (Step S14: No), the image apparatus 100 proceeds to Step S10.

Subsequently, the image apparatus 100 executes the touch ProCap operation process for causing the imaging element 107 to successively generate image data according to a touch operation of the user and successively storing the generated image data in the memory 110 (Step S16).

Touch ProCap Operation Process

Figure 9:
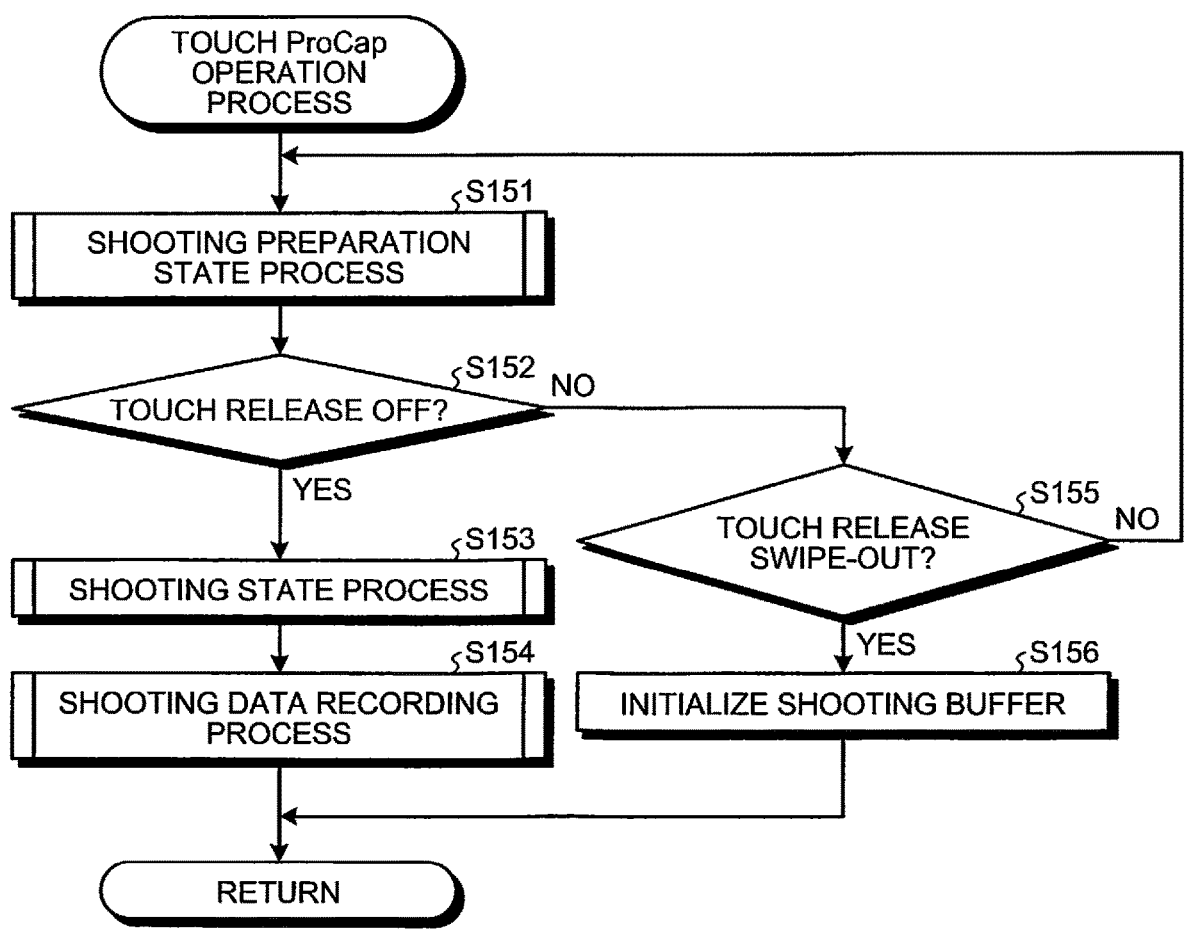
FIG. 9 is a flowchart illustrating an outline of a touch ProCap operation process according to the first embodiment.

Next, a description will be given of the touch ProCap operation process of Step S16 of FIG. 4 described above. FIG. 9 is a flowchart illustrating an outline of the touch ProCap operation process.

As illustrated in FIG. 9, the image apparatus 100 executes the shooting preparation state process for successively storing image data successively generated by the imaging element 107 in the ring buffer of the memory 110 (Step S151). Note that the shooting preparation state process is similar to processing of FIG. 6 described above. For this reason, detailed description of the shooting preparation state process is omitted.

Subsequently, the system controller 129 determines, based on a touch signal input from the touch operation unit 121a, whether or not the touch release is put in an OFF state by the user separated from the touch operation unit 121a (Step S152). Specifically, the system controller 129 determines whether or not the input of the touch signal indicating a touch position from the touch operation unit 121a is suspended by user separated from the touch operation unit 121a (release operation for releasing the touch operation). When the system controller 129 determines that the touch release is in the OFF state (Step S152: Yes), the image apparatus 100 proceeds to Step S153 described later. On the other hand, when the system controller 129 determines that the touch release is not in the OFF state (Step S152: No), the image apparatus 100 proceeds to Step S155 described later.

In Step S153, the image apparatus 100 executes the shooting state process for switching the storage format of the memory 110 from the ring buffer format to the sequential buffer format and storing image data corresponding to a predetermined number. Note that the shooting state process is similar to processing of FIG. 7 described above. For this reason, detailed description of the shooting state process is omitted.

Subsequently, the image apparatus 100 executes the shooting data recording process for storing the plurality of pieces of image data stored in the memory 110 in the first external memory 115 or the second external memory 116 (Step S154). Note that the shooting data recording process is similar to processing of FIG. 8 described above. For this reason, detailed description of the shooting data recording process is omitted. After Step S154, the image apparatus 100 returns to the main routine of FIG. 4 and proceeds to Step S10.

In Step S155, the system controller 129 determines whether or not the user performs a swipe-out for moving out of the display area of the display unit 117 while swiping the touch from the touch operation unit 121a based on a touch signal input from the touch operation unit 121a. Specifically, the system controller 129 determines whether or not the user moves the touch position from the touch position at which the touch operation unit 121a is touched to the outside of the display area of the display unit 117 over time based on the touch signal indicating the touch position input from the touch operation unit 121a. When the system controller 129 determines that the user performs the swipe-out after the touch operation (Step S155: Yes), the image apparatus 100 proceeds to Step S156 described later. On the other hand, when the system controller 129 determines that the user does not perform the swipe-out after the touch operation (Step S155: No), the image apparatus 100 proceeds to Step S151 described above.

In Step S156, the system controller 129 executes initialization to delete the shooting buffer of the image data stored in the memory 110 (Step S156). In other words, the system controller 129 suspends shooting by deleting the image data stored in each of the first storage area and the second storage area of the memory 110. After Step S156, the image apparatus 100 returns to the main routine of FIG. 4 and proceeds to Step S10.

According to the first embodiment described above, since the functions (1) to (4) described above may be realized by a single contact with the touch operation unit 121a, it is possible to reduce an increase in shake of the image apparatus 100 due to a plurality of touch operations. In addition, a touch-up operation is easy to take operation timing due to simple operability, and has the effect of reducing erroneous operations.

Further, according to the first embodiment, the touch operation unit 121a outputs the second signal at the timing when the user is separated from the touch position touched by the finger. Therefore, a "transition operation from the shooting preparation state to a shooting recording state", which is most important for timing, is this operation of "separating the finger", and thus there is an effect that occurrence of erroneous operations is reduced and a desired timing may be taken.

Further, according to the first embodiment, when the first signal is input from the touch operation unit 121a to the system controller 129, image data successively generated by the imaging element 107 is successively stored in the first storage area R1 of the memory 110 by the ring buffer format corresponding to the first storage format. Further, when the second signal is input from the touch operation unit 121a, image data successively generated by the imaging element 107 is stored in the second storage area R2 of the memory 110 by the sequential buffer format corresponding to the second storage format. Thus, there is an effect that occurrence of shake on the captured image by the touch operation is reduced while shooting is continued.

Further, according to the first embodiment, the operation of separating the finger may reduce shake due to impact applied to a main body of the image apparatus 100 when compared to an operation of touching with the finger. Thus, there is an effect that occurrence of shake on the captured image by the touch operation is reduced while shooting is continued.

Further, according to the first embodiment, the system controller 129 drives the imaging element 107 in the first drive mode when at least one of the first signal and the second signal is input from the touch operation unit 121a, and drives the imaging element 107 in the second drive mode when the first signal and the second signal are not input from the touch operation unit 121a. Thus, even though it is the shooting preparation state that requires a certain amount of time to take timing, a high heat generation state associated with the first drive mode corresponding to a main exposure state continues in an operation system in which the state may be easily fixed. However, an operation system from touch-down to touch-up has an effect that such easy state fixing is reduced.

First Modification of First Embodiment

Next, a first modification of the first embodiment will be described. The first modification of the first embodiment has a similar configuration to that the image apparatus 100 according to the first embodiment described above, and is different in the touch ProCap operation process executed by the image apparatus. Specifically, in the first modification of the first embodiment, when the user keeps touching the touch operation unit 121a for a predetermined time, initialization is performed to delete a plurality of pieces of image data stored in the memory 110, and the shooting preparation state process is ended to suspend the shooting operation in the ProCapture mode. Hereinafter, a description will be given of a shooting preparation state process and a ProCap operation process according to the first modification of the first embodiment. Note that the same components as those of the image apparatus 100 according to the first embodiment described above are denoted by the same reference numerals, and detailed description thereof is omitted.

Shooting Preparation State Process

Figure 10:
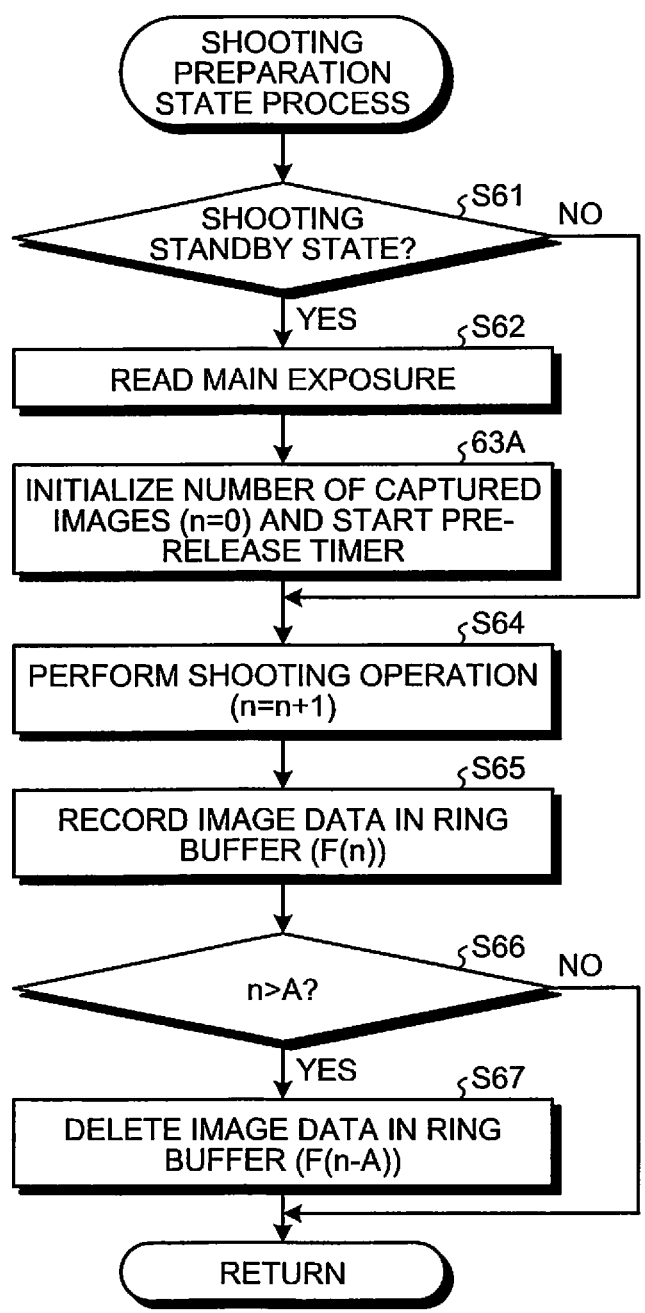
FIG. 10 is a flowchart illustrating an outline of a shooting preparation state process according to a first modification of the first embodiment.

First, a description will be given of the shooting preparation state process executed by an image apparatus according to the first modification of the first embodiment. FIG. 10 is a flowchart illustrating an outline of the shooting preparation state process according to the first modification of the first embodiment. In FIG. 10, the image apparatus 100 executes Step S63A instead of Step S63 in FIG. 6 described above.

In Step S63A, the system controller 129 initializes the number of captured images (n=0) and starts clocking using a pre-release timer. After Step S63A, the image apparatus 100 proceeds to Step S64.

Touch ProCap Operation Process

Figure 11:
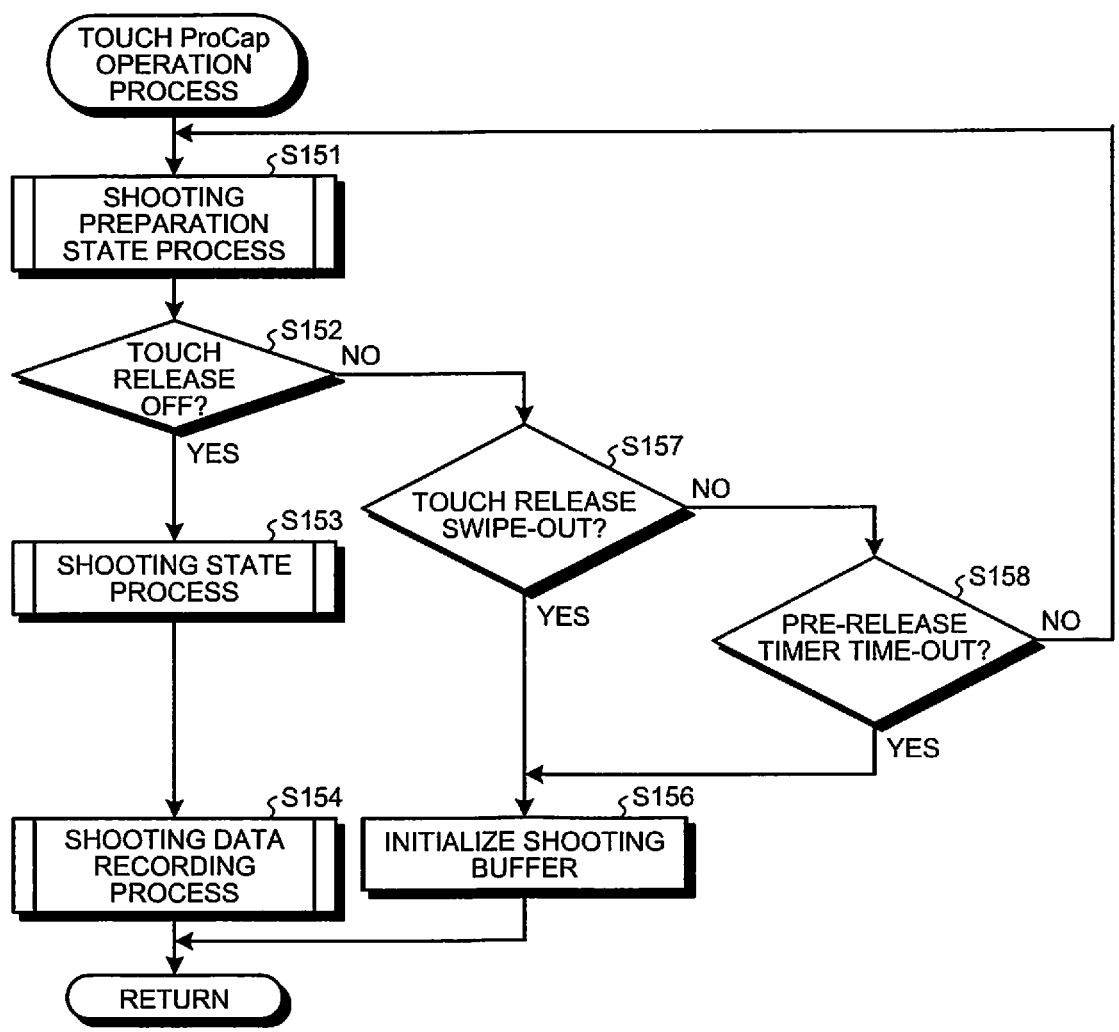
FIG. 11 is a flowchart illustrating an outline of a touch ProCap operation process according to the first modification of the first embodiment.

Next, a description will be given of the touch ProCap operation process executed by the image apparatus 100 according to the first modification of the first embodiment. FIG. 11 is a flowchart illustrating an outline of the touch ProCap operation process according to the first modification of the first embodiment. In FIG. 11, the image apparatus 100 executes Step S157 instead of Step S155 of FIG. 9 described above and executes Step S158. In the following, Step S157 and Step S158 will be described.

In Step S157, when the system controller 129 determines that the user performs touch release swipe-out (Step S157: Yes), the image apparatus 100 proceeds to Step S156. On the other hand, when the system controller 129 determines that the user does not perform the touch release swipe-out (Step S157: No), the image apparatus 100 proceeds to Step S158 described later.

In Step S158, the system controller 129 determines whether or not time-out of the pre-release timer, which starts clocking from when the touch operation unit 121a is touched, occurs since a predetermined time is exceeded based on clocking information input from the timer. When the system controller 129 determines that time-out of the pre-release timer, which starts clocking from when the touch operation unit 121a is touched, occurs since the predetermined time is exceeded (Step S158: Yes), the image apparatus 100 proceeds to Step S156. On the other hand, when the system controller 129 determines that time-out of the pre-release timer, which starts clocking from when the touch operation unit 121a is touched, does not occur without the predetermined time being exceeded (Step S158: No), the image apparatus 100 returns to Step S151.

According to the first modification of the first embodiment described above, a similar effect to that of the first embodiment described above is obtained. Further, the clocking unit 128 starts clocking when the first signal is input from the touch operation unit 121a, and the shooting preparation state process ends when a completion signal is input from the clocking unit 128 rather than the second signal is input from the touch operation unit 121a. Thus, unnecessary power consumption, heat generation, etc. is reduced by the image apparatus 100 automatically canceling the operation. Therefore, there is an effect that unnecessary heat generation etc. is reduced even when an unexpected touch state is continued (an unconscious object other than the finger is in contact etc.).

In the first modification of the first embodiment, the completion signal is output when a preset time is reached by the clocking unit 128 performing clocking. However, the disclosure is not limited thereto. For example, when the memory controller 127 counts the number of times of image capturing, and the number of times of image capturing reaches a preset number, the completion signal may be output. In this situation, in a case where the first signal is input from the system controller 129 and the touch operation unit 121a, the memory controller 127 starts counting. Further, when the completion signal is input from the memory controller 127 before the second signal is input from the touch operation unit 121a, image data may be successively stored in the second storage area by the second storage format. In the first modification of the first embodiment, the memory controller 127 may function as a counting unit.

Second Modification of First Embodiment

Next, a second modification of the first embodiment will be described. The second modification of the first embodiment has a similar configuration to that of the image apparatus 100 according to the first embodiment described above, and is different in the shooting data recording process executed by the image apparatus. Specifically, in the second modification of the first embodiment, a plurality of pieces of image data stored in the memory is recorded in the first external memory not as a still image file but as a moving image file. Hereinafter, a description will be given of a shooting data recording process executed by an image apparatus according to the second modification of the first embodiment. Note that the same components as those of the image apparatus 100 according to the first embodiment described above are denoted by the same reference numerals, and detailed description thereof is omitted.

Shooting Data Recording Process

Figure 12:
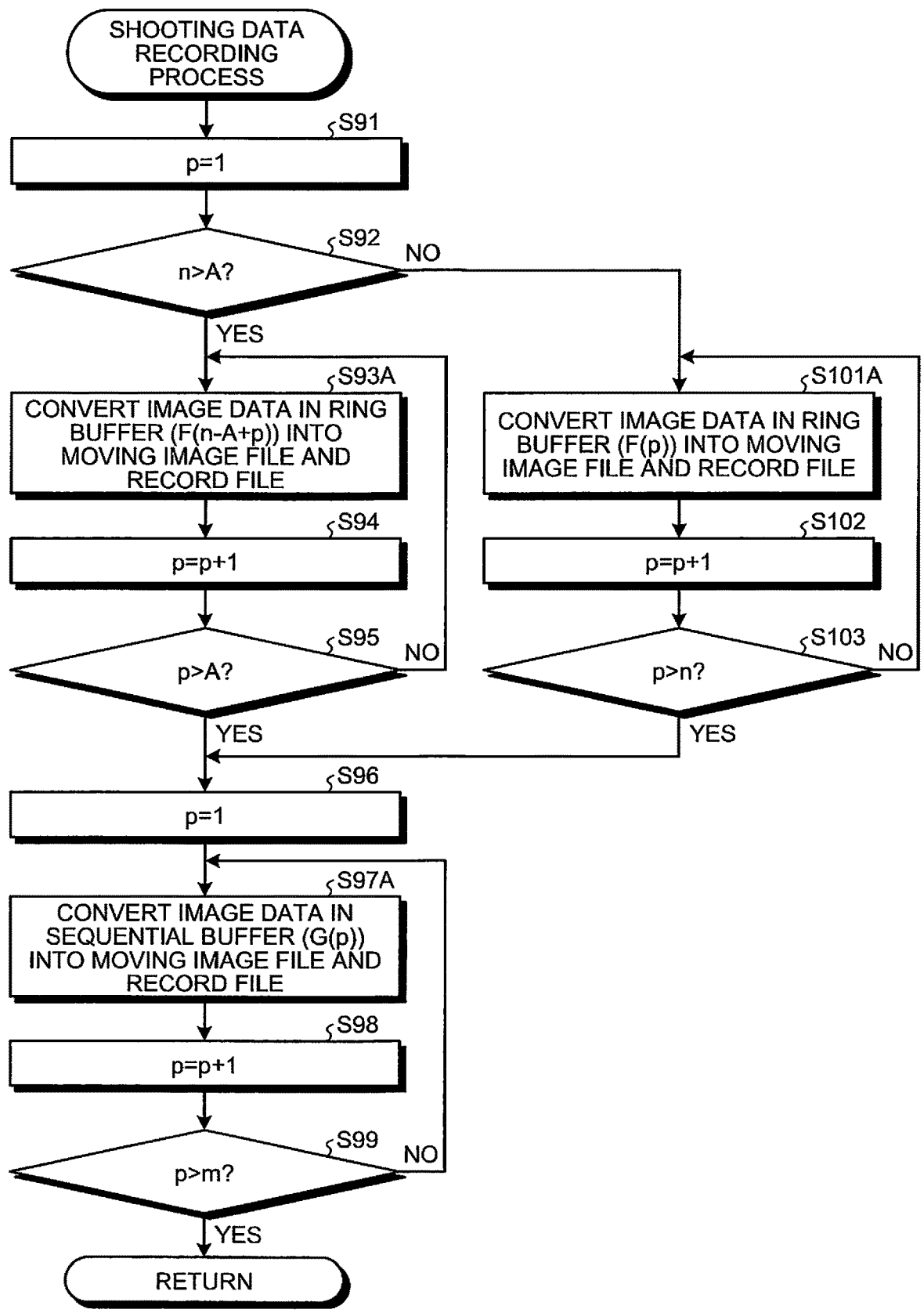
FIG. 12 is a flowchart illustrating an outline of a shooting data recording process according to a second modification of the first embodiment.

FIG. 12 is a flowchart illustrating an outline of the shooting data recording process according to the second modification of the first embodiment. In FIG. 12, the image apparatus 100 executes Step S93A, Step S97A, and Step S101A in place of Step S93, Step S97, and Step S101 of FIG. 8 described above. Hereinafter, Step S93A, Step S97A, and Step S101A will be described.

In Step S93A, the system controller 129 converts the image data into a moving image file in the ring buffer (F(n−A+p)) of the memory 110 and records the file in at least the first external memory 115 or the second external memory 116. After Step S93A, the image apparatus 100 proceeds to Step S94.

In Step S97A, the system controller 129 converts the image data into a moving image file in the sequential buffer (G(p)) of the memory 110 and records the file in at least the first external memory 115 or the second external memory 116. After Step S97A, the image apparatus 100 proceeds to Step S98.

In Step S101A, the system controller 129 converts the image data into a moving image file in the ring buffer (F(p)) of the memory 110 and records the file in at least the first external memory 115 or the second external memory 116. After Step S101A, the image apparatus 100 proceeds to Step S102.

According to the second modification of the first embodiment described above, even in moving image shooting, a moving image may be saved from a scene slightly before the recording start timing. Thus, there is an effect that a phenomenon in which a beginning of the operation is cut off is reduced.

Further, according to the second modification of the first embodiment, the image data before the shooting command signal may be recorded as moving image data only by a touch operation, and thus there is an effect that recording operation sound in the moving image data is reduced.

Second Embodiment

Next, a second embodiment will be described. The second embodiment has the same configuration as that of the image apparatus 100 according to the first embodiment described above, and is different in the touch ProCap operation process executed by the image apparatus. Specifically, in the second embodiment, a shooting parameter is switched according to a slide operation of the user. In the following, after describing an outline of the touch ProCap operation process executed by the image apparatus according to the second embodiment, a detailed process of the touch ProCap operation process executed by the image apparatus according to the second embodiment will be described. Note that the same components as those of the image apparatus 100 according to first embodiment described above are denoted by the same reference numerals, and detailed description thereof is omitted.

Operation Process of Image Apparatus

Figure 13A:
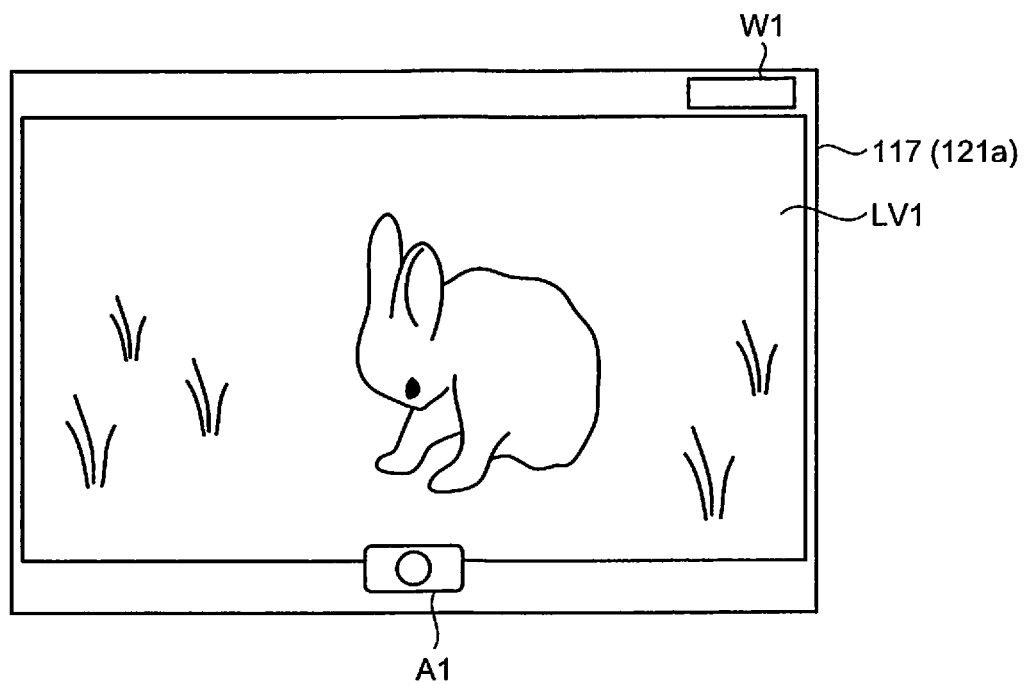
FIG. 13A is a schematic diagram for description of an outline of an operation process executed by an image apparatus according to a second embodiment.
Figure 13B:
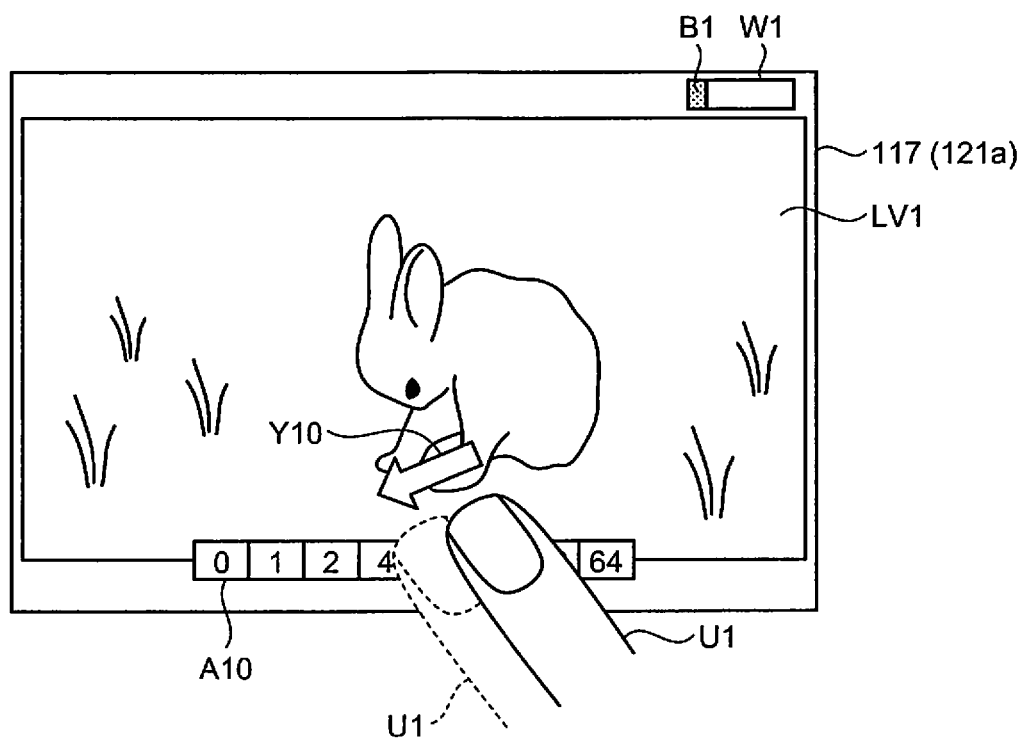
FIG. 13B is a schematic diagram for description of an outline of an operation process executed by the image apparatus according to the second embodiment.
Figure 13C:
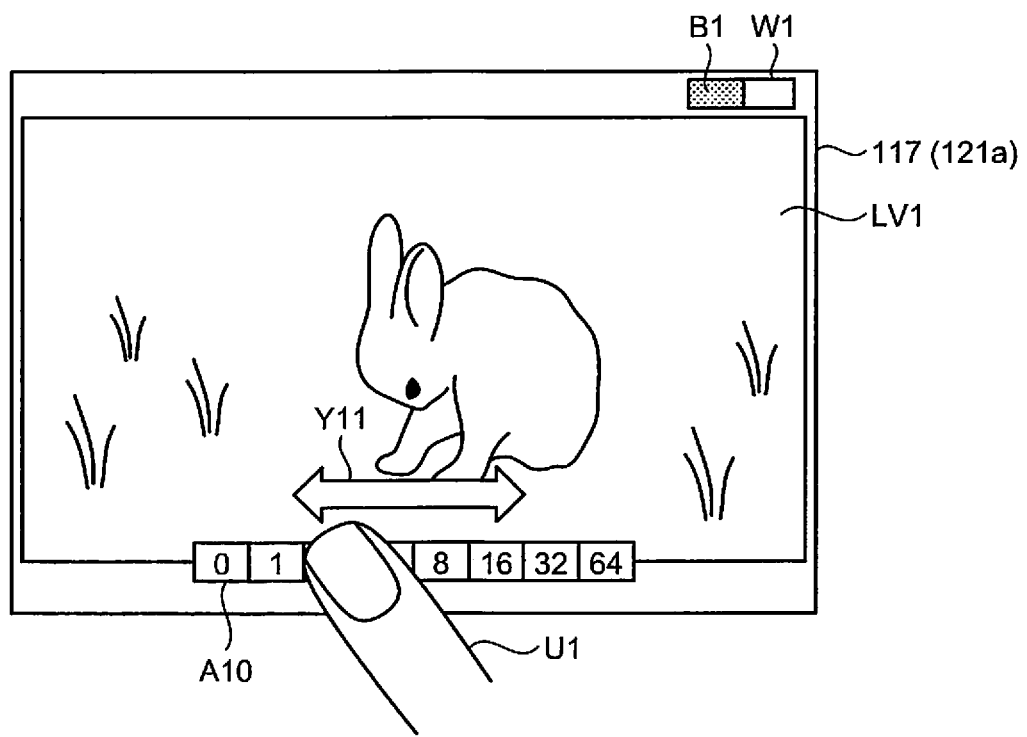
FIG. 13C is a schematic diagram for description of an outline of an operation process executed by the image apparatus according to the second embodiment.

First, a description will be given of an outline of the touch ProCap operation process executed by the image apparatus 100 according to second embodiment. FIG. 13A to FIG. 13C are schematic diagrams for description of the outline of the operation process executed by the image apparatus 100.

Figure 14A:
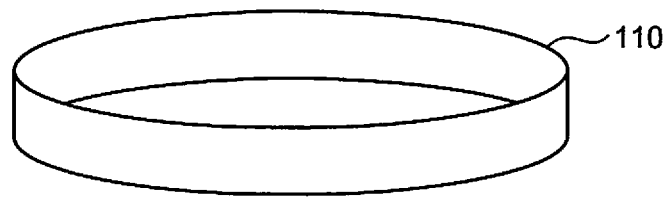
FIG. 14A is a diagram schematically illustrating the operation process when the image apparatus stores image data in a memory according to the second embodiment.
Figure 14B:
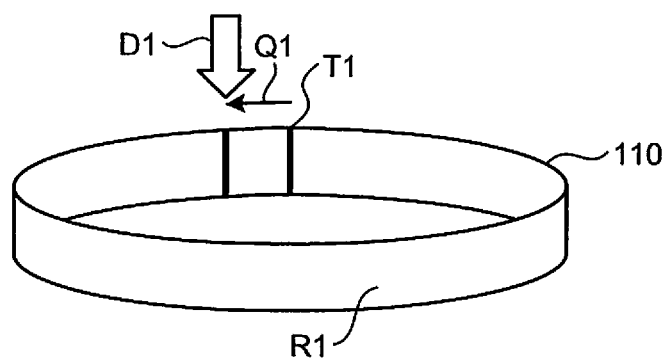
FIG. 14B is a diagram schematically illustrating the operation process when the image apparatus stores the image data in the memory according to the second embodiment.
Figure 14C:
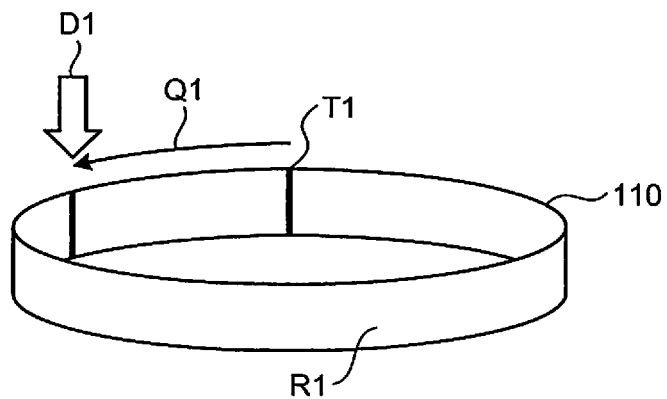
FIG. 14C is a diagram schematically illustrating the operation process when the image apparatus stores the image data in the memory according to the second embodiment.

FIG. 14A to FIG. 14C are diagrams schematically illustrating the operation process when the image apparatus 100 stores image data in the memory 110. Note that in FIG. 13A to FIG. 13C and FIG. 14A to FIG. 14C, a description will be given of the touch ProCap operation process during the ProCapture mode of the image apparatus 100. Furthermore, in the following, a description will be given of the operation process when the image apparatus 100 displays a live view image on the display unit 117. However, a similar operation process is performed in the eyepiece display unit 118.

As illustrated in FIG. 13A, first, the system controller 129 controls the imaging controller 108 to cause the imaging element 107 to transition to the shooting standby state. In this case, the pre-release buffer information W1 indicates that the captured image data is empty in the memory 110. Specifically, as illustrated in FIG. 14A, the pre-release buffer information W1 indicates that the captured image data is empty in the first storage area R1 in the memory 110.

Subsequently, as illustrated in FIG. 13B, when a shooting preparation command signal is input from the touch operation unit 121a by the user performing a touch operation on the icon A1, the system controller 129 controls the imaging controller 108 to switch the mode of the imaging element 107 from the shooting standby state (second drive mode) to the shooting state of the first drive mode. In this case, the system controller 129 controls the memory controller 127 to successively store a plurality of pieces of image data successively generated by the imaging element 107 in the first storage area of the memory 110 over time. Specifically, as illustrated in FIG. 14B, the system controller 129 controls the memory controller 127 to successively store the image data D1 in the first storage area R1 of the memory 110 by the ring buffer format according to the first storage format as the mode of the memory 110 from the time T1 when the user touches the icon A1. Further, the system controller 129 causes the display unit 117 to display a bar B1 indicating the amount of image data stored in the first storage area R1 of the memory 110 according to the ring buffer format on the pre-release buffer information W1 and an icon A10 indicating a change in shooting speed of a shooting parameter according to the slide operation. Here, the icon A10 includes shooting fps for storing image data generated by the imaging element 107 in the memory 110. Examples of the icon A10 include an icon for receiving an input of a command signal for storing all 64 pieces of image data generated by the imaging element 107 using 64 fps in the ring buffer of the memory 110, an icon for receiving an input of a command signal for storing, in the ring buffer of the memory 110, image data corresponding to 32 fps by storing one out of two pieces in the memory 110 among 64 pieces of image data generated by the imaging element 107 using 64 fps, etc. In this way, the user may perform a change operation equivalent to changing the shooting parameter of the imaging element 107 through an intuitive operation.

Thereafter, as illustrated in FIG. 13C, based on a signal input from the touch operation unit 121a in response to a slide operation on the icon A10 by the user, the system controller 129 controls an operation of storing image data generated by the imaging element 107 in the memory 110 to change a storage interval of the image data to be stored, thereby performing a control operation to change a shooting interval in a pseudo manner. In this way, the shooting parameter of the imaging element 107 is changed. In this case, as illustrated in FIG. 14C, the system controller 129 successively stores the image data in the memory 110 using pseudo shooting fps changed according to the slide operation on the icon A10 by the user. In this way, the user may store the image data in the memory 110 using desired shooting fps by performing the slide operation while maintaining the touch.

Touch ProCap Operation Process

Figure 15:
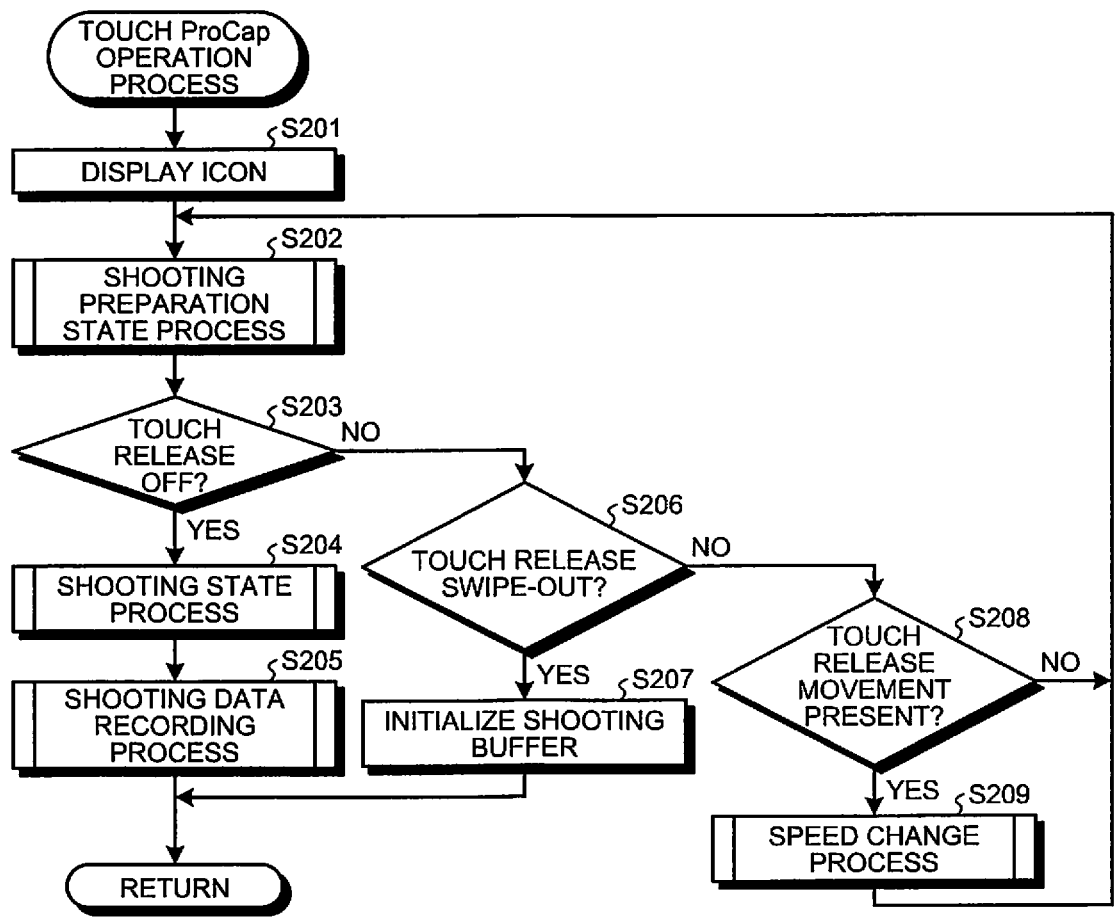
FIG. 15 is a flowchart illustrating an outline of a touch ProCap operation process executed by the image apparatus according to the second embodiment.

Next, a description will be given of the touch ProCap operation process executed by the image apparatus 100. FIG. 15 is a flowchart illustrating an outline of touch ProCap operation process executed by the image apparatus 100 according to the second embodiment.

As illustrated in FIG. 15, first, the system controller 129 causes the display unit 117 to display the icon A10 that allows selection of the shooting speed of the shooting parameter of the imaging element 107 (Step S201).

In Step S202, the image apparatus 100 executes the shooting preparation state process for successively storing the image data successively generated by the imaging element 107 in the ring buffer of the memory 110. After Step S202, the image apparatus 100 proceeds to Step S203. Details of the shooting preparation state process will be described later. Step S203 to Step S207 correspond to Step S152 to Step S154, Step S157, and Step S156 of FIG. 11 described above, respectively.

In Step S208, the system controller 129 determines whether or not the user performs the slide operation from the touch position based on a signal input from the touch operation unit 121a. When the system controller 129 determines that the user performs the slide operation from the touch position (Step S208: Yes), the image apparatus 100 proceeds to Step S209 described below. On the other hand, when the system controller 129 determines that the user does not perform the slide operation from a user position (Step S208: No), the image apparatus 100 returns to Step S202 described above.

In Step S209, the image apparatus 100 executes a speed change process for changing the shooting speed of the imaging element 107.

Speed Change Process

Figure 16:
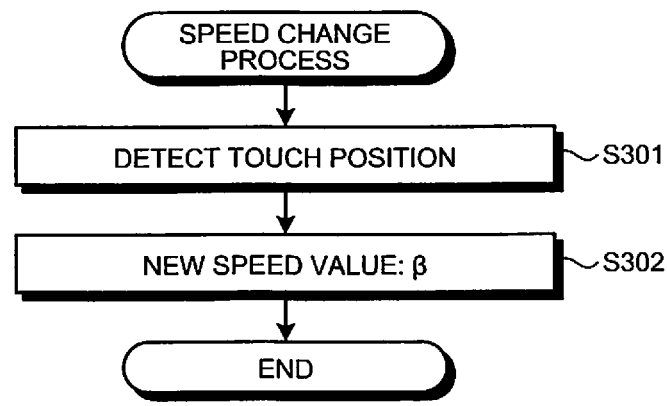
FIG. 16 is a flowchart illustrating an outline of a speed change process according to the second embodiment.

FIG. 16 is a flowchart illustrating an outline of the speed change process in Step S209 of FIG. 15 described above.

As illustrated in FIG. 16, the system controller 129 detects the touch position of the user on the touch operation unit 121a based on a position signal input from the touch operation unit 121a (Step S301).

Thereafter, the system controller 129 changes a current shooting speed value α indicating the shooting speed of the imaging element 107 to a new shooting speed value β corresponding to the touch position by controlling the imaging controller 108 based on the touch position of the user (Step S302). For example, the system controller 129 changes the new shooting speed value β to 1 fps when the current shooting speed value α of the imaging element 107 is 64 fps, changes β to 2 fps when α is 32 fps, changes β to 4 fps when α is 16 fps, changes β to 8 fps when α is 8 fps, changes β to 16 fps when α is 4 fps, changes β to 32 fps when α is 2 fps, changes β to 64 fps when α is 1 fps, and changes β to 0 fps when α is 0 fps (when stopped). In this way, there is a relationship between α and β in which a predetermined value is obtained by multiplying α and β. There is a special case where β is set to 0 when α is 0 at the time of stopping. After Step S302, the image apparatus 100 returns to the above-described subroutine of FIG. 15 and returns to Step S202.

Shooting Preparation State Process

Figure 17:
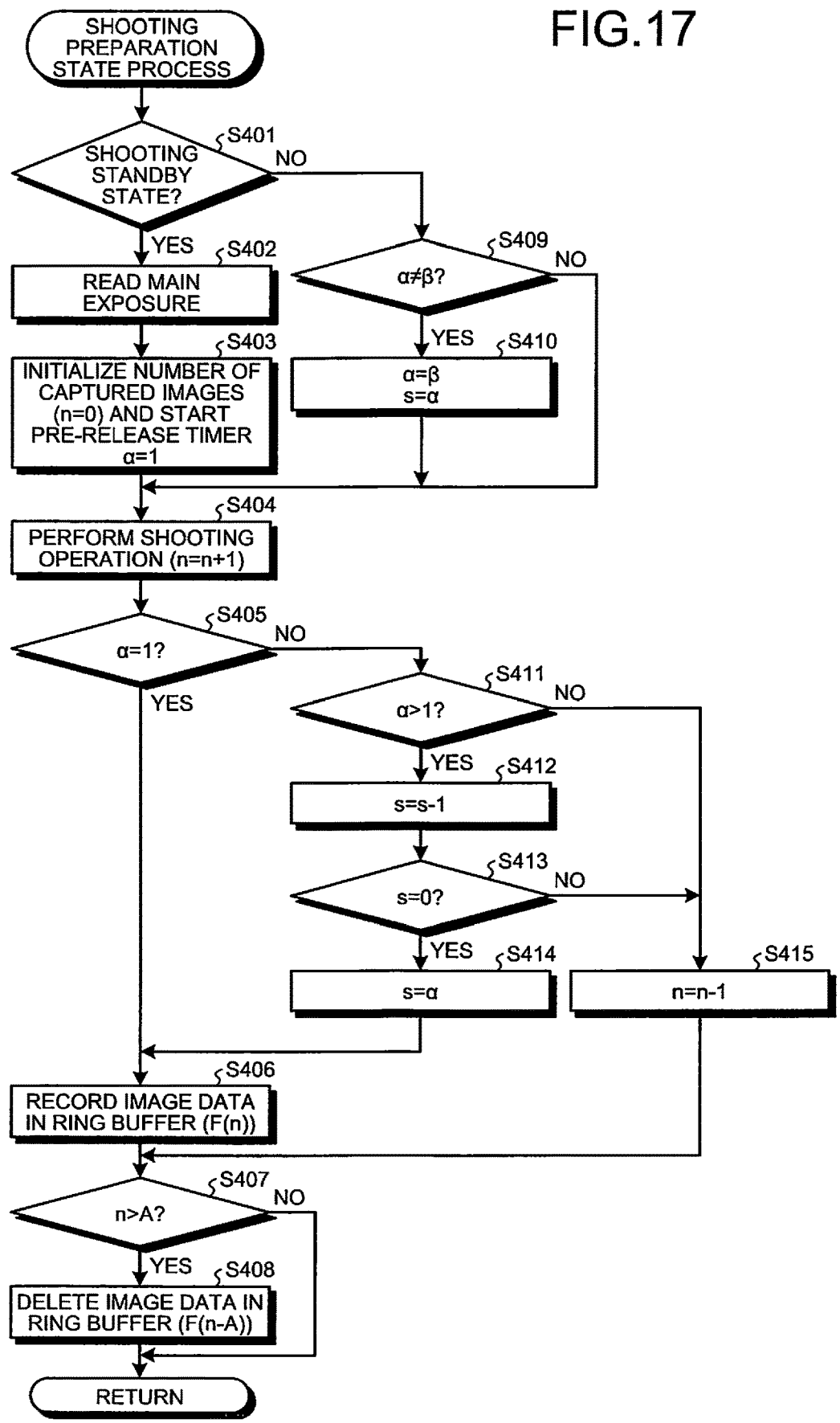
FIG. 17 is a flowchart illustrating an outline of a shooting preparation state process according to the second embodiment.

Next, a description will be given of details of the shooting preparation state process of Step S202 in FIG. 15. FIG. 17 is a flowchart illustrating an outline of the shooting preparation state process. Step S401 and Step S402 correspond to Step S61 and Step S62 of FIG. 6 described above, respectively.

In Step S403, the system controller 129 initializes the number of captured images (n=0), starts clocking using the pre-release timer, and sets the current shooting speed value α to "1" (α=1).

Subsequently, the system controller 129 controls the imaging controller 108 to cause the imaging element 107 to perform a shooting operation (n=n+1), thereby generating image data (Step S404).

Thereafter, the system controller 129 determines whether or not the current shooting speed value α is "1" (α=1) (Step S405). When the system controller 129 determines that the current shooting speed value α is "1" (Step S405: Yes), the image apparatus 100 proceeds to Step S406 described below. On the other hand, when the system controller 129 determines that the current shooting speed value α is not "1" (Step S405: No), the image apparatus 100 proceeds to Step S411.

Step S406 to Step S408 correspond to Step S65 to Step S67 of FIG. 6 described above, respectively. After Step S408, the image apparatus 100 returns to the subroutine of FIG. 15, and proceeds to Step S203.

In Step S409, the system controller 129 determines whether or not the current shooting speed value α is different from the new shooting speed value β (α≠β). When the system controller 129 determines that the current shooting speed value α is different from the new shooting speed value β (Step S409: Yes), the image apparatus 100 proceeds to Step S410 described later. On the other hand, when the system controller 129 determines that the current shooting speed value α is not different from the new shooting speed value β (Step S409: No), the image apparatus 100 proceeds to Step S404.

In Step S410, the system controller 129 sets the new shooting speed value β as the current shooting speed value α(α=β), and sets the current shooting speed value α as the shooting interval s. After Step S410, the image apparatus 100 proceeds to Step S404.

In Step S411, the system controller 129 determines whether or not the current shooting speed value α is greater than 1 (α>1). When the system controller 129 determines that the current shooting speed value α is greater than 1 (Step S411: Yes), the image apparatus 100 proceeds to Step S412 described later. On the other hand, when the system controller 129 determines that the current shooting speed value α is not greater than 1 (Step S411: No), the image apparatus 100 proceeds to Step S415 described later.

In Step S412, the system controller 129 decrements the shooting interval s (s=s−1).

Subsequently, the system controller 129 determines whether or not the shooting interval s is 0 (Step S413). When the system controller 129 determines that the shooting interval s is 0 (Step S413: Yes), the current shooting speed value α is set to the shooting interval s (s=α) (Step S414). After Step S414, the image apparatus 100 proceeds to Step S406. On the other hand, when the system controller 129 determines that the shooting interval s is not 0 (Step S413: No), the number n of captured images is decremented (n=n−1) (Step S415). After Step S415, the image apparatus 100 proceeds to Step S406.

According to the second embodiment described above, similarly to the first embodiment described above, there is an effect that occurrence of shake in a captured image by a touch operation is reduced while shooting is continued.

Further, according to the second embodiment, since the same result as that obtained by shooting at a desired shooting speed may be obtained by the slide operation on the touch operation unit 121a, there is the same effect as that obtained by changing a shooting parameter while maintaining the shooting operation.

First Modification of Second Embodiment

Next, a first modification of the second embodiment will be described. In the first modification of the second embodiment, the number of pieces of image data stored in the ring buffer and the sequential buffer of the memory is changed according to the slide operation of the user. In the following, after describing an outline of the touch ProCap operation process executed by an image apparatus according to first modification of the second embodiment, a description will be given of a detailed process of the touch ProCap operation process executed by the image apparatus according to first modification of the second embodiment. Note that the same components as those of the image apparatus 100 according to the first embodiment described above are denoted by the same reference numerals, and detailed description thereof is omitted.

Touch ProCap Operation Process

First, a description will be given of an outline of the touch ProCap operation process executed by the image apparatus 100 according to first modification of the second embodiment. FIG. 18A to FIG. 18G are schematic diagrams for description of the outline of the touch ProCap operation process executed by the image apparatus 100. FIG. 19A to FIG. 19E are diagrams schematically illustrating the operation process when the image apparatus 100 stores image data in the memory 110. Note that in FIG. 18A to FIG. 18G and FIG. 19A to FIG. 19E, a description will be given of the touch ProCap operation process during the ProCapture mode of the image apparatus 100. Furthermore, in the following, a description will be given of the operation process when the image apparatus 100 displays a live view image on the display unit 117. However, a similar operation process is performed in the eyepiece display unit 118.

Figure 18A:
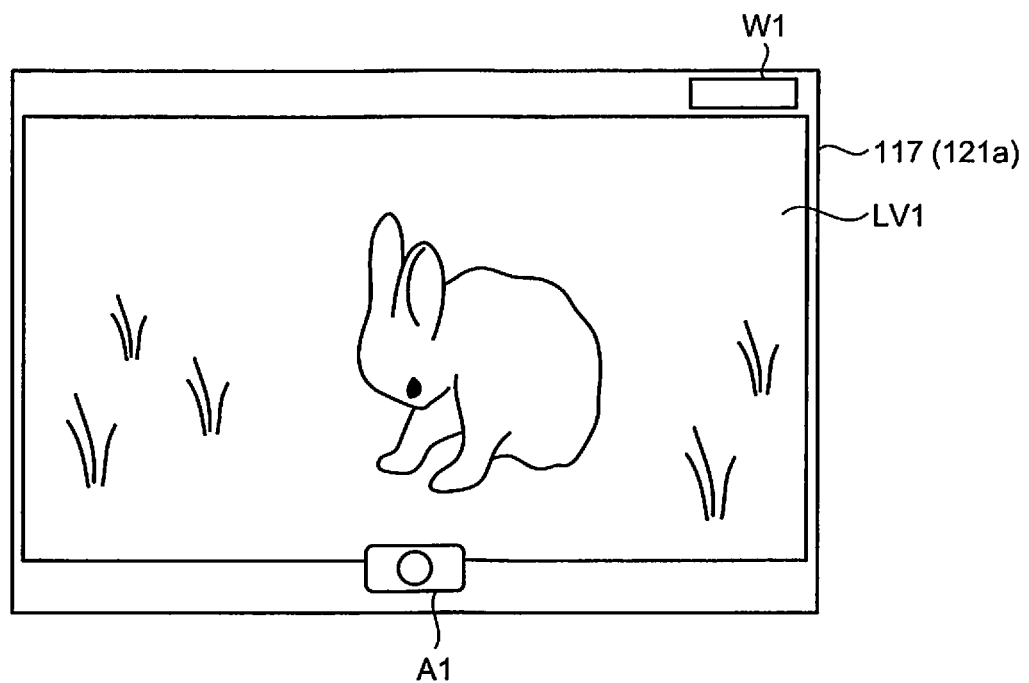
FIG. 18A is a schematic diagram for description of an outline of a touch ProCap operation process executed by an image apparatus according to a first modification of the second embodiment.
Figure 19A:
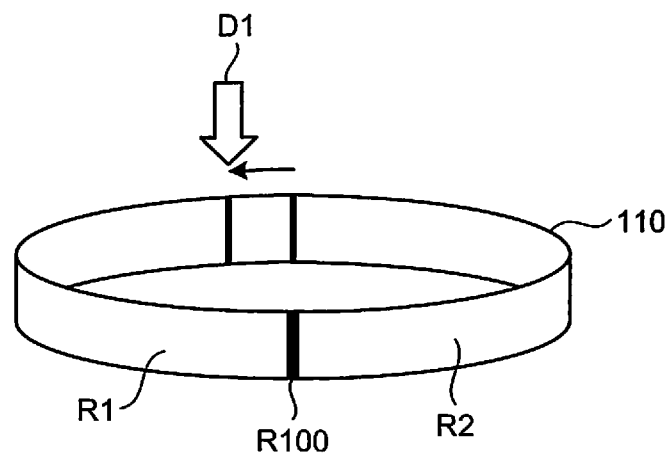
FIG. 19A is a diagram schematically illustrating an operation process when the image apparatus stores image data in a memory according to the first modification of the second embodiment.

As illustrated in FIG. 18A, first, the system controller 129 controls the imaging controller 108 to cause the imaging element 107 to transition to the shooting standby state. In this case, the pre-release buffer information W1 indicates that the captured image data is empty in the memory 110. Specifically, as illustrated in FIG. 19A, the pre-release buffer information W1 indicates that the captured image data is empty in the first storage area R1 in the memory 110.

Figure 18B:
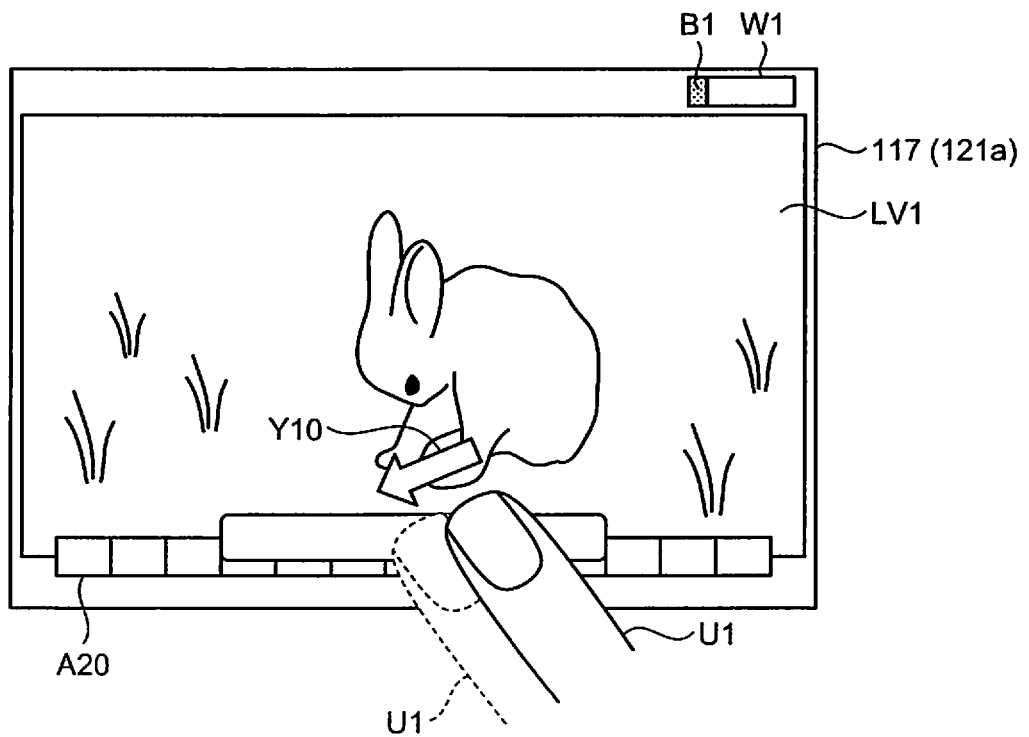
FIG. 18B is a schematic diagram for description of an outline of the touch ProCap operation process executed by the image apparatus according to the first modification of the second embodiment.

Subsequently, as illustrated in FIG. 18B, when a shooting preparation command signal is input from the touch operation unit 121a by the user performing a touch operation on the icon A1, the system controller 129 controls the imaging controller 108 to switch the mode of the imaging element 107 from the shooting standby state to the shooting state of the first drive mode. In this case, the system controller 129 controls the memory controller 127 to successively store a plurality of pieces of image data successively generated by the imaging element 107 in the memory 110 over time. Specifically, as illustrated in FIG. 19A, the system controller 129 controls the memory controller 127 to successively store the image data in the first storage area R1 of the memory 110 by the ring buffer format according to the first storage format as the mode of the memory 110 from the time T1 when the user touches the icon A1. Further, the system controller 129 causes the display unit 117 to display a bar B1 indicating the amount of image data stored according to the ring buffer format of the memory 110 on the pre-release buffer information W1 and a bar-shaped icon A20 capable of changing the memory capacity of the ring buffer of the memory 110 according to the slide operation.

Figure 18C:
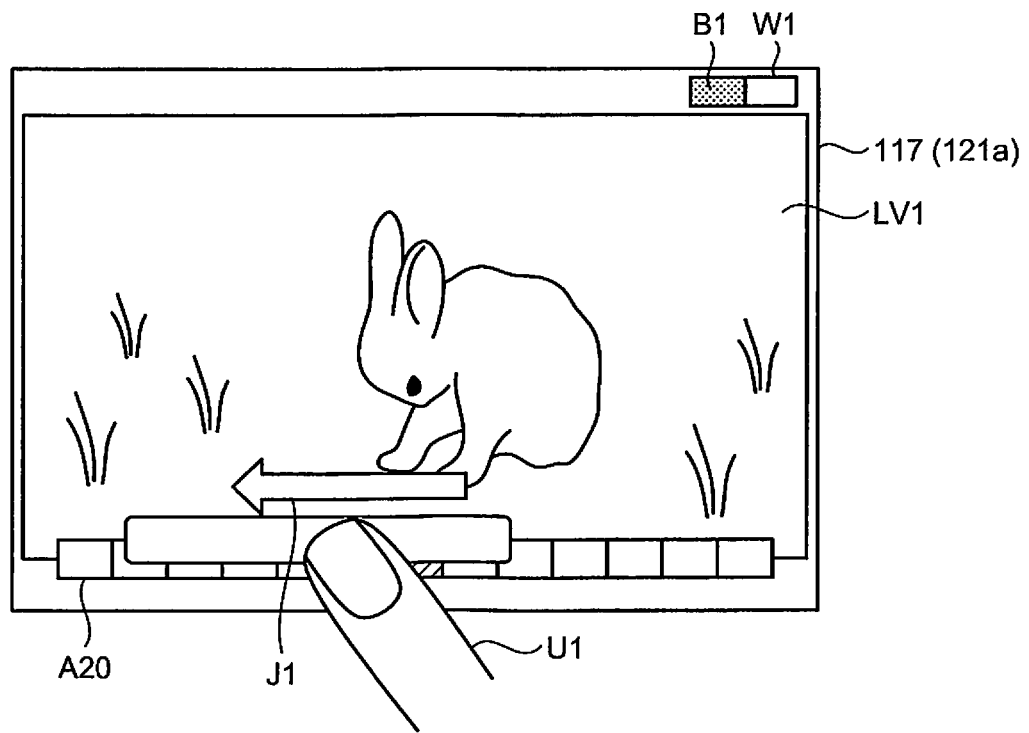
FIG. 18C is a schematic diagram for description of an outline of the touch ProCap operation process executed by the image apparatus according to the first modification of the second embodiment.
Figure 18D:
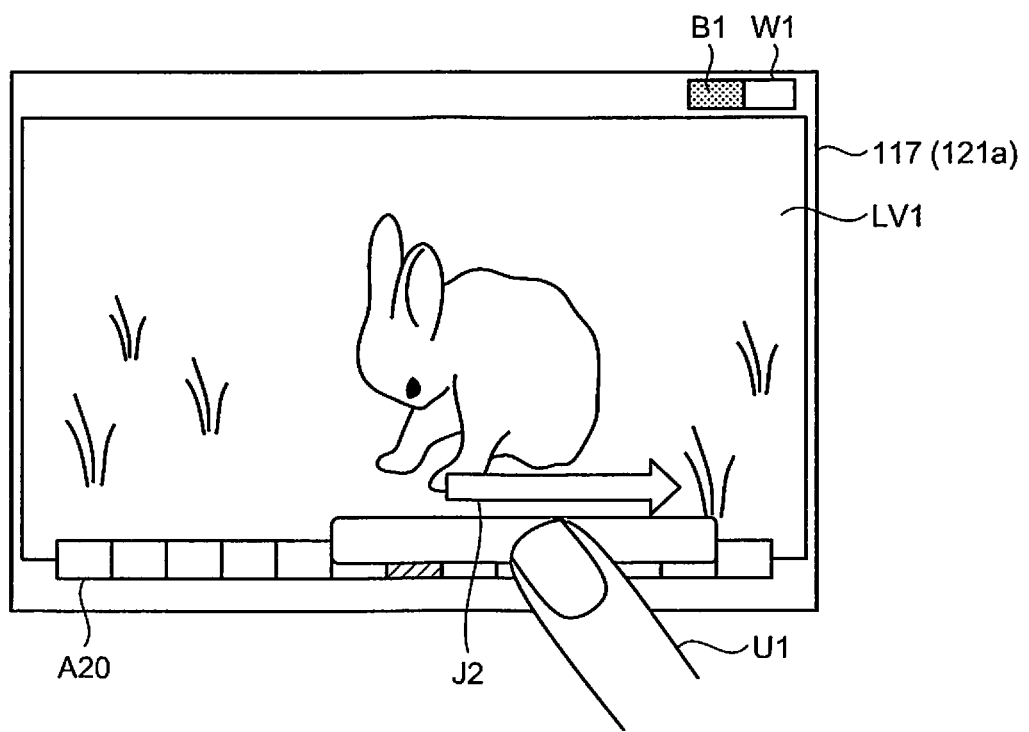
FIG. 18D is a schematic diagram for description of an outline of the touch ProCap operation process executed by the image apparatus according to the first modification of the second embodiment.
Figure 18F:
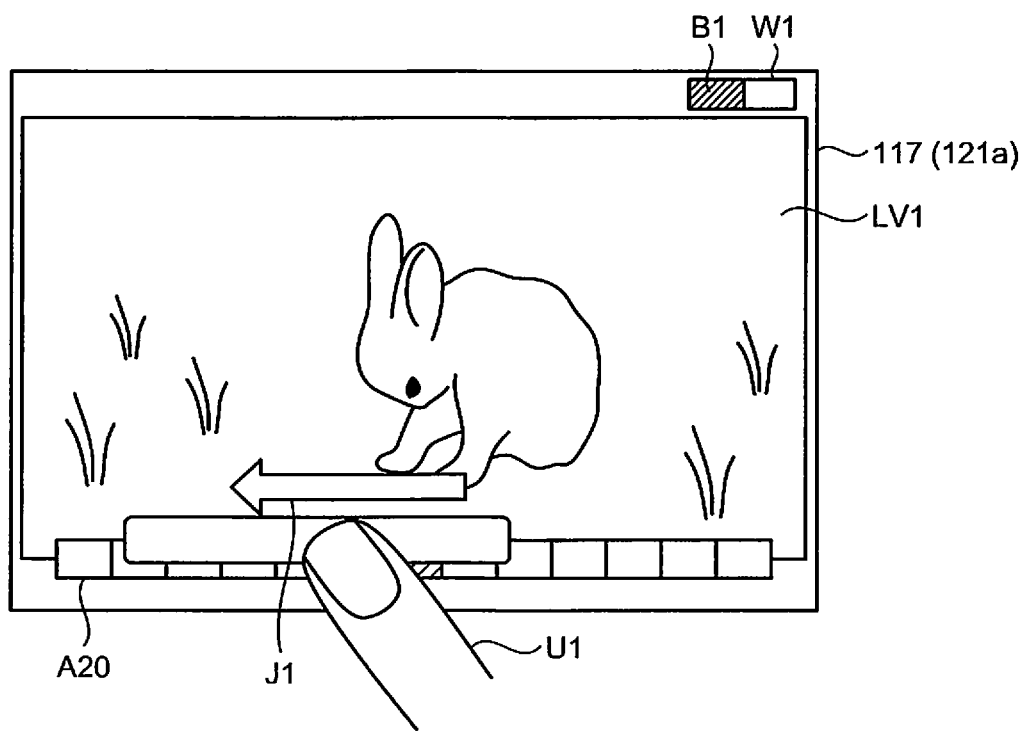
FIG. 18F is a schematic diagram for description of an outline of the touch ProCap operation process executed by the image apparatus according to the first modification of the second embodiment.
Figure 19B:
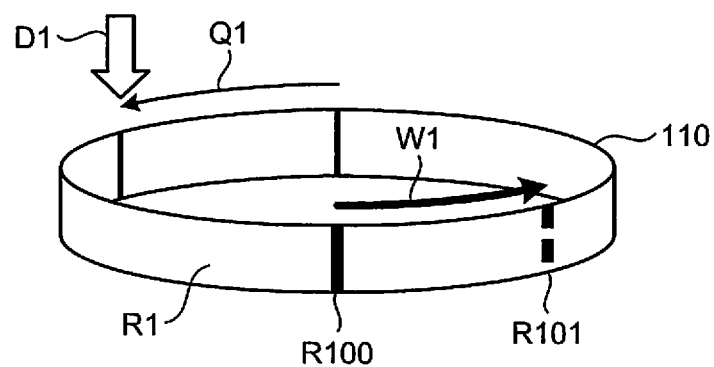
FIG. 19B is a diagram schematically illustrating the operation process when the image apparatus stores the image data in the memory according to the first modification of the second embodiment.
Figure 19C:
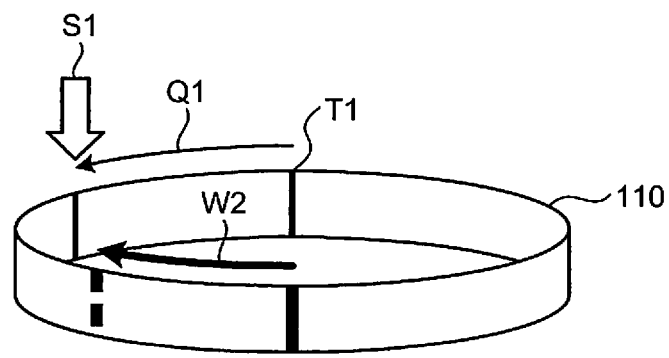
FIG. 19C is a diagram schematically illustrating the operation process when the image apparatus stores the image data in the memory according to the first modification of the second embodiment.

Thereafter, as illustrated in FIG. 18C or FIG. 18D, the system controller 129 changes the number of pieces of image data stored by the ring buffer format of the memory 110 in a sequential shooting state based on a signal input from the touch operation unit 121a in accordance with a slid operation on a bar B3 by the user. Specifically, as illustrated in FIG. 19B and FIG. 19C, when the memory capacity of the memory 110 according to the ring buffer format is not full, the system controller 129 performs changing to move a buffer limit R100 of the memory 110. For example, as illustrated in FIG. 18C and FIG. 19B, when the user performs a slide operation to a left side (direction of an arrow J1) on the icon A20, the system controller 129 enlarges a buffer limit R100 of the memory 110 by moving the buffer limit R100 to a buffer limit R101 (arrow W1) so that the memory capacity of the memory 110 according to the ring buffer format is enlarged. On the other hand, as illustrated in FIG. 18F and FIG. 19C, when the user performs a slide operation to a right side (direction of an arrow J2) on the icon A20, the system controller 129 reduces the buffer limit R100 of the memory 110 by moving the buffer limit R100 to the buffer limit R101 (arrow W2) so that the memory capacity of the memory 110 is reduced.

Figure 18E:
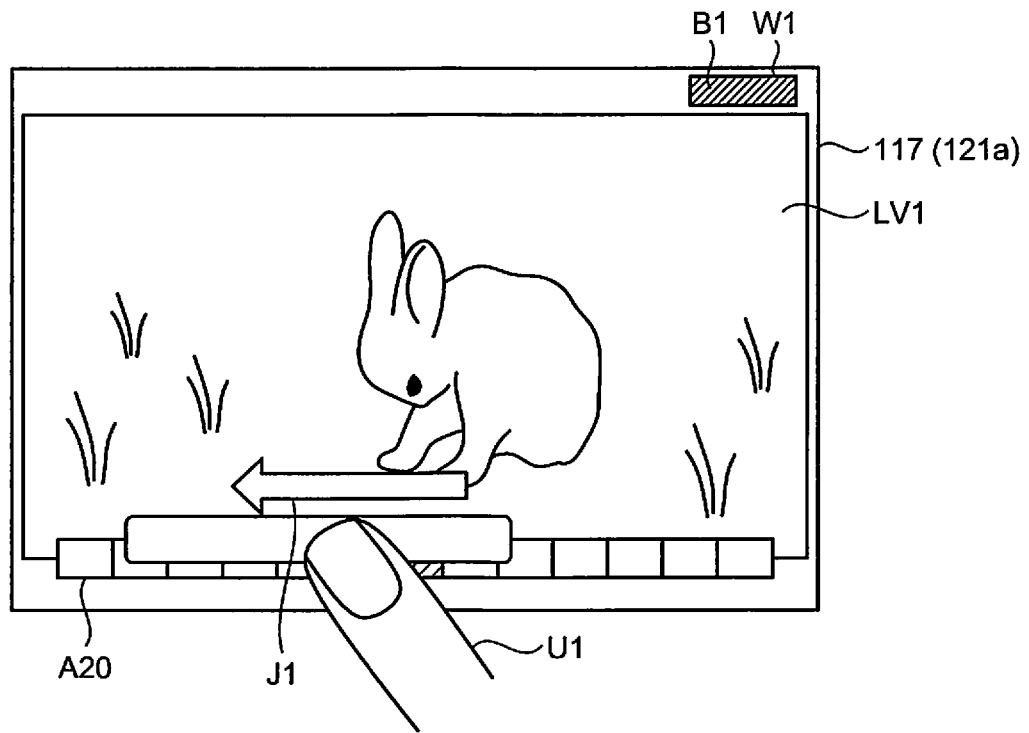
FIG. 18E is a schematic diagram for description of an outline of the touch ProCap operation process executed by the image apparatus according to the first modification of the second embodiment.
Figure 19D:
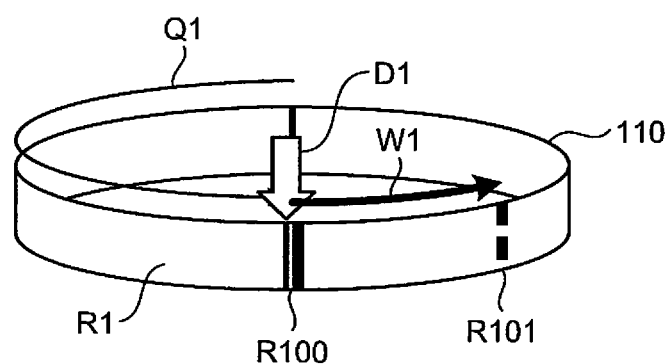
FIG. 19D is a diagram schematically illustrating the operation process when the image apparatus stores the image data in the memory according to the first modification of the second embodiment.

In addition, as illustrated in FIG. 18E, in a case where the memory capacity of the ring buffer of the memory 110 is full, when the user performs a slide operation to the left side (direction of an arrow J1) on the icon A20, the system controller 129 enlarges the buffer limit R100 of the memory 110 by moving the buffer limit R100 to the buffer limit R101 so that the memory capacity of the memory 110 according to the ring buffer format is enlarged as illustrated in FIG. 19D (arrow W1). Further, the system controller 129 switches display of the bar B1 of the ring buffer of the memory 110 (FIG. 18E→FIG. 18F).

Figure 18G:
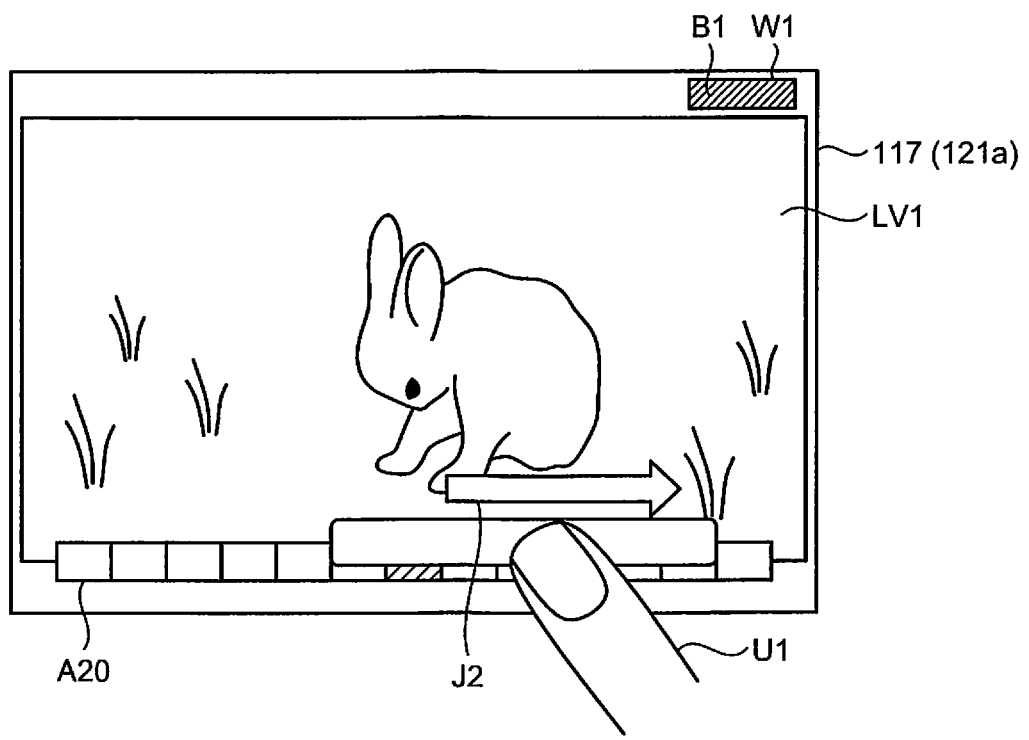
FIG. 18G is a schematic diagram for description of an outline of the touch ProCap operation process executed by the image apparatus according to the first modification of the second embodiment.
Figure 19E:
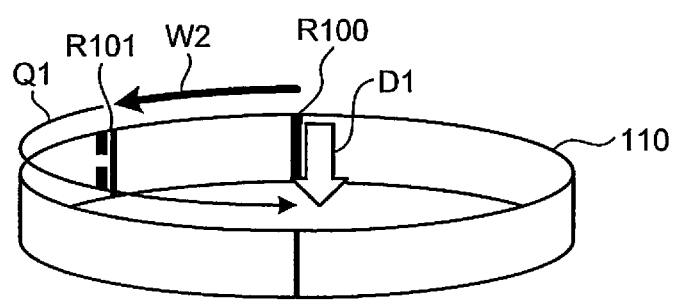
FIG. 19E is a diagram schematically illustrating the operation process when the image apparatus stores the image data in the memory according to the first modification of the second embodiment.

In addition, as illustrated in FIG. 18G and FIG. 19E, in a case where the memory capacity of the ring buffer of the memory 110 is full, when the user performs a slide operation to the right side (direction of the arrow J2) on the icon A20, the system controller 129 deletes image data of an old shooting time stored in the ring buffer of the memory 110 by the number corresponding to the slide operation to make an empty area, thereby moving the buffer limit R100 of the ring buffer to the buffer limit R101. In this way, the memory capacity other than that according to the ring buffer format is enlarged (arrow W2).

Touch ProCap Operation Process

Figure 20:
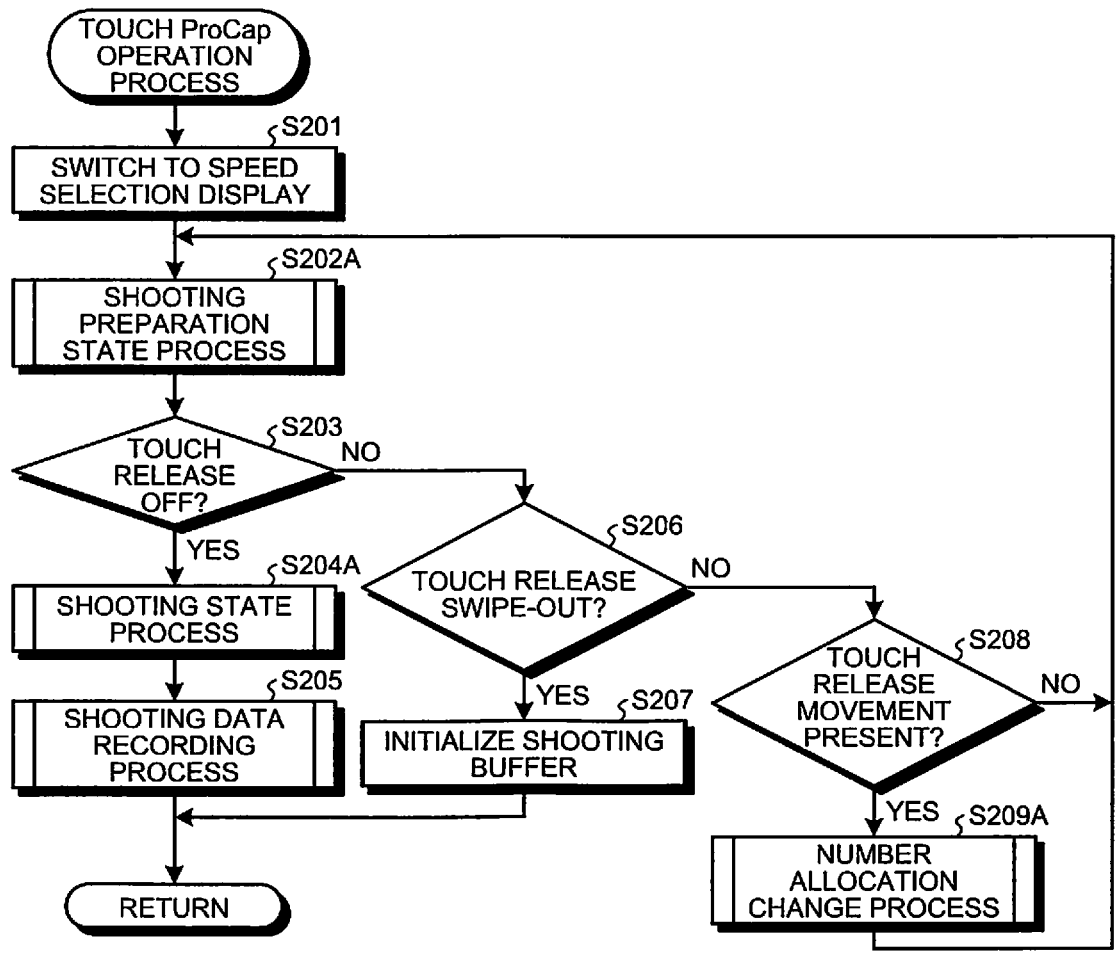
FIG. 20 is a flowchart illustrating an outline of a touch ProCap operation process executed by the image apparatus according to the first modification of the second embodiment.

Next, a description will be given of details of the touch ProCap operation process executed by the image apparatus 100. FIG. 20 is a flowchart illustrating an outline of the touch ProCap operation process executed by the image apparatus 100 according to the first modification of the second embodiment. In FIG. 20, the image apparatus 100 executes Step S202A, Step S204A, and Step S209A in place of Step S202, Step S204, and Step S209 of FIG. 15 described above, and executes similar processing to that of FIG. 15 described above in other steps. For this reason, in the following, Step S202A, Step S204A, and Step S209A will be described. Further, in the following, description will be given in the order of Step S209A, Step S202A, and Step S204A.

In Step S209A, the image apparatus 100 executes a number allocation change process for changing allocation of the number of pieces of image data stored in the ring buffer and the sequential buffer of the memory 110.

Number Allocation Change Process

Figure 21:
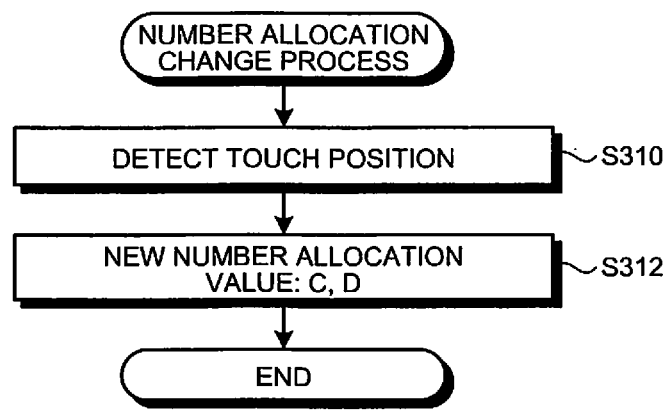
FIG. 21 is a flowchart illustrating an outline of a number allocation change process according to the first modification of the second embodiment.

FIG. 21 is a flowchart illustrating an outline of the number allocation change process of Step S209A in FIG. 20.

As illustrated in FIG. 21, the system controller 129 detects a touch position of the user on the touch operation unit 121a based on a position signal input from the touch operation unit 121a (Step S310).

Subsequently, the system controller 129 changes an allocation value of a new number for each of the ring buffer and the sequential buffer of the memory 110 based on the touch position of the user (Step S312). Specifically, when a new number of captured images before release is set to "C", a new number of captured images after release is set to "D", and the number that may be stored in the memory 110 is set to "20", the system controller 129 changes allocation of the number so that a value obtained by adding the new number C of captured images before release and the new number D of captured images after release becomes 20 or less according to a slide operation. For example, a value of the new number D of captured images after release becomes 16 (leftmost value) when a value of the new number C of captured images before release is 4, a value of the new number D of captured images after release becomes 10 (median) when a value of the new number C of captured images before release is 10, and a value of the new number D of captured images after release becomes 4 (rightmost value) when a value of the new number C of captured images before release is 16. After Step S312, the image apparatus 100 returns to the subroutine of FIG. 20, and proceeds to Step S202A.

Returning to FIG. 20, description from Step S202A will be continued.

In Step S202A, the image apparatus 100 executes a shooting preparation state process for successively storing image data successively generated by the imaging element 107 in the ring buffer of the memory 110.

Shooting Preparation State Process

Figure 22:
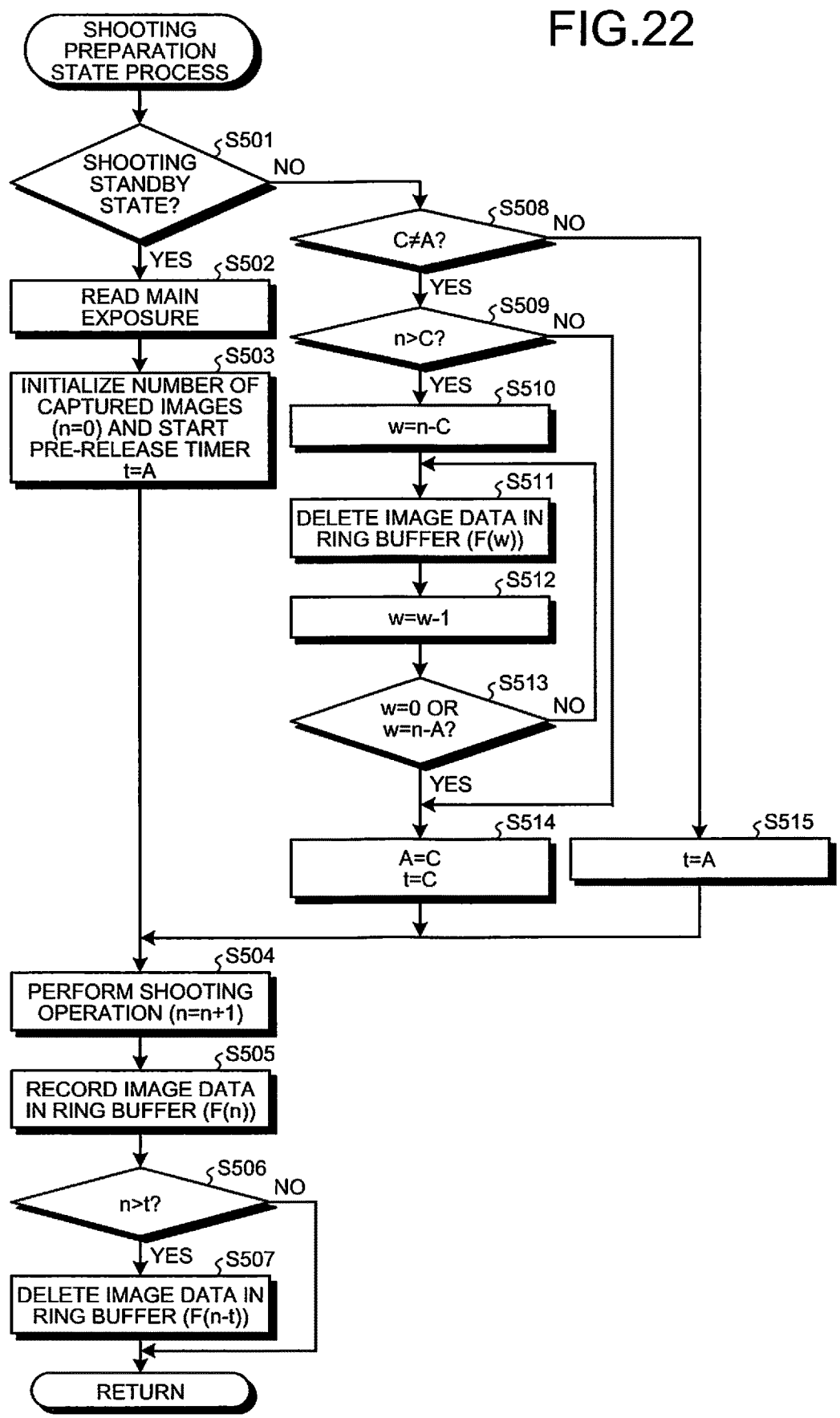
FIG. 22 is a flowchart illustrating an outline of a shooting preparation state process according to the first modification of the second embodiment.

FIG. 22 is a flowchart illustrating an outline of the shooting preparation state process of Step S202A in FIG. 20.

As illustrated in FIG. 22, when the state of the image apparatus 100 is a shooting standby state (Step S501: Yes), the image apparatus 100 proceeds to Step S502 described later. On the other hand, when the state of the image apparatus 100 is not the shooting standby state (Step S501: No), the image apparatus 100 proceeds to Step S508 described later.

In Step S502, the system controller 129 controls the imaging controller 108 to switch a reading method corresponding to a shooting mode of the imaging element 107 from a thinning reading method to a main exposure reading method.

Subsequently, the system controller 129 initializes the number of captured images (n=0), starts clocking of the timer before release, sets A as the number t of captured images before release (Step S503), controls the imaging controller 108 to cause the imaging element 107 to execute a shooting operation (n=n+1), thereby generating image data (Step S504), and stores the image data generated by the imaging element 107 in a ring buffer (F(n)) of the memory 110 (Step S505).

Thereafter, the system controller 129 determines whether or not the number n of captured images by the imaging element 107 exceeds the number t of captured images before release (Step S506). When the system controller 129 determines that the number n of captured images by the imaging element 107 exceeds the number t of captured images before release (n>t) (Step S506: Yes), the image apparatus 100 proceeds to Step S507 described later. On the other hand, when the system controller 129 determines that the number n of captured images by the imaging element 107 does not exceed the number t of captured images before release (n≤t) (Step S506: No), the image apparatus 100 returns to the subroutine of FIG. 20 and proceeds to Step S204.

In Step S507, the system controller 129 deletes the image data in the ring buffer (F(n−t)) of the memory 110. Specifically, the system controller 129 deletes the oldest image data stored in the ring buffer of the memory 110 from the memory 110. After Step S507, the image apparatus 100 returns to the subroutine of FIG. 20 and proceeds to Step S203.

In Step S508, the system controller 129 determines whether or not a preset number A of captured images before release is different from a newly set number C of captured images before release (C≠A). When the system controller 129 determines that the preset number A of captured images before release is different from the newly set number C of captured images before release (Step S508: Yes), the image apparatus 100 proceeds to Step S509 described later. On the other hand, when the system controller 129 determines that the preset number A of captured images before release is not different from the newly set number C of captured images before release (Step S508: No), the image apparatus 100 proceeds to Step S515 described later.

In Step S510, the system controller 129 sets "w" (w=n−C) to a value obtained by subtracting the newly set number C of captured images before release from the number n of captured images.

Subsequently, the system controller 129 deletes the image data in the ring buffer (F(w)) of the memory 110 from the memory 110 (Step S511), and decrements the value W (w=w−1) (Step S512).

Thereafter, the system controller 129 determines whether or not the value W is equal to 0 (w=0) or the value W is equal to a value obtained by subtracting the preset number A of captured image before release from the number of captured images n (w=n−A) (Step S513). When the system controller 129 determines that the value W is equal to 0 (w=0) or the value W is equal to the value obtained by subtracting the preset number A of captured image before release from the number of captured images n (w=n−A) (Step S513: Yes), the image apparatus 100 proceeds to Step S514 described later. On the other hand, when the system controller 129 determines that the value W is not equal to 0 (w=0) or the value W is not equal to the value obtained by subtracting the preset number A of captured image before release from the number of captured images n (w=n−A) (Step S513: No), the image apparatus 100 proceeds to Step S511 described above.

In Step S514, the system controller 129 sets the new number of captured images before release as the newly set number A of captured images before release and the present number t of captured images before release (A=C, t=C). After Step S514, the image apparatus 100 proceeds to Step S504.

In Step S515, the system controller 129 sets the number A of captured images before release as the preset number t of captured images before release (t=A). After Step S515, the image apparatus 100 proceeds to Step S504.

Returning to FIG. 20, Step S204A will be described.

In Step S204A, the image apparatus 100 executes a shooting state process for switching the storage format of the memory 110 from the ring buffer format to the sequential buffer format and storing a predetermined number of pieces of image data.

Shooting State Process

FIG. 23 is a flowchart illustrating an outline of the shooting state process of Step S204A in FIG. 20.

As illustrated in FIG. 23, the system controller 129 switches the storage format of the memory 110 from the ring buffer format to the sequential buffer format (Step S601).

Subsequently, the system controller 129 determines whether or not the preset number B of captured images after release is different from the newly set number D of captured images after release (B≠D) (Step S602). When the system controller 129 determines that the preset number B of captured images after release is different from the newly set number D of captured images after release (Step S602: Yes), the image apparatus 100 proceeds to Step S603 described below. On the other hand, when the system controller 129 determines that the preset number B of captured images after release is not different from the newly set number D of captured images after release (Step S602: No), the image apparatus 100 proceeds to Step S604 described below.

In Step S603, the system controller 129 sets the newly set number D of captured images after release as the preset number B of captured images after release (B=D).

Subsequently, the system controller 129 initializes the number of captured images (m=0, u=B) (Step S604), controls the imaging controller 108 to cause the imaging element 107 to execute a shooting operation (m=m+1), thereby generating image data (Step S605), and stores the image data generated by the imaging element 107 in the sequential buffer (G(m)) of the memory 110 (Step S606).

Subsequently, the system controller 129 determines whether or not the number m of captured images by the imaging element 107 is equal to the number B of captured images after release (Step S607). When the system controller 129 determines that the number m of captured images by the imaging element 107 is equal to the number u of captured images after release (m=u) (Step S607: Yes), the image apparatus 100 returns to the subroutine of FIG. 20 and proceeds to Step S205. On the other hand, when the system controller 129 determines that the number m of captured images by the imaging element 107 is not equal to the number u of captured images after release (m≠u) (Step S607: No), the image apparatus 100 returns to Step S605 described above.

According to the first modification of the second embodiment described above, shooting may be continued at a desired shooting speed by an operation maintaining a touch state referred to as a slide operation on the touch operation unit 121a. At the same time, it is possible to change a parameter. Thus, there is an effect that the storage format of the memory 110 may be easily switched while the shooting operation is maintained.

Second Modification of Second Embodiment

Next, a second modification of the second embodiment will be described. In the second modification of the second embodiment, a recording format is changed according to a slide operation of the user. In the following, after describing an outline of a touch ProCap operation process executed by an image apparatus according to the second modification of the second embodiment, a description will be given of a detailed process of the touch ProCap operation process executed by the image apparatus according to the second modification of the second embodiment. Note that the same components as those of the image apparatus 100 according to first embodiment described above are denoted by the same reference numerals, and detailed description is omitted.

Operation Process of Image Apparatus

Figure 24A:
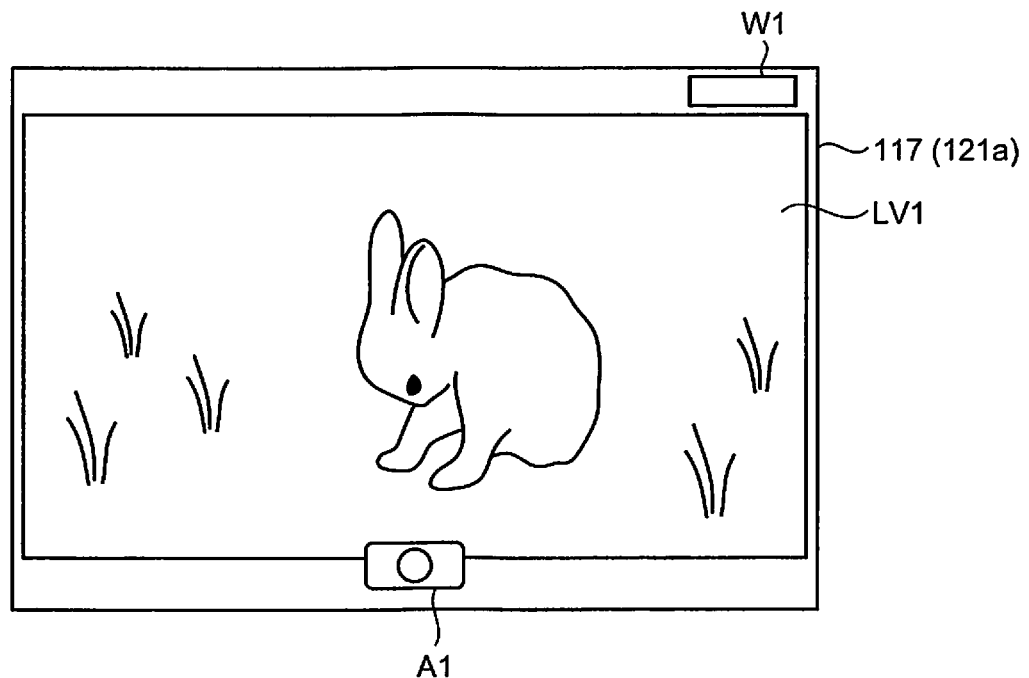
FIG. 24A is a schematic diagram for description of an outline of an operation process executed by the image apparatus according to a second modification of the second embodiment.
Figure 24B:
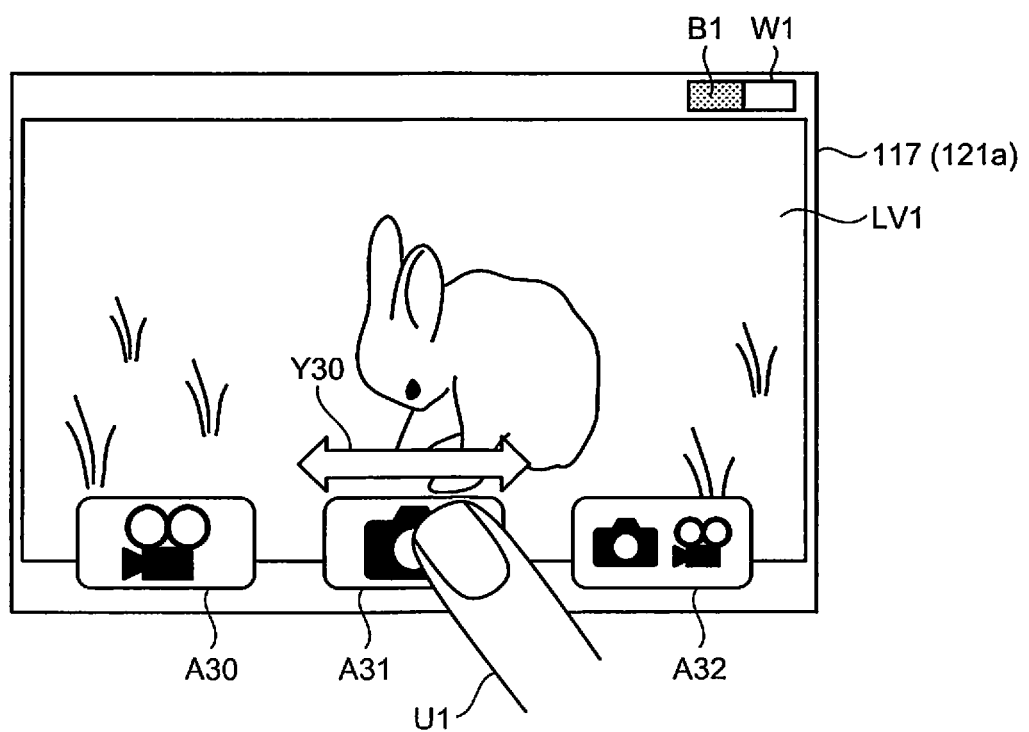
FIG. 24B is a schematic diagram for description of an outline of the operation process executed by the image apparatus according to the second modification of the second embodiment.

First, a description will be given of an outline of the touch ProCap operation process, which is a part of an operation process executed by the image apparatus 100 according to the second modification of the second embodiment. FIG. 24A and FIG. 24B are schematic diagrams for description of an outline of the operation process executed by the image apparatus 100. Note that in FIG. 24A and FIG. 24B, a description will be given of the touch ProCap operation process during the ProCapture mode of the image apparatus 100. Furthermore, in the following, a description will be given of the operation process when the image apparatus 100 displays a live view image on the display unit 117. However, a similar operation process is performed in the eyepiece display unit 118.

As illustrated in FIG. 24A, when a shooting preparation command signal is input from the touch operation unit 121a by the user touching the icon A1, the system controller 129 controls the imaging controller 108 to switch the mode of the imaging element 107 from the shooting standby state to the shooting state of the first drive mode. In this case, as illustrated in FIG. 24B, the system controller 129 causes the display unit 117 to display a plurality of icons A10, A11, and A12 for changing the recording format of the image data generated by the imaging element 107 on the display unit 117. The icon A10 receives an input of a command signal for recording a plurality of pieces of image data generated by the imaging element 107 as moving image data. The icon A11 receives an input of a command signal for recording image data generated by the imaging element 107 as still image data. The icon A12 receives an input of a command signal for recording image data generated by the imaging element 107 as moving image data and still image data.

Touch ProCap Operation Process

Figure 25:
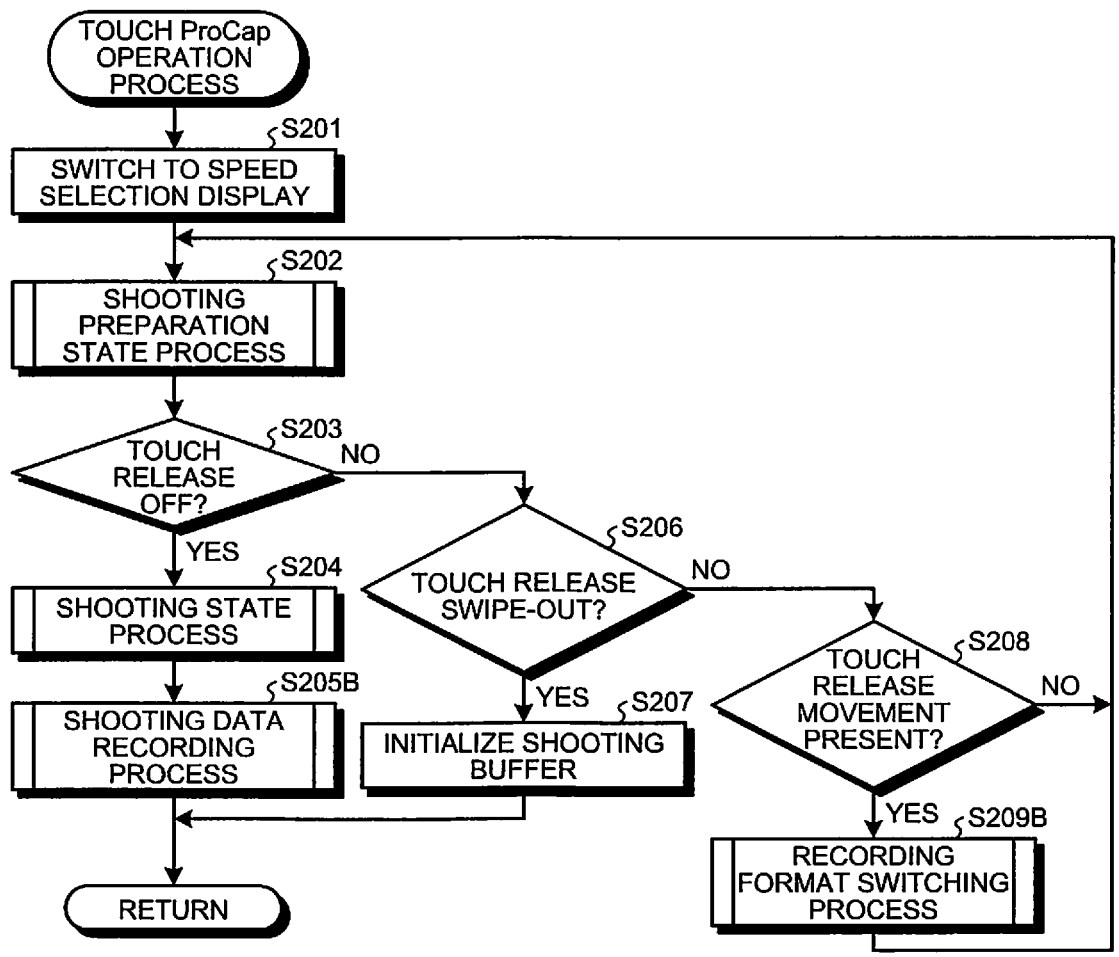
FIG. 25 is a flowchart illustrating an outline of a touch ProCap operation process executed by the image apparatus according to the second modification of the second embodiment.

Next, a description will be given of details of the touch ProCap operation process executed by the image apparatus 100. FIG. 25 is a flowchart illustrating an outline of the touch ProCap operation process executed by the image apparatus 100 according to the second modification of the second embodiment. In FIG. 25, the image apparatus 100 executes Step S205B and Step S209B instead of Step S205 and Step S209 of FIG. 15 described above, and executes similar processing to that of FIG. 15 described above in other steps. For this reason, in the following, Step S205B and Step S209B will be described. Further, in the following, description will be given in the order of Step S209B and Step S205B.

In Step S209B, the image apparatus 100 executes a recording format switching process for switching the recording format of the image data generated by the imaging element 107.

Recording Format Switching Process

Figure 26:
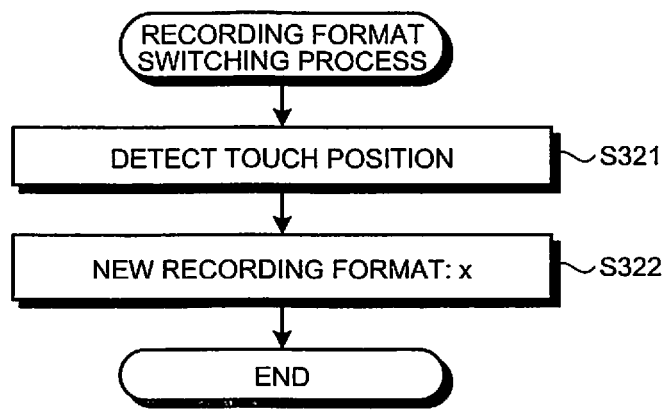
FIG. 26 is a flowchart illustrating an outline of a recording format switching process according to the second modification of the second embodiment.

FIG. 26 is a flowchart illustrating an outline of the recording format switching process of Step S209B in FIG. 25.

As illustrated in FIG. 26, the system controller 129 detects a touch position of the user on the touch operation unit 121a based on a position signal input from the touch operation unit 121a (Step S321).

Subsequently, the system controller 129 changes a recording format x of the image data generated by the imaging element 107 based on the touch position of the user (Step S322). Specifically, the system controller 129 changes the recording format x of the image data generated by the imaging element 107 to a recording format corresponding to one of "still image", "moving image", and "still image and moving image" based on the touch position of the user. After Step S322, the image apparatus 100 returns to the subroutine of FIG. 25 and returns to Step S202.

In Step S205B, the image apparatus 100 executes a shooting data recording process for recording the image data stored in the memory 110 according to a preset recording format.

Shooting Data Recording Process

Figure 27:
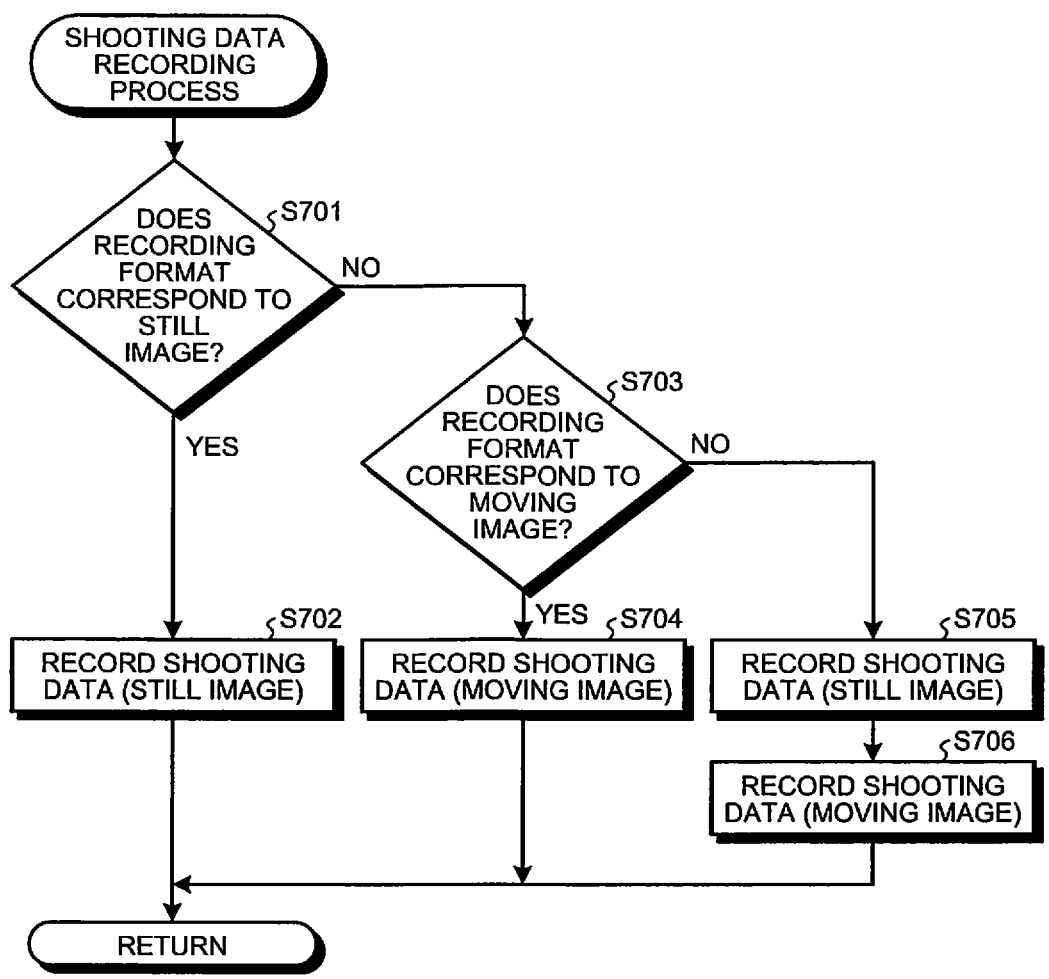
FIG. 27 is a flowchart illustrating an outline of a shooting data recording process according to the second modification of the second embodiment.

FIG. 27 is a flowchart illustrating an outline of the shooting data recording process of Step S205B in FIG. 25.

As illustrated in FIG. 27, when the recording format for recording from the memory 110 to the first external memory 115 corresponds to a still image (Step S701: Yes), the image apparatus 100 executes a shooting data recording process (still image) for converting the image data stored in the memory 110 into a still image file and recording the file (Step S702). Note that the shooting data recording process (still image) is similar to the shooting data recording process of the first embodiment of FIG. 8 described above, and thus detailed description will be omitted. After Step S702, the image apparatus 100 returns to the subroutine of FIG. 25 and proceeds to Step S206.

In Step S701, when the recording format for recording from the memory 110 to the first external memory 115 does not correspond to a still image (Step S701: No), the image apparatus 100 proceeds to Step S703 described below.

Subsequently, when the recording format for recording from the memory 110 to the first external memory 115 corresponds to a moving image (Step S703: Yes), the image apparatus 100 executes a shooting data recording process (moving image) for recording a plurality of pieces of image data stored in the memory 110 as a moving image file (Step S704). Note that the shooting data recording process (moving image) is similar to the shooting data recording process according to the second modification of the first embodiment of FIG. 12 described above, and thus detailed description will be omitted. After Step S704, the image apparatus 100 returns to the subroutine of FIG. 25 and returns to the main routine of FIG. 4 described above.

In Step S703, when the recording format for recording from the memory 110 to the first external memory 115 does not correspond to a "moving image" (Step S703: No), the image apparatus 100 proceeds to Step S705.

Subsequently, the image apparatus 100 executes a shooting data recording process ("still image") for recording the image data stored in the memory 110 as a still image file (Step S705), and executes a shooting data recording process ("moving image") for recording the plurality of pieces of image data stored in the memory 110 as a moving image file (Step S706). Note that the shooting data recording process ("still image") and the shooting data recording process ("moving image") are similar to Step S702 and Step S704 described above, and thus detailed description will be omitted. After Step S706, the image apparatus 100 returns to the subroutine of FIG. 25 and proceeds to Step S206.

According to the second modification of the second embodiment described above, there is an effect that the recording format of the image data may be changed by a simple operation even after the shooting operation is started by the slide operation on the touch operation unit 121a.

First Modification of First and Second Embodiments

Next, a description will be given of a first modification of the first and second embodiments. In the image apparatus 100 according to the first and second embodiments described above, when the shooting command signal is input from the touch operation unit 121a, the system controller 129 switches the storage format of the memory 110 from the ring buffer format to the sequential buffer format. However, a control operation may be performed by dividing the entire memory area of the memory 110 into a ring buffer area and a sequential buffer area from the beginning.

Figure 28A:
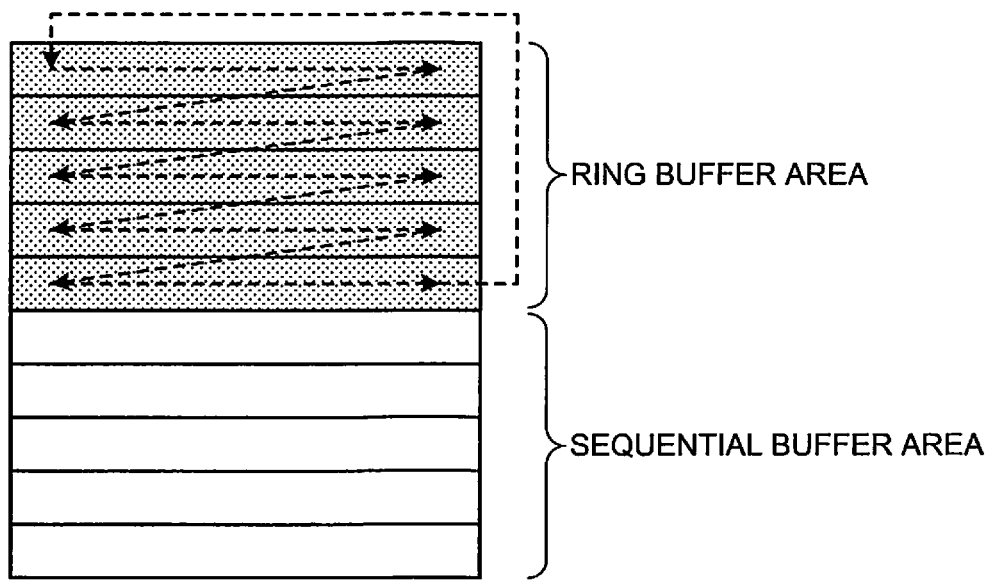
FIG. 28A is a diagram schematically illustrating an operation process when the image apparatus stores data in the memory according to the first modification of the first and second embodiments.
Figure 28B:
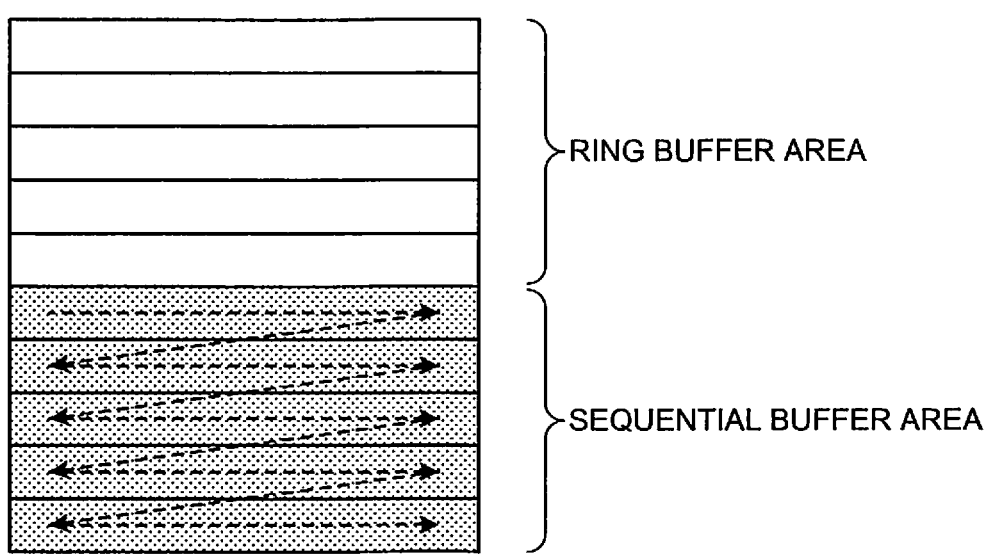
FIG. 28B is a diagram schematically illustrating an operation process when the image apparatus stores data in the memory according to the first modification of the first and second embodiments.
Figure 28C:
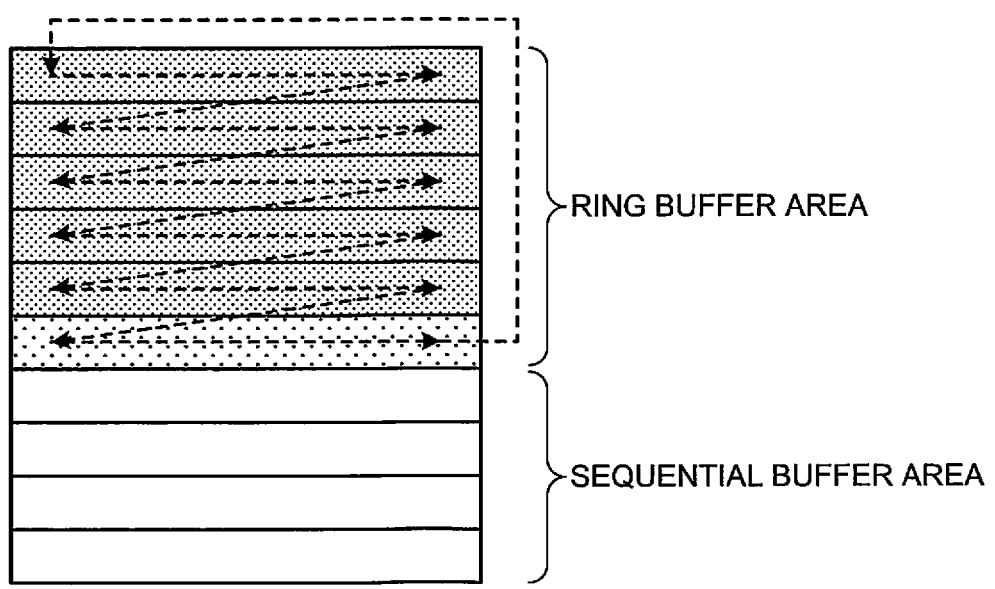
FIG. 28C is a diagram schematically illustrating an operation process when the image apparatus stores data in the memory according to the first modification of the first and second embodiments.

FIG. 28A to FIG. 28C are diagrams schematically illustrating an operation process when the image apparatus 100 according to the first modification of the first and second embodiments stores data in the memory 110.

As illustrated in FIG. 28A, the system controller 129 successively stores image data successively generated by the imaging element 107 in a ring buffer area H1 when a shooting sequential command signal is input from the touch operation unit 121a, and moves to a first ring buffer area to successively overwrite old image data with latest image data (arrow Y100) when a predetermined memory area is reached.

In addition, as illustrated in FIG. 28B, the system controller 129 successively stores image data successively generated by the imaging element 107 in a sequential buffer area H2 when a shooting sequential command signal is input from the touch operation unit 121a, and suspends shooting of the imaging element 107 when a predetermined memory area is reached.

In addition, as illustrated in FIG. 28C, the system controller 129 changes allocation (ratio) of the ring buffer area H1 and the sequential buffer area H2 in the memory 110 based on a signal for moving a touch position over time input from the touch operation unit 121a according to a slide operation input from the touch operation unit 121a.

According to the first modification of the first and second embodiments described above, there is an effect that occurrence of shake on the captured image by the touch operation is reduced while shooting is continued.

Second Modification of First and Second Embodiments

Next, a description will be given of a second modification of the first and second embodiments. In the first and second embodiments described above, when the user touches the icon A1, the image apparatus 100 executes the touch ProCap operation process. However, in the second modification of the first and second embodiments, the touch ProCap operation process is executed when a detection frame indicating an area including a face of the subject detected by the image processor 111 is touched.

Figure 29A:
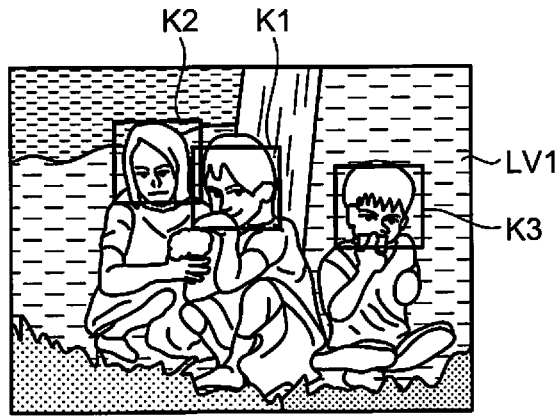
FIG. 29A is a diagram illustrating an outline of a touch ProCap operation process executed by an image apparatus according to a second modification of the first and second embodiments.
Figure 29B:
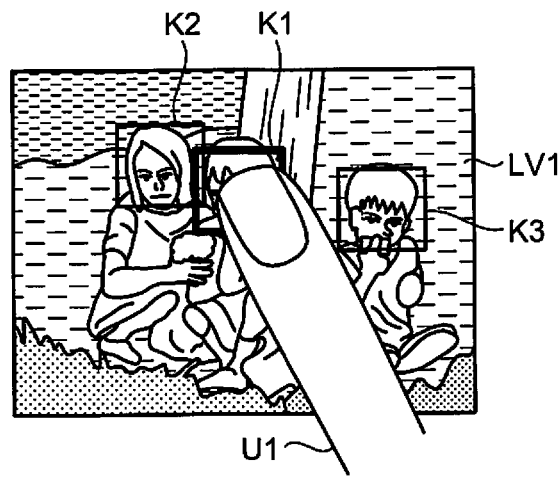
FIG. 29B is a diagram illustrating an outline of the touch ProCap operation process executed by the image apparatus according to the second modification of the first and second embodiments.
Figure 29C:
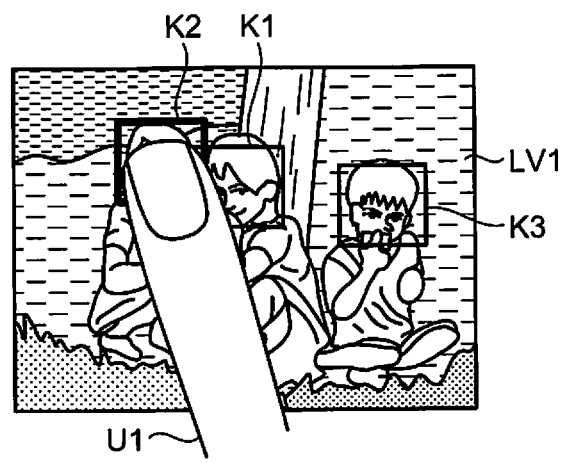
FIG. 29C is a diagram illustrating an outline of the touch ProCap operation process executed by the image apparatus according to the second modification of the first and second embodiments.

FIG. 29A to FIG. 29C are diagrams illustrating an outline of the touch ProCap operation process executed by an image apparatus 100 according to the second modification of the first and second embodiments. As illustrated in FIG. 29A, when the image processor 111 detects the face of the subject from the live view image LV1, the system controller 129 causes the display unit 117 to display detection frames K1 to K3 in an area including the face of the subject. In this instance, when the user performs a touch operation on the desired detection frame K1 as illustrated in FIG. 29B, the image apparatus 100 executes the touch ProCap operation process described above. Thereafter, when the user slides the touch area to another detection frame, for example, the detection frame K2, the system controller 129 deletes the plurality of pieces of image data stored in the memory 110 and newly executes the touch ProCap operation process.

According to the second modification of the first and second embodiments described above, there is an effect that a plurality of images in the ProCapture mode may be obtained for a desired face.

Third Modification of First and Second Embodiments

Figure 30:
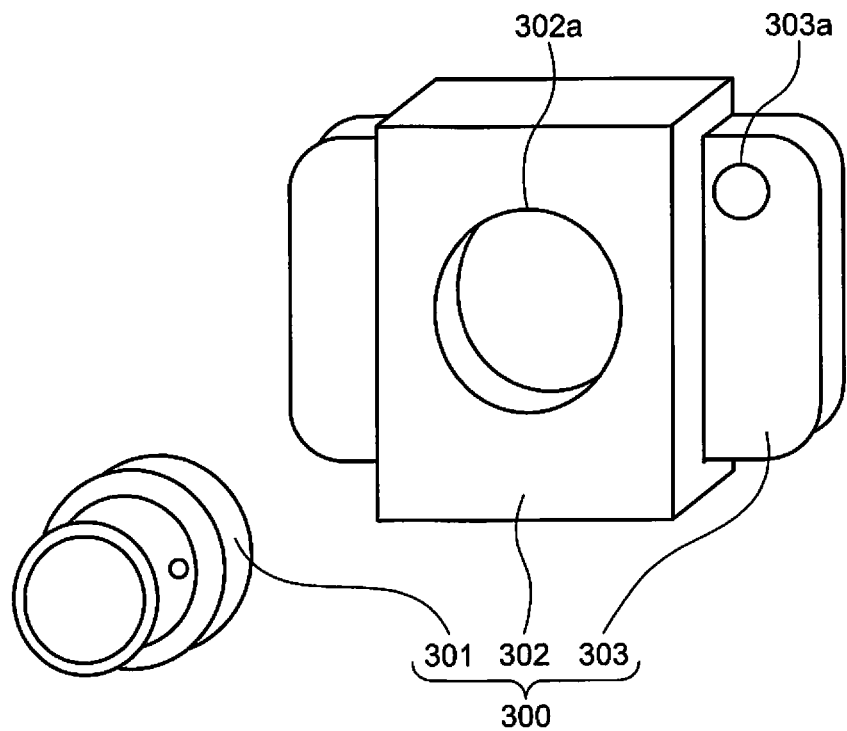
FIG. 30 is a diagram illustrating a schematic configuration of an image apparatus according to a third modification of the first and second embodiments.
Figure 31:
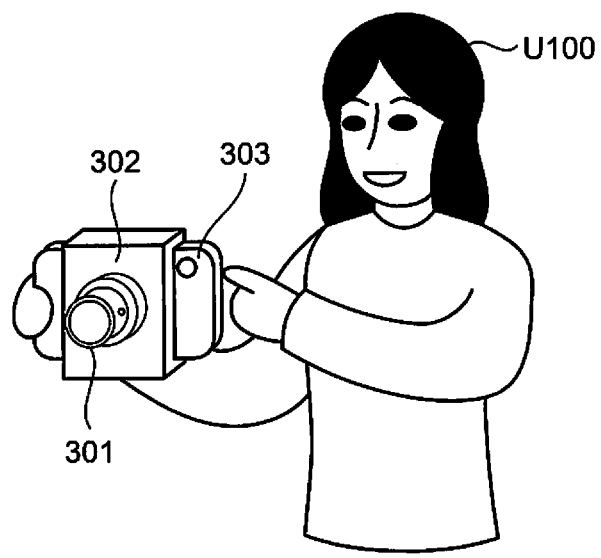
FIG. 31 is a diagram schematically illustrating a mounted state of the image apparatus according to the third modification of the first and second embodiments.

Next, a description will be given of a third modification of the first and second embodiments. In the image apparatus 100 according to the first and second embodiments described above, the imaging element 107 and the display unit 117 are integrally formed. However, the disclosure is not limited thereto, and the imaging element 107 and the display unit 117 may be separated from each other. FIG. 30 is a diagram illustrating a schematic configuration of an image apparatus according to the third modification of the first and second embodiments. FIG. 31 is a diagram schematically illustrating a mounted state of the image apparatus according to the third modification of the first and second embodiments.

As illustrated in FIG. 30 and FIG. 31, an image apparatus 100A includes an imaging unit 301 and a portable device 302, which may transmit and receive information to each other by wireless communication or wired communication, and an attachment 303 for connecting the imaging unit 301 and the portable device 302 to each other.

The imaging unit 301 generates image data and wirelessly transmits the image data to the portable device 302. The imaging unit 301 includes at least the optical system 101 and the imaging element 107 described above, and further includes a plurality of wireless modules capable of performing wireless transmission such as Wi-Fi (Wireless Fidelity) (registered trademark) or Bluetooth (registered trademark).

The portable device 302 displays an image corresponding to the image data received from the imaging unit 301. The portable device 302 includes at least a display unit 117 and a touch operation unit 121a. The portable device 302 wirelessly transmits a signal received by the touch operation unit 121a to the imaging unit 301.

According to the third modification of the first and second embodiments described above, in a case where the imaging unit 301 and the portable device 302 are connected by wireless communication, even when the imaging unit 301 continues shooting, there is an effect that occurrence of shake on a captured image by a touch operation may be reduced.

Other Embodiments

Various modes may be formed by appropriately combining a plurality of components disclosed in the image apparatuses according to the first and second embodiments of the present disclosure. For example, some components may be deleted from all the components described in the image apparatuses according to the embodiments of the present disclosure described above. Furthermore, components described in the image apparatuses according to the embodiments of the present disclosure described above may be appropriately combined.

Further, in the image apparatuses according to the first and second embodiments of the present disclosure, the "unit" described above may be read as "means", "circuit", etc. For example, the system controller may be read as system control means or a system control circuit.

Further, a program executed by the image apparatuses according to the first and second embodiments of the present disclosure is file data in a format in which installation may be performed or in a format which may be executed and is provided by being recorded in a computer-readable recording medium such as a CD-ROM, a flexible disk (FD), a CD-R, a digital versatile disk (DVD), a USB media, a flash memory, and etc.

Further, the program executed by the image apparatuses according to the first and second embodiments of the present disclosure may be stored on a computer connected to a network such as the Internet and provided by being downloaded via the network.

In the description of the flowchart in this specification, the order of processes between steps is clearly indicated using expressions such as "first", "thereafter", and "subsequently". However, the order of processes to implement the present disclosure is not uniquely defined by those expressions. That is, the order of the processes in the flowcharts described in this specification may be changed within a consistent range.

Some embodiments of the present application have been described above in detail with reference to the drawings. However, these embodiments are examples, and the present disclosure may be implemented in other modes having various modifications and improvements based on the knowledge of those skilled in the art, including an aspect described in a section of the present disclosure.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image apparatus comprising:
    an image sensor configured to successively generate image data by continuously imaging an object scene;
    a memory configured to successively store the image data generated by the image sensor;
    a touch panel configured to output a first signal for commanding shooting preparation by a touch operation of a user and a second signal for commanding shooting by a release operation of releasing the touch operation; and
    a processor configured to successively store the image data successively generated by the image sensor in the memory according to a first storage format when the first signal is input from the touch panel and store the image data successively generated by the image sensor in the memory according to a second storage format when the second signal is input from the touch panel, wherein
    the memory includes at least a first storage area and a second storage area,
    the processor is configured to successively store the image data according to the first storage format in the first storage area and successively stores the image data according to the second storage format in the second storage area,
    the image sensor includes a plurality of pixels disposed in a two-dimensional matrix, and
    the image sensor has a first drive mode in which image signals of all pixels in an effective area are output as the image data and a second drive mode in which the image data having the smaller number of pixels than the number of pixels of the image data output in the first drive mode is output by thinning a predetermined pixel column in the effective area, and
    the processor is configured to
        drive the image sensor in the first drive mode when at least one of the first signal and the second signal is input from the touch panel, and
        drive the image sensor in the second drive mode when the first signal and the second signal are not input from the touch panel.

2. The image apparatus according to claim 1, wherein the processor is configured to
    make the memory possible to store a latest piece of the image data by successively releasing the image data stored in the first storage area from an oldest piece as an empty area when the empty area of the first storage area is full in a case where the image data is stored in the first storage area according to the first storage format, and
    store the image data until an empty area of the second storage area is full in a case where the image data is stored in the second storage area according to the second storage format.

3. The image apparatus according to claim 1, wherein in a case where an empty area is present in the first storage area, when the second signal is input from the touch panel, the processor is configured to successively store the image data in the empty area of the first storage area after the image data is successively stored in the second storage area.

4. The image apparatus according to claim 1, wherein the processor is configured to
    successively record the image data stored in the first storage area and the second storage area on a recording medium allowed to be inserted into and removed from the image apparatus in a case where the image data is stored in the first storage area and the second storage area, and
    delete the image data from the memory in a case where all the image data stored in the first storage area and the second storage area is recorded on the recording medium.

5. The image apparatus according to claim 1, further comprising
    a display panel configured to display an image corresponding to the image data,
    wherein the touch panel is provided by being superimposed on a display area of the display panel and configured to output the second signal when the user separates a finger from a touch position touched by the finger.

6. The image apparatus according to claim 1, further comprising
    a clock configured to output a completion signal when a time set in advance is reached by clocking,
    wherein the processor is configured to
        cause the clock to start clocking when the first signal is input from the touch panel, and
        successively store the image data in the second storage area according to the second storage format when the completion signal is input from the clock before the second signal is input from the touch panel.

7. The image apparatus according to claim 1, further comprising
    a clock configured to output a completion signal when a time set in advance is reached by clocking,
    wherein the processor is configured to
        cause the clock to start clocking when the first signal is input from the touch panel, and
        delete the image data stored in each of the first storage area and the second storage area when the completion signal is input from the clock before the second signal is input from the touch panel.

8. The image apparatus according to claim 1, further comprising
    a counter configured to count number of times of image capturing and output a completion signal when the number of times of image capturing reaches a preset number,
    wherein the processor is configured to
        cause the counter to start counting when the first signal is input from the touch panel, and successively store or delete the image data in the second storage area according to the second storage format when the completion signal is input from the counter before the second signal is input from the touch panel.

9. The image apparatus according to claim 1, wherein
the touch panel is configured to output a change signal for commanding a change of a shooting parameter by the image sensor according to a slide operation after the first signal is input, and
the processor is configured to change the shooting parameter based on the change signal.

10. The image apparatus according to claim 9, wherein the processor is configured to change the shooting parameter in a pseudo manner by changing a storage interval of the image data stored in the memory.

11. The image apparatus according to claim 1, wherein
the touch panel is configured to output a change signal for commanding a change of a ratio of the image data stored in each of the first storage area and the first storage area according to a slide operation after the first signal is input, and
the processor is configured to change the ratio of the image data stored in each of the first storage area and the second storage area based on the change signal.

12. The image apparatus according to claim 1, wherein
the touch panel is configured to output a command signal for commanding any one of a plurality of recording formats for recording a plurality of pieces of the image data stored in the memory on a recording medium according to a slide operation after the first signal is output, and
the processor is configured to record the plurality of pieces of the image data stored in the memory on the recording medium by a recording format according to the command signal based on the command signal.

13. An image apparatus comprising:
an image sensor configured to successively generate image data by continuously imaging an object scene;
a memory configured to successively store the image data generated by the image sensor;
a touch panel configured to output a first signal for commanding shooting preparation by a touch operation of a user and a second signal for commanding shooting by a release operation of releasing the touch operation; and
a processor configured to successively store the image data successively generated by the image sensor in the memory according to a first storage format when the first signal is input from the touch panel and store the image data successively generated by the image sensor in the memory according to a second storage format when the second signal is input from the touch panel, wherein
the memory includes at least a first storage area and a second storage area,
the processor is configured to successively store the image data according to the first storage format in the first storage area and successively stores the image data according to the second storage format in the second storage area,
the touch panel is configured to successively output a position signal indicating a touch position by the touch operation after the first signal is output, and the processor is configured to delete the image data stored in each of the first storage area and the second storage area when the touch position moves to an outside of a detection area by the touch panel over time based on the position signal successively input from the touch panel.

14. An image capturing method comprising:
successively generating, using an image sensor, image data by continuously imaging an object scene, wherein the image sensor (1) includes a plurality of pixels disposed in a two-dimensional matrix, and (2) has a first drive mode in which image signals of all pixels in an effective area are output as the image data and a second drive mode in which the image data having the smaller number of pixels than the number of pixels of the image data output in the first drive mode is output by thinning a predetermined pixel column in the effective area;
outputting a first signal for commanding shooting preparation by a touch operation of a user;
successively storing the image data in a first storage area of a memory according to a first storage format when the first signal is input;
outputting a second signal for commanding shooting by a release operation of releasing the touch operation; and
storing the image data in a second storage area of the memory according to a second storage format when the second signal is input,
wherein the image sensor is driven in the first drive mode when at least one of the first signal and the second signal is input, and the image sensor is driven in the second drive mode when neither the first signal nor the second signal is input.

15. A non-transitory computer-readable recording medium on which an executable program is recorded, the program causing a processor of a computer to execute:
successively generating, using an image sensor, image data by continuously imaging an object scene, wherein the image sensor (1) includes a plurality of pixels disposed in a two-dimensional matrix, and (2) has a first drive mode in which image signals of all pixels in an effective area are output as the image data and a second drive mode in which the image data having the smaller number of pixels than the number of pixels of the image data output in the first drive mode is output by thinning a predetermined pixel column in the effective area;
outputting a first signal for commanding shooting preparation by a touch operation of a user;
successively storing the image data in a first storage area of a memory according to a first storage format when the first signal is input;
outputting a second signal for commanding shooting by a release operation of releasing the touch operation; and
storing the image data in a second storage area of the memory according to a second storage format when the second signal is input,
wherein the image sensor is driven in the first drive mode when at least one of the first signal and the second signal is input, and the image sensor is driven in the second drive mode when neither the first signal nor the second signal is input.

* * * * *